US008666807B1

(12) United States Patent
Murray et al.

(10) Patent No.: US 8,666,807 B1
(45) Date of Patent: Mar. 4, 2014

(54) SYSTEM AND METHOD FOR CREATING AND MANAGING MEDIA ADVERTISING PROPOSALS

(75) Inventors: David R. Murray, Windemere, FL (US); Matthew Ferry, Lake Forest, CA (US); Marwan Shaban, St. Cloud, FL (US); Mark R. Allen, Laguna Hills, CA (US); Bobbi Denise Schuster, San Antonio, TX (US); Steven M. Gable, San Antonio, TX (US)

(73) Assignee: Clear Channel Management Services, Inc., San Antonio, TX (US)

(*) Notice: Subject to any disclaimer, the term of this patent is extended or adjusted under 35 U.S.C. 154(b) by 687 days.

(21) Appl. No.: 12/318,778

(22) Filed: Jan. 8, 2009
(Under 37 CFR 1.47)

Related U.S. Application Data

(60) Provisional application No. 61/006,357, filed on Jan. 8, 2008.

(51) Int. Cl.

| | |
|---|---|
| ***G06Q 30/02*** | (2012.01) |
| ***G06Q 10/06*** | (2012.01) |
| ***G06Q 40/04*** | (2012.01) |
| ***G06Q 20/40*** | (2012.01) |

(52) U.S. Cl.
USPC .................... 705/14.4; 705/14.69; 705/14.41; 705/14.43; 705/14.45; 705/7.12; 705/80; 705/37; 705/44

(58) Field of Classification Search
USPC ........................................................... 705/14
See application file for complete search history.

(56) References Cited

U.S. PATENT DOCUMENTS

| | | | | |
|---|---|---|---|---|
| 6,067,531 | A * | 5/2000 | Hoyt et al. | 705/35 |
| 2001/0032172 | A1* | 10/2001 | Moulinet et al. | 705/37 |
| 2002/0032643 | A1* | 3/2002 | Himmelstein | 705/37 |
| 2002/0095339 | A1* | 7/2002 | Galloway | 705/14 |
| 2002/0129056 | A1* | 9/2002 | Conant et al. | 707/511 |
| 2004/0083133 | A1* | 4/2004 | Nicholas et al. | 705/14 |
| 2004/0093286 | A1* | 5/2004 | Cooper et al. | 705/28 |
| 2004/0267611 | A1* | 12/2004 | Hoerenz | 705/14 |
| 2005/0171897 | A1* | 8/2005 | Forsythe et al. | 705/37 |
| 2005/0171908 | A1* | 8/2005 | Carlsen et al. | 705/44 |
| 2005/0267805 | A1* | 12/2005 | Tarantino | 705/14 |
| 2006/0031107 | A1* | 2/2006 | Aihara et al. | 705/7 |
| 2007/0050382 | A1* | 3/2007 | Bugir et al. | 707/100 |
| 2007/0073584 | A1* | 3/2007 | Grouf et al. | 705/14 |
| 2007/0244760 | A1* | 10/2007 | Bodnar et al. | 705/14 |
| 2010/0145801 | A1* | 6/2010 | Chekuri | 705/14.51 |

* cited by examiner

*Primary Examiner* — John G Weiss
*Assistant Examiner* — Vincent Cao
(74) *Attorney, Agent, or Firm* — Garlick & Markison; Edward J. Marshall

(57) ABSTRACT

A computerized method and system for managing a media advertising proposal from inception to completion of an order with one or more media outlets are described. An embodiment of the method includes receiving a customer request for placement of advertising in one or more media outlets, creating a media advertising proposal, that includes schedule of advertising for the requested placement, based on user inputs into a media proposal tool, storing the media advertising proposal in a database connected to the media proposal tool, accessing one or more external applications to integrate information and data into the media advertising proposal, assigning a grade to the media advertising proposal, entering the media advertising proposal into a computerized workflow in the media proposal tool for review and approval, and if the media advertising proposal is approved, injecting the media advertising proposal as an order into a traffic and billing system.

42 Claims, 46 Drawing Sheets

Advertiser
7 Eleven Inc.
Agency
PHD-USA NY-Troy MI
Attention: PHD-USA NY-Troy MI
Phone (212) 555-1212
FAX
Email:

CLEARCHANNEL (212) 555-1212
Phone
FAX
(212) 555-1212

Attn:
PHD-USA NY-Troy MI
900 Tower Drive
Troy, MI 48098

Title
Jumbo Giant Campaign II

Demo:
Persons 12+

PROPOSAL

SPOT SCHEDULE

WBIG - FM
Weeks: 9/10

| Start | End | Len | Daypart/Program | Spots | Rate | Cost | AQH Rtg | GRPs | CPP | AQH | %Mkt | Freq |
|---|---|---|---|---|---|---|---|---|---|---|---|---|
| 9/10/07 | 9/14/07 | 15 | Mon-Fri 10a-3p | 5 | $143 | $715 | 0.5 | 2.6 | $277 | 21.600 | 1.7 | 1.5 |
| | | | Weekly Total | 5 | | $715 | 0.5 | 2.6 | $276 | 21.600 | 2.6 | 1.6 |

Fig. 13E

CLEARCHANNEL

Daypart: 1. Mon-Fri 6am-10am; 2. Mon-Fri 10am-3pm; 3. Mon-Fri 3pm-7pm
Gender: Persons Start Age: 12 End Age: +
Book: Spring 2007

| Station | Daypart | Cume | Cume Rating | AQH | AQH Rating |
|---|---|---|---|---|---|
| WTOP-FM | 1. Mon-Fri 6am-10am | 540,400 | 12.9 | 70,600 | 1.7 |
| WPGC-FM | 1. Mon-Fri 6am-10am | 316,800 | 7.6 | 45,000 | 1.1 |
| WIHT-FM | 1. Mon-Fri 6am-10am | 301.300 | 7.2 | 26,800 | .6 |
| WHUR-FM | 1. Mon-Fri 6am-10am | 264,500 | 6.3 | 62,100 | 1.5 |
| WTOP-FM | 2. Mon-Fri 10am-3pm | 376,800 | 9.0 | 32,200 | .8 |
| WPGC-FM | 2. Mon-Fri 10am-3pm | 296,100 | 7.1 | 37,800 | .9 |
| WKYS-FM | 2. Mon-Fri 10am-3pm | 239,300 | 5.7 | 30,100 | .7 |
| WIHT-FM | 2. Mon-Fri 10am-3pm | 237,000 | 5.7 | 17,700 | .4 |
| WTOP-FM | 3. Mon-Fri 3Pm-7pm | 481,200 | 11.5 | 46,200 | 1.1 |
| WPGC-FM | 3. Mon-Fri 3Pm-7pm | 394,900 | 9.5 | 41.500 | 1.0 |

Fig. 15A

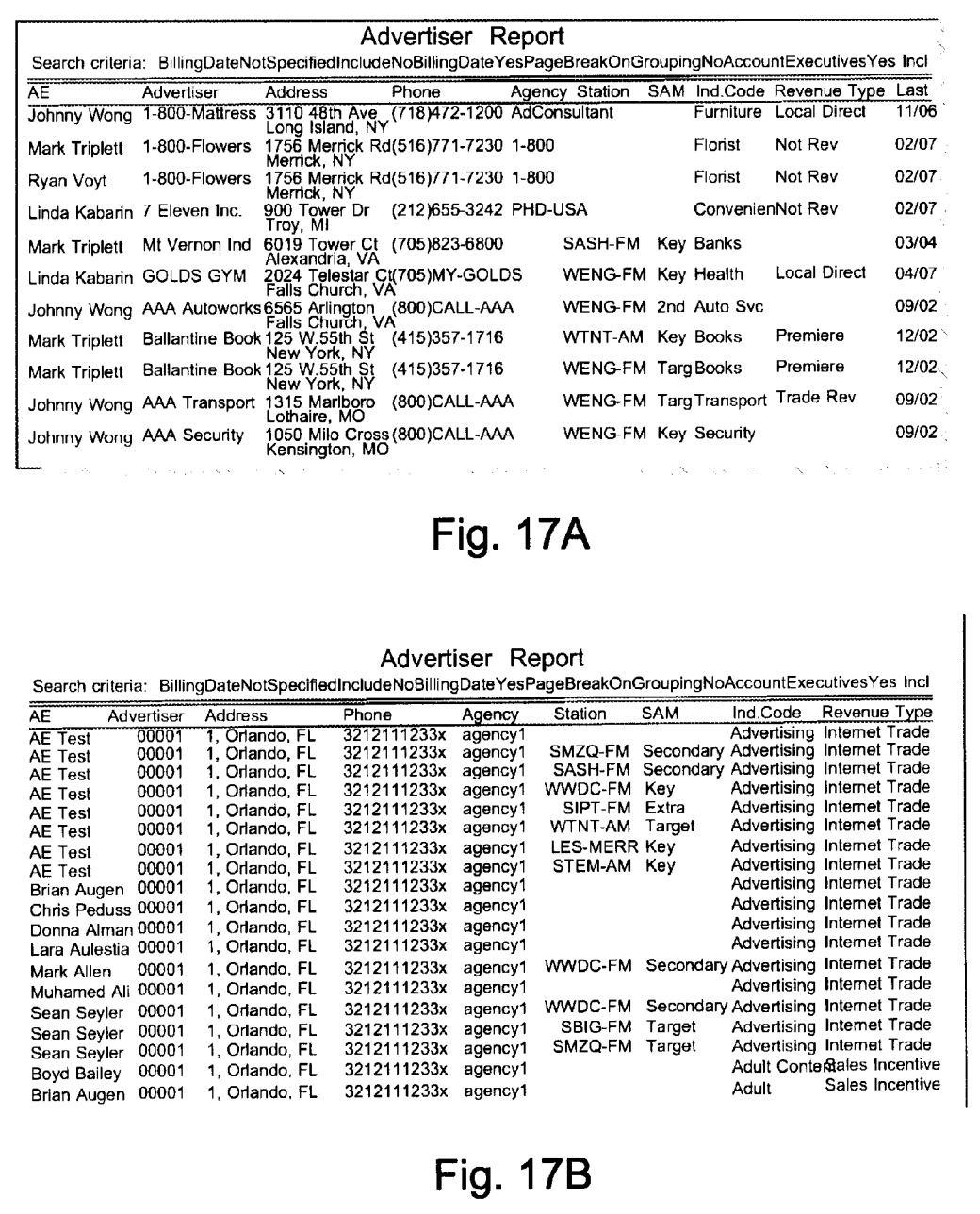

Advertiser Report

Search criteria: BillingDateNotSpecifiedIncludeNoBillingDateYesPageBreakOnGroupingNoAccountExecutivesYes Incl

| AE | Advertiser | Address | Phone | Agency | Station | SAM | Ind.Code | Revenue Type | Last |
|---|---|---|---|---|---|---|---|---|---|
| Johnny Wong | 1-800-Mattress | 3110 48th Ave Long Island, NY | (718)472-1200 | AdConsultant | | | Furniture | Local Direct | 11/06 |
| Mark Triplett | 1-800-Flowers | 1756 Merrick Rd Merrick, NY | (516)771-7230 | 1-800 | | | Florist | Not Rev | 02/07 |
| Ryan Voyt | 1-800-Flowers | 1756 Merrick Rd Merrick, NY | (516)771-7230 | 1-800 | | | Florist | Not Rev | 02/07 |
| Linda Kabarin | 7 Eleven Inc. | 900 Tower Dr Troy, MI | (212)655-3242 | PHD-USA | | | Convenien | Not Rev | 02/07 |
| Mark Triplett | Mt Vernon Ind | 6019 Tower Ct Alexandria, VA | (705)823-6800 | | SASH-FM | Key | Banks | | 03/04 |
| Linda Kabarin | GOLDS GYM | 2024 Telestar Ct Falls Church, VA | (705)MY-GOLDS | | WENG-FM | Key | Health | Local Direct | 04/07 |
| Johnny Wong | AAA Autoworks | 6565 Arlington Falls Church, VA | (800)CALL-AAA | | WENG-FM | 2nd | Auto Svc | | 09/02 |
| Mark Triplett | Ballantine Book | 125 W.55th St New York, NY | (415)357-1716 | | WTNT-AM | Key | Books | Premiere | 12/02 |
| Mark Triplett | Ballantine Book | 125 W.55th St New York, NY | (415)357-1716 | | WENG-FM | Targ | Books | Premiere | 12/02 |
| Johnny Wong | AAA Transport | 1315 Marlboro Lothaire, MO | (800)CALL-AAA | | WENG-FM | Targ | Transport | Trade Rev | 09/02 |
| Johnny Wong | AAA Security | 1050 Milo Cross Kensington, MO | (800)CALL-AAA | | WENG-FM | Key | Security | | 09/02 |

Fig. 17A

Advertiser Report

Search criteria: BillingDateNotSpecifiedIncludeNoBillingDateYesPageBreakOnGroupingNoAccountExecutivesYes Incl

| AE | Advertiser | Address | Phone | Agency | Station | SAM | Ind.Code | Revenue Type |
|---|---|---|---|---|---|---|---|---|
| AE Test | 00001 | 1, Orlando, FL | 3212111233x | agency1 | | | Advertising | Internet Trade |
| AE Test | 00001 | 1, Orlando, FL | 3212111233x | agency1 | SMZQ-FM | Secondary | Advertising | Internet Trade |
| AE Test | 00001 | 1, Orlando, FL | 3212111233x | agency1 | SASH-FM | Secondary | Advertising | Internet Trade |
| AE Test | 00001 | 1, Orlando, FL | 3212111233x | agency1 | WWDC-FM | Key | Advertising | Internet Trade |
| AE Test | 00001 | 1, Orlando, FL | 3212111233x | agency1 | SIPT-FM | Extra | Advertising | Internet Trade |
| AE Test | 00001 | 1, Orlando, FL | 3212111233x | agency1 | WTNT-AM | Target | Advertising | Internet Trade |
| AE Test | 00001 | 1, Orlando, FL | 3212111233x | agency1 | LES-MERR | Key | Advertising | Internet Trade |
| AE Test | 00001 | 1, Orlando, FL | 3212111233x | agency1 | STEM-AM | Key | Advertising | Internet Trade |
| Brian Augen | 00001 | 1, Orlando, FL | 3212111233x | agency1 | | | Advertising | Internet Trade |
| Chris Peduss | 00001 | 1, Orlando, FL | 3212111233x | agency1 | | | Advertising | Internet Trade |
| Donna Alman | 00001 | 1, Orlando, FL | 3212111233x | agency1 | | | Advertising | Internet Trade |
| Lara Aulestia | 00001 | 1, Orlando, FL | 3212111233x | agency1 | | | Advertising | Internet Trade |
| Mark Allen | 00001 | 1, Orlando, FL | 3212111233x | agency1 | WWDC-FM | Secondary | Advertising | Internet Trade |
| Muhamed Ali | 00001 | 1, Orlando, FL | 3212111233x | agency1 | | | Advertising | Internet Trade |
| Sean Seyler | 00001 | 1, Orlando, FL | 3212111233x | agency1 | WWDC-FM | Secondary | Advertising | Internet Trade |
| Sean Seyler | 00001 | 1, Orlando, FL | 3212111233x | agency1 | SBIG-FM | Target | Advertising | Internet Trade |
| Sean Seyler | 00001 | 1, Orlando, FL | 3212111233x | agency1 | SMZQ-FM | Target | Advertising | Internet Trade |
| Boyd Bailey | 00001 | 1, Orlando, FL | 3212111233x | agency1 | | | Adult Conte | Sales Incentive |
| Brian Augen | 00001 | 1, Orlando, FL | 3212111233x | agency1 | | | Adult | Sales Incentive |

Fig. 17B

Agency Report

Search criteria: BillingDateNotSpecifiedIncludeNoBillingDateYesPageBreakOnGroupingNoAccountExecutivesYes Incl

| Agency | Address | Contact | Station | Phone | DUNS No. | EDI | Comm % | Last Billing |
|---|---|---|---|---|---|---|---|---|
| 00001 | 1, Orlando, FL | | | 3121231123 | | | 0.00% | |
| 08-01 | 1, Orange, CA | | | 3121231123 | 072964385 | | 0.00% | |
| 08-02 | 1, Orange, CA | | | 3121231123 | | | 0.00% | |
| 08test | 1, Orange, CA | | SBIG-FM | 3121231123 | | | 0.00% | |
| Sean's 2nd Agency | 129 East Amelia Orlando, FL | | WTEM-FM | (312)213-1123 | | | 0.00% | |
| Sean's 2nd Agency | 129 East Amelia Orlando, FL | | WTEM-FM | (312)213-1123 | | | 0.00% | |
| Sean's 2nd Agency | 129 East Amelia Orlando, FL | | WTEM-FM | (312)213-1123 | | | 0.00% | |
| Sean's 2nd Agency | 129 East Amelia Orlando, FL | | WTEM-FM | (312)213-1123 | | | 0.00% | |
| Sean's 2nd Agency | 129 East Amelia Orlando, FL | | WTEM-FM | (312)213-1123 | | | 0.00% | |
| 1-800-FLOWERS | 1 Old Country Road Carle Place, NY | | WASH-FM | (516)237-6000 | 808998355 | | 0.00% | |
| 1-800-FLOWERS | 1 Old Country Road Carle Place, NY | | WASH-FM | (516)237-6000 | 808998355 | | 0.00% | |
| 1-800-FLOWERS | 1 Old Country Road Carle Place, NY | | WASH-FM | (516)237-6000 | 808998355 | | 0.00% | |
| 1-800-FLOWERS | 1 Old Country Road Carle Place, NY | | WASH-FM | (516)237-6000 | 808998355 | | 0.00% | |
| 1-800-FLOWERS | 1 Old Country Road Carle Place, NY | | WMZQ-FM | (516)237-6000 | 808998355 | | 0.00% | |
| 1-800-FLOWERS | 1 Old Country Road Carle Place, NY | | WMZQ-FM | (516)237-6000 | 808998355 | | 0.00% | |

Fig. 17C

Master Advertiser/Agency Report

Search criteria: AccountExecutives:AllIncludeUnassigned[AccountExecutives]:NoStations:AllSAMCategories:AllBilling

| Name | Address | Attention | Phone | AE | Station | SAM | Comm % | Last Billing |
|---|---|---|---|---|---|---|---|---|
| Type: Advertiser | | | | | | | | |
| 00001 | 1, Orlando, FL | | 3121231123 | | | | | |
| 00001 | 1, Orlando, FL | | 3121231123 | AEtest | LES-MERR | Key | | |
| 00001 | 1, Orlando, FL | | 3121231123 | AEtest | SASH-FM | Secondary | | |
| 00001 | 1, Orlando, FL | | 3121231123 | AEtest | WWDC-FM | Key | | |
| 00001 | 1, Orlando, FL | | 3121231123 | AEtest | WTNT-AM | Target | | |
| 00001 | 1, Orlando, FL | | 3121231123 | AEtest | SIHT-FM | Extra | | |
| 00001 | 1, Orlando, FL | | 3121231123 | AEtest | SMZQ-FM | Secondary | | |
| 00001 | 1, Orlando, FL | | 3121231123 | AEtest | STEM-AM | Key | | |
| 00001 | 1, Orlando, FL | | 3121231123 | Brian Augen | | | | |
| 00001 | 1, Orlando, FL | | 3121231123 | Chris Peduss | | | | |
| 00001 | 1, Orlando, FL | | 3121231123 | Donna Alman | | | | |
| 00001 | 1, Orlando, FL | | 3121231123 | Lara Aulestia | | | | |
| 00001 | 1, Orlando, FL | | 3121231123 | Mark Allen | WWDC-FM | Secondary | | |
| 00001 | 1, Orlando, FL | | 3121231123 | Muhamed Ali | | | | |
| 00001 | 1, Orlando, FL | | 3121231123 | Sean Seyler | SMZQ-FM | Target | | |
| 00001 | 1, Orlando, FL | | 3121231123 | Sean Seyler | SBIG-FM | Target | | |
| 00001 | 1, Orlando, FL | | 3121231123 | Sean Seyler | WWDC-FM | Secondary | | |
| 00001 | 1, Orlando, FL | | 3121231123 | Boyd Bailey | | | | |

Fig. 17D

One on One Report

Account Executive: Linda Kabarin
Sales Manager:

New Prospect Since: 8/16/2007
Account Account Type: SAM Next Steps:

Pitched and Pending
(All Actual dollar amounts are weighted by the grade)

| Advertiser | SAM | Status | Grade | Aug Actual | Sept Actual | Oct Actual | Nov Actual | Dec Actual | Jan Actual | 6 mo. Total Actual |
|---|---|---|---|---|---|---|---|---|---|---|
| 7 Eleven Inc | | PC | | $0 | $1,553 | $0 | $0 | $0 | $0 | $1,553 |
| Totals | | | | $0 | $1,553 | $0 | $0 | $0 | $0 | $1,553 |

Fig. 17E

Pending Business Report

Search Criteria: AdvertisersAllAccountExecutivesAllStationsWBIG-FM,WASH-FMStartMonitorYear2007

| Advertiser | AE | POC | Status | Station | Start Date | Wks | Wkly Goal Demo | Wkly Goal GRP | Wkly Proposed SPW | Wkly Proposed GRP | Wkly Proposed CPP | Sep | Oct | Nov | Dec | Jan | Feb | Total |
|---|---|---|---|---|---|---|---|---|---|---|---|---|---|---|---|---|---|---|
| Beazer Homes | Okayla Smith | A-98% | RA | WASH | 9/05 | 1 | A12+ | | 76 | 2 | 367 | $9808 | $0 | $0 | $0 | $0 | $0 | $9808 |
| | | | | | | | | | | | | $9808 | $0 | $0 | $0 | $0 | $0 | $9808 |
| Fairfax Homes | Jane Eury | A-98% | PT-M | WASH | 9/27 | 1 | A12+ | | 12 | 1 | 569 | $3136 | $0 | $0 | $0 | $0 | $0 | $3136 |
| | | | | | | | | | | | | $3136 | $0 | $0 | $0 | $0 | $0 | $3136 |
| Federal Realty | Okayla Smith | A-98% | RA | WASH | 10/15 | 1 | A12+ | | 50 | 3 | 492 | $0 | $7350 | $0 | $0 | $0 | $0 | $7350 |
| | | | | | | | | | | | | $0 | $7350 | $0 | $0 | $0 | $0 | $7350 |
| JCPenney | O.Smith | A-98% | PT-M | WASH | 11/01 | 1 | A12+ | | 6 | 1 | 327 | $0 | $0 | $1000 | $0 | $0 | $0 | $1000 |
| JCPenney | O.Smith | A-98% | PT-M | WASH | 11/15 | 1 | A12+ | | 6 | 1 | 327 | $0 | $0 | $1000 | $0 | $0 | $0 | $1000 |
| JCPenney | O.Smith | A-98% | PT-M | WASH | 11/19 | 1 | W1849 | | 6 | 1 | 414 | $0 | $0 | $1000 | $0 | $0 | $0 | $1000 |
| JCPenney | O.Smith | A-98% | PT-M | WASH | 11/29 | 1 | A12+ | | 6 | 1 | 295 | $0 | $0 | $0 | $1000 | $0 | $0 | $1000 |
| | | | | | | | | | | | | $0 | $0 | $3000 | $1000 | $0 | $0 | $4000 |
| National Theatre | Michael Caruso | A-98% | PT-M | WBIG | 09/10 | 1 | A12+ | | 24 | 14 | 266 | $3131 | $0 | $3131 | $15656 | $0 | $0 | $21918 |
| National Theatre | Michael Caruso | A-98% | PT-M | WBIG | 09/10 | 1 | A12+ | | 8 | 8 | 329 | $789 | $0 | $789 | $3944 | $0 | $0 | $5522 |

Fig. 17F

Scheduled Revenue Summary Report

Washington DC 2007

Year:2007 Stations: All Revenue Types: All Misc Revenue Types: All Account Executives:All Agencies: All Advertisers:All Break Types:All SAM Categories:All Monthly/Quarterly:Monthly Broadcast/Calendar:Broadcast Summary/Detailed:Summary Group By:

ADVERTISER SUMMARY

| | | | | | 2007 | | | 2006 | | | AMR | | |
|---|---|---|---|---|---|---|---|---|---|---|---|---|---|
| | 2007 | 2006 | vs.LY$ | vs.LY% | 60's | 30's | Other | 60's | 30's | Other | 2007 | 2006 | vs.LY% |
| Jan | 1,543,932 | 877,696 | 666,236 | 76% | 881,594 | 444,698 | 217,640 | 514,712 | 298,934 | 64,050 | 212,479 | 102,260 | 108% |
| Exist. | 1,509,747 | 846,741 | 663,006 | 78% | 861,274 | 439,413 | 209,060 | 502,362 | 284,369 | 60,010 | 210,100 | 99,575 | 111% |
| New | 34,185 | 30,955 | 3,230 | 10% | 20,320 | 5,285 | 8,580 | 12,350 | 14,565 | 4,040 | 2,702 | 2,685 | 1% |
| Feb | 1,606,177 | 1,026,335 | 579,842 | 56% | 873,877 | 572,754 | 159,546 | 573,412 | 336,768 | 116,155 | 132,723 | 183,539 | -28% |
| Exist. | 1,588,552 | 991,810 | 596,742 | 60% | 868,297 | 566,649 | 153,606 | 570,787 | 317,703 | 103,320 | 130,432 | 179,812 | -27% |
| New | 17,625 | 34,525 | (16,900) | -49% | 5,580 | 6,105 | 5,940 | 2,625 | 19,065 | 12,835 | 1,291 | 3,763 | -66% |
| Mar | 1,291,896 | 1,209,197 | 82,699 | 7% | 737,067 | 421,226 | 133,603 | 703,445 | 372,236 | 133,516 | 124,292 | 192,258 | -35% |
| Exist. | 1,268,580 | 1,171,377 | 97,203 | 8% | 735,987 | 413,374 | 119,219 | 698,915 | 349,906 | 122,556 | 123,580 | 188,668 | -34% |
| New | 23,316 | 37,820 | (14,504) | -38% | 1,080 | 7,852 | 14,384 | 4,530 | 22,330 | 10,960 | 712 | 4,497 | -84% |
| Apr | 762,828 | 1,633,217 | (870,389) | -53% | 403,305 | 294,051 | 65,472 | 976,657 | 521,685 | 134,875 | 106,139 | 211,928 | -50% |
| Exist. | 745,677 | 1,580,367 | (834,690) | -53% | 401,955 | 283,219 | 60,503 | 950,667 | 508,001 | 121,699 | 104,927 | 207,854 | -50% |
| New | 17,151 | 52,850 | (35,699) | -68% | 1,350 | 10,832 | 4,969 | 25,990 | 13,684 | 13,176 | 1,212 | 4,183 | -71% |
| May | 681,920 | 1,675,149 | (993,229) | -59% | 464,599 | 180,061 | 37,260 | 1,163,622 | 383,626 | 127,901 | 82,781 | 191,810 | -57% |
| Exist. | 680,340 | 1,628,799 | (948,459) | -58% | 463,519 | 180,061 | 36,760 | 1,135,387 | 367,956 | 125,456 | 82,686 | 188,951 | -56% |
| New | 1,580 | 46,350 | (44,770) | -97% | 1,080 | 0 | 500 | 28,235 | 15,670 | 2,445 | 95 | 2,859 | -97% |
| Jun | 480,527 | 1,532,261 | (1,051,734) | -59% | 295,533 | 151,378 | 33,616 | 992,625 | 386,342 | 153,294 | 98,757 | 212,092 | -53% |
| Exist. | 479,047 | 1,455,776 | (976,729) | -58% | 294,453 | 151,378 | 33,216 | 982,445 | 337,361 | 135,970 | 98,662 | 196,272 | -52% |
| New | 1,480 | 76,485 | (75,005) | -97% | 1,080 | 0 | 400 | 10,180 | 48,981 | 17,324 | 95 | 5,887 | -98% |
| Jul | 390,940 | 1,931,153 | (1,540,213) | -80% | 246,481 | 103,858 | 40,601 | 1,073,621 | 518,421 | 339,111 | 80,263 | 201,462 | -60% |
| Exist. | 389,490 | 1,855,834 | (1,466,344) | -79% | 245,131 | 103,858 | 40,501 | 1,065,091 | 484,557 | 306,186 | 80,168 | 196,272 | -59% |
| New | 1,450 | 75,913 | (73,869) | -98% | 1,350 | 0 | 100 | 8,530 | 33,864 | 32,925 | 95 | 6,031 | -98% |
| Aug | 311,112 | 1,294,183 | (983,071) | -76% | 185,183 | 98,190 | 27,739 | 712,658 | 423,696 | 157,829 | 93,612 | 205,789 | -55% |
| Exist. | 310,032 | 1,236,486 | (926,454) | -75% | 184,103 | 98,190 | 27,739 | 702,035 | 393,221 | 141,230 | 93,597 | 193,672 | -54% |
| New | 1,080 | 57,697 | (56,617) | -98% | 1,080 | 0 | 0 | 10,623 | 30,475 | 16,599 | 15 | 4,379 | -100% |
| Sep | 435,610 | 1,735,308 | (1,299,698) | -75% | 262,485 | 142,212 | 30,913 | 917,800 | 548,861 | 268,647 | 83,911 | 200,457 | -58% |
| Exist. | 431,240 | 1,628,893 | (1,197,653) | -74% | 261,135 | 139,232 | 30,873 | 882,564 | 507,456 | 238,873 | 83,624 | 193,672 | -57% |
| New | 4,370 | 106,415 | (102,245) | -96% | 1,350 | 2,980 | 40 | 35,236 | 41,405 | 29,774 | 287 | 6,850 | -96% |

Fig. 17G

SYSTEM AND METHOD FOR CREATING AND MANAGING MEDIA ADVERTISING PROPOSALS

CROSS-REFERENCE TO RELATED APPLICATION(S)

This application is related to and claims the priority of U.S. Provisional Patent Application Ser. No. 61/006,357, entitled "SYSTEM AND METHOD FOR CREATING A RADIO ADVERTISING SELLING TOOL." filed Jan. 8, 2008, which is hereby incorporated by reference.

BACKGROUND

Prior to the systems and methods described herein, the media selling process and media selling tools lacked key features to harness the new technologies and new products. Media advertising was sold from a static quantity and priced on very basic input parameters. Available systems were disconnected and non-extensible and little if any workflow was available. Systems and tools did not have intelligence to learn process changes as business began to shift into new eras and did not provide even a manual work around. The sellers, managers and back office processors had no choice but to rely on brute force manual efforts.

SUMMARY

Embodiments described herein overcome the disadvantages of the prior art and provide a number of advantages and new features. These advantages and others are provided by a computerized method for managing a media advertising proposal from inception to completion of an order with one or more media outlets. Embodiments of the method include receiving a customer request for placement of advertising in one or more media outlets, creating a media advertising proposal, that includes schedule of advertising for the requested placement, based on user inputs into a media proposal tool, storing the media advertising proposal in a database connected to the media proposal tool, accessing one or more external applications to integrate information and data into the media advertising proposal, assigning a grade to the media advertising proposal, entering the media advertising proposal into a computerized workflow in the media proposal tool for review and approval, and if the media advertising proposal is approved, injecting the media advertising proposal as an order into a traffic and billing system. Other features and advantages of embodiments of the method are apparent from the description and claims below. Other embodiments include a computer readable medium including instructions for executing the method.

These advantages and others are provided by a computerized method for managing an advertising proposal from inception to completion of an order with one or more media outlets. Embodiments of the method include receiving a customer request for placement of advertising in one or more media outlets, receiving advertising parameters, for a media advertising proposal for the requested placement, in a media proposal tool, freezing costs of advertising in the media advertising proposal for a set period of time, determining if period of time for freezing costs has expired, if not expired, incrementing a counter keeping track of period of time, determining if the media advertising proposal has been accepted by customer, if the media advertising proposal is accepted by customer, entering the media advertising proposal into a computerized workflow for review and approval, and if the media advertising proposal is approved, injecting the media advertising proposal as an order into a traffic and billing system. Other features and advantages of embodiments of the method are apparent from the description and claims below. Other embodiments include a computer readable medium including instructions for executing the method.

These advantages and others are provided by a computerized system for managing an advertising proposal from inception to completion of an order with one or more media outlets. Embodiments of the system include a server that hosts a media proposal tool for creating media advertising proposals that include schedules of advertising on one or more media outlets based on user inputs into a media proposal tool, a media proposal tool database server, one or more application servers, connected to the media proposal tool server, that include data and information utilized by the media proposal tool for creating media advertising proposals, including advertising scheduling availability data, and one or more workstations for displaying graphical user interfaces (GUIs) for viewing media advertising proposals and the information from the one or more database servers, and for entering user input that is used to create the media advertising proposals. The media proposal tool includes instructions stored in memory on the server for creating the media advertising proposal, storing the media advertising proposal in the media proposal tool database, accessing the one or more applications servers to integrate the data and information into the media advertising proposal, entering the media advertising proposal into a computerized workflow in the media proposal tool for review and approval, and if the media advertising proposal is approved, injecting the media advertising proposal as an order into a traffic and billing system in communication with the media proposal tool server.

DESCRIPTION OF THE DRAWINGS

The detailed description will refer to the following drawings, wherein like numerals refer to like elements, and wherein:

FIG. 13E illustrates an excerpt of a printed sample proposal.

FIG. 15A illustrates a report format according to embodiments of the present disclosure.

FIGS. 17A-17G illustrate excerpts of various reports according to embodiments of the present disclosure.

DETAILED DESCRIPTION

Figure 1:
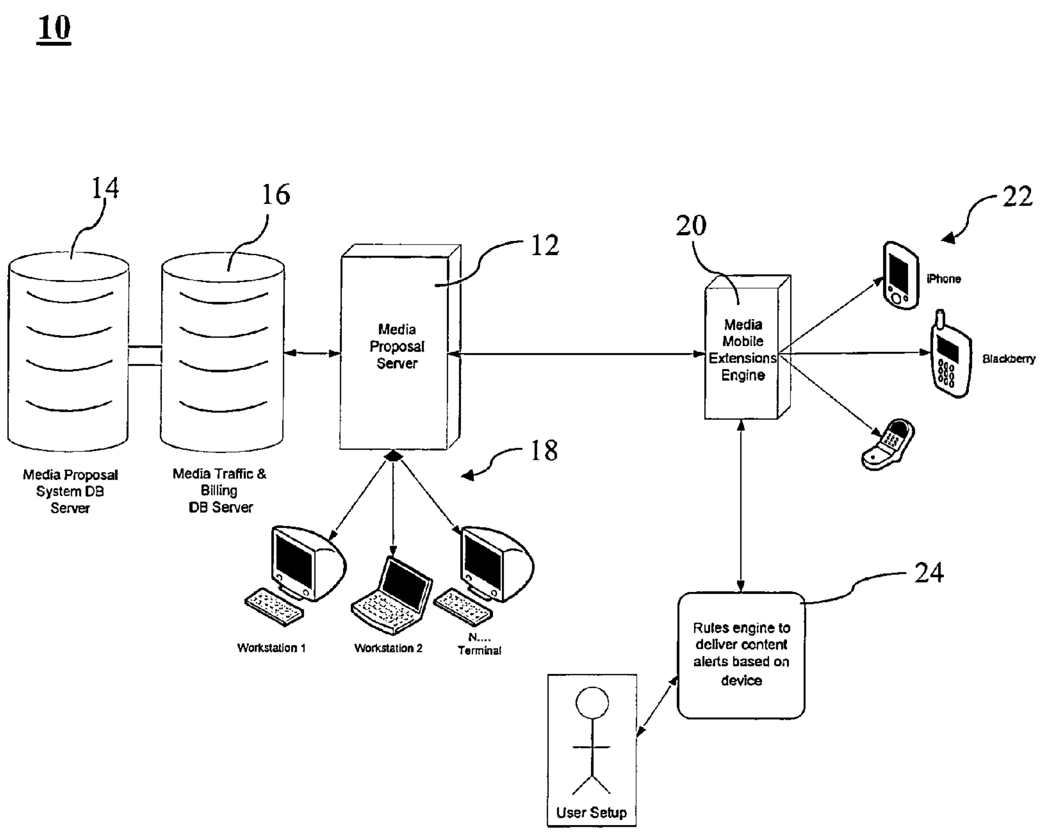
FIG. 1 is a block diagram illustrating an embodiment of a system for creating and managing advertising proposals from inception to completion.

Described herein are systems and methods for creating and managing media advertising proposals from inception to completion. Media advertising proposals (also referred to herein as media proposals or simply proposals) are advertising placement schedules (which may be defined based on various goals, restrictions and criteria for scheduling the advertisement airing) and costs for placing advertising on various media outlets/sources (e.g., radio stations, television stations, internet sites, magazines, newspapers, and other periodicals, billboards, video billboards etc.). Embodiments of the system and method enable, e.g., advertising professionals to create advertising proposals, including advertising campaign proposals, optimize proposals based on feedback and results, mine and incorporate business intelligence data to create better proposals, utilize feedback and other data for more efficient advertising placement, use input from multiple sources to create proposals, create proposals placing advertisements in multiple media types and outlets, extend the proposals to mobile devices and otherwise to enact real-time advertising placement transactions, uniquely and effectively display availability data across multiple media types and schedules, and otherwise more efficiently place advertising and utilize advertising capacity.

Embodiments described herein may be implemented as a media outlet selling system with advanced and unique features to learn, adapt and leverage new technological processes and products. Key advantages include the ability provide media seller's, managers and back office personnel a consistent view and process of all the products the media outlet offers. This consistent view is the result of consistent data and processes that give top level executives rollup reporting. In addition, embodiments contain the ability to incorporate feedback as the dynamics of scheduling and execution of advertisements occurs. Because of tight integration with systems such as traffic and billing, yield management, audience delivery data, business intelligence data and other enterprise systems, embodiments are able to react and adapt to a quickly changing landscape for media advertising. Another key advantage is the feedback looping and integration between all these systems enriches the goals and scenarios capabilities beyond prior art.

Embodiments provide an advertising sales automation and advertising customer relationship manager (CRM) tool, referred to herein as the media proposal system or tool. The media proposal system described herein may be implemented as a software application that runs on a server accessed by various workstations and mobile devices. Such application may be operated by users for a media outlet, an enterprise of media outlets or other organizations as would be apparent to one of ordinary skill in the art. The proposals referred to herein are proposals for placing advertising, or campaigns of advertising, in or on any of a variety of media (e.g., radio, television, internet, print, periodicals, billboards, video billboards, etc.). An embodiment of the media proposal system is VIERO® Fusion. The media proposal system is a CRM tool for expediting the work process for sales account executives in media advertising, e.g., radio, television, internet, newspaper advertising. Such account executives may work, for example, for a radio advertising agency, radio station or advertiser. Those having skill in the art will recognize that the "account executives" are not the only users that may use the media proposal tool. For example, sales managers having oversight of the various account executives may also be users of the media proposal tool, as may be business managers (who supervise sales managers and provide an additional layer of review, traffic managers (who are responsible for injecting orders into traffic and billing and provide yet another additional layer of review) and others involved in the sales process.

Those skilled in the art will understand that the media proposal tool may be used to track and manage advertisements for a number of different mediums and media, such as, without limitation, satellite, terrestrial and Internet-based radio, print, television, billboards, video billboards, etc. The media proposal tool allows an account executive to create an electronic media advertising proposal that reflects up-to-the-minute inventories and demand and reservation-reflective pricing. The media proposal tool provides electronic review and approval from proposal creation to maturity as a customer order. The media proposal tool allows an account executive to use business intelligence inputs to prospect leads, manage contacts and maintain critical historical information for sales accounts. Because all sales activity may be tied to client records for easy reporting and personalized selling, the media proposal tool allows an account executive to easily see the entire sales cycle from the first contact to emails, appointments, proposals and orders (the "order history"). The media proposal tool may integrate with an email system such as Microsoft Exchange Server for Calendar, Contacts, Email, Tasks and Notes so as to utilize navigation and graphical user interface (GUI) layouts already familiar to account executives.

The media proposal tool may also integrate and interact with other tools and systems. For example, embodiments of the media proposal system described herein may integrate and interact with various enterprise and media management solutions, such as without limitation: VIERO® Revenue Management Solution (RMS), a traffic and billing system, (embodiments of which are described in U.S. patent application Ser. No. 11/419,492, entitled "System and Method for Scheduling Advertisements," which is hereby incorporated by reference (the "RMS application")); VIERO® BESTRATE Yield Management Solution, a yield management or pricing engine, (embodiments of which are described in U.S. Pat. No. 7,386,492, and U.S. patent application Ser. No. 12/081,905, both entitled "Inventory and Revenue Maximization Method and System," which are hereby incorporated by reference (the "BestRate applications")); VIERO® transACT, a platform that provides just-in-time advertising and extensibility to internal and external partners, (embodiments of which are described in U.S. Provisional Patent Application Ser. No. 61/064,665, entitled "System and Method for Integrated, Automated Inventory Management and Advertisement and Delivery," which is hereby incorporated by reference (the "transACT application"); AirWaves, a goals-based audience delivery system, (embodiments of which are described in U.S. Provisional Patent Application Ser. No. 61/064,916, entitled "Systems and Method for Predicting and Achieving Required Levels of Advertising," which is hereby incorporated by reference (the "AirWaves application"); VIERO® Media Executive Reporting Solution (MERS); VIERO® Strategic Account Management; and electronic Public Inspection File (e-PIF)), as well as various other tools available to media companies and/or described below.

In an embodiment, the media proposal tool utilizes Microsoft .Net and click-once technologies to enhance scalability, and provide an open standards architecture that reliably integrates with other systems and delivers multi-platform stability. Such platforms may include, for example, Windows Vista, Windows 2000, Window XP, Windows 2003 and various web browsers. Note that Microsoft .Net and these platforms are merely given as examples and are in no way meant to limit the media proposal tool or embodiments of the systems and methods described herein.

With reference now to FIG. 1, shown is a diagram illustrating components of an embodiment of media proposal system 10 for creating and managing media advertising proposals. Those having skill in the art will appreciate that the media proposal tool may be provided through a tiered architecture. In the embodiment of FIG. 1, for example, shown is a three-tiered architecture. Media proposal system 10 shown includes a media proposal server 12, media proposal system database (DB) server 14, media traffic and billing DB server 16, and a plurality of workstations and system terminals 18. An account executive at a client computer (e.g., work station 18) may access the media proposal tool hosted at an application server (e.g., media proposal server 12).

Media proposal server 12 may be tasked with executing the application or business logic of the media proposal tool 10. Media proposal server 12, accordingly, may include standard server components such as processor(s), memory, secondary storage devices (e.g., hard drives, flash drives, disk drives), input, display and output device. Media proposal server 12 may be implemented as a blade server and may include a plurality of physical servers. As indicated herein, media proposal system 10 may be implemented as a software application. Such a software application may include instructions stored on memory and/or secondary storage devices and executed by processor(s) of media proposal server 12. Such software application may, when executed, perform the methods, processes and various functions, and generate and display the various graphical user interfaces of media proposal system 10 described and illustrated herein. Such methods, processes and functions may be implemented as modules of software application implementation of media proposal system 10, either as part of such software application or as independent components.

Media proposal server 12 may further rely on one or more a database servers for data access logic in interacting with a sales information database (e.g., media traffic and billing DB server 16) and a media advertising proposal database (e.g., media proposal system DB server 14). The database servers and databases may be provided, for example, using Microsoft SQL Server 2008, wherein the database servers may execute queries, inserts, etc. with the databases using, for example, SQL query language. Media advertising proposal database 14 may store advertiser records, user records, media advertising proposals, reports, and other records accessed, used and created using media proposal system 10 as described herein. Additional database servers, e.g., corresponding various media management solutions described above, may be integrated with and connected to media proposal system 10 (e.g., via an ISL server) in order to provide functionality described herein (see, e.g., description of FIG. 16 below). Those having skill in the art will understand that a relational database management system offered by Oracle or IBM, or some other suitable system, may just as easily be used. Also, those having skill in the art will appreciate that the media proposal system 10 disclosed herein may also be provided in a one- or two-tier or four-tiered architecture, or via such architecture, e.g., multi-tiered Service Oriented Architecture, as may be best suited for the environment and extensibility in which the media proposal tool is used. Those skilled in the art will understand that system 10 may provide clients and servers with various configurations. For example, system 10 may include a database server and an application server.

Those skilled in the art will understand that clients and servers may include various components, such as processors, memory, secondary storage devices such as hard-drives, DVD- and CD-ROM drives and memory sticks, input devices, output devices, displays, etc. The memory, secondary storage devices and other computer readable media of servers, such as media proposal server 12, and workstations 18, may include instructions for execution by processors for performing the functions, providing the displays, windows, panes and other graphical user interfaces (GUIs) described herein and executing the methods described herein.

Those of having skill in the art will also appreciate that an account executive may access and use media proposal tool 10 via handheld or mobile device, such as the PDA or cell phone. Indeed, with continuing reference to FIG. 1, media proposal system 10 is shown to include a media mobile extensions engine 20 and multiple mobile devices 22. Media mobile extensions engine 20 processes information, displays, user interfaces, etc., provided by media proposal system 10 (as described herein), for transmission to and display on the mobile devices 22. For example, engine 20 will process information and GUIs from media proposal system for transmission to and display on Smartphones such as the iPhone, so that mobile users can view and interact with that information. In this manner, mobile devices 22 may act as mobile workstations providing mobile access and use of media proposal system 10. Media mobile extensions engine 20 may include rules engine 24 which enables users to set up rules for delivering content alerts from media proposal system 10 to mobile devices 22.

Those skilled in the art will understand that media proposal tool 10 may be implemented using Microsoft's One-Click technology and ASP.net technology and incorporate XML web services to enable applications to communicate and share data over the internet regardless of operating system or programming language. Those skilled in the art will also understand that media proposal system 10 may also be implemented using other similar technologies.

Figure 2:
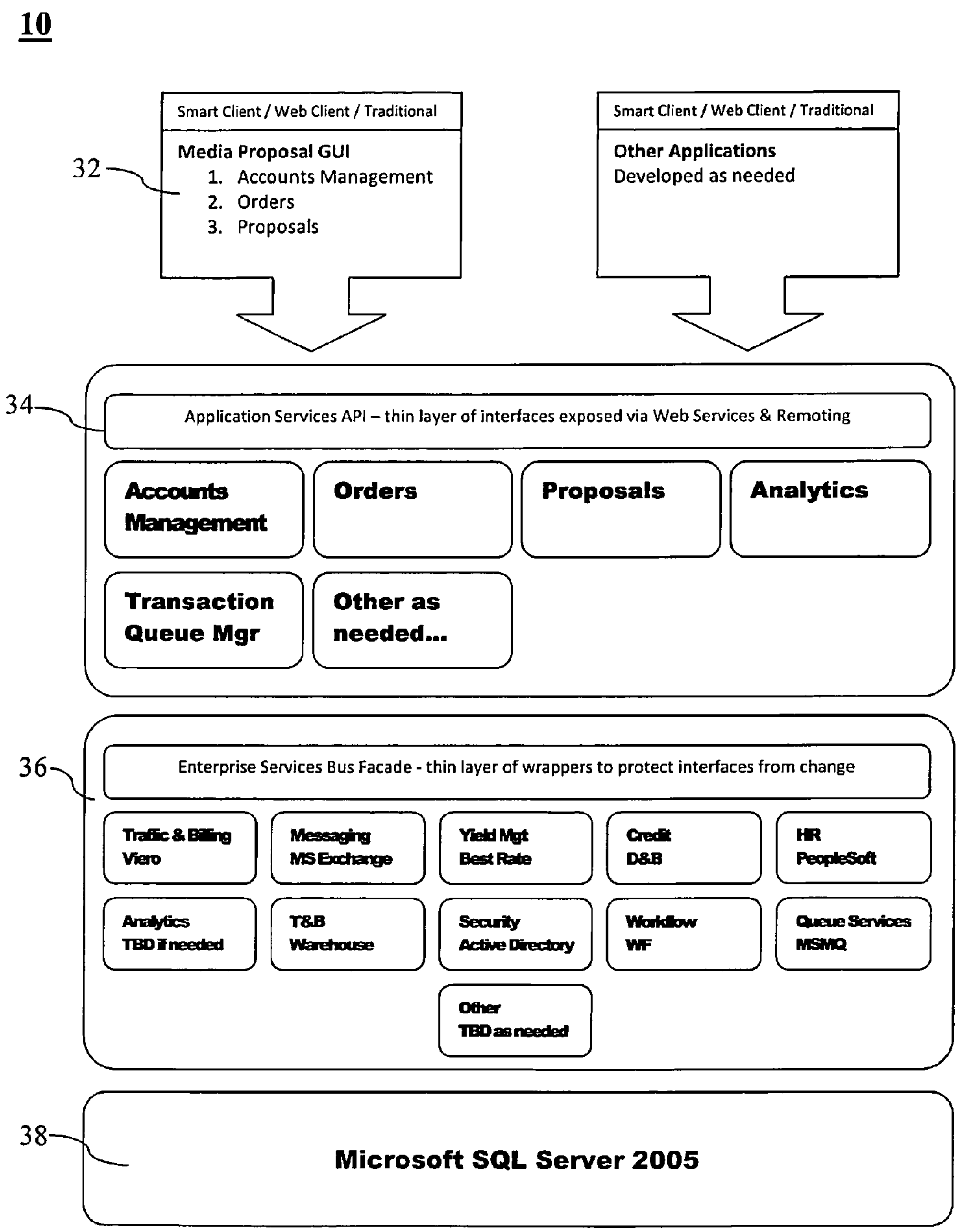
FIG. 2 is a diagram illustrating architecture of a software implementation of an embodiment of system for creating and managing advertising proposals from inception to completion.

With reference now to FIG. 2, shown is a diagram illustrating components of the software architecture of an embodiment of the media proposal tool 10. As shown, media proposal system 10 may include user interface layer 32, platform layer 34, enterprise services bus layer 36, and database platform layer 38.

The user interface layer 32 allows an account executive to access and interact with the media proposal tool 10. The user interface may be accessed through the client computer, such as a workstation or handheld or mobile device such as a PDA or cell phone. In an embodiment, the user interface layer 32 provides a GUI for such interaction. Those having skill in the art will understand that a media proposal GUI (see, e.g., FIG. 4) may be provided via a thin client, smart client, traditional client application or other suitable application configuration, and that an account executive may connect to the platform layer 34 via, e.g., a Web services or .net remoting.

The platform layer 34 provides for coordination and integration of transactions and services across various modules, such as account management, media station personnel user and roles, proposals, analytics (e.g., Broadcasting media analytics), transaction queue management, and other modules that may be advantageous for a sales automation and customer relationship management tool in the field of media advertising (e.g., radio, television, internet and print advertising). Media proposal system 10 provides the business logic for sales automation and customer relationship management.

With continued reference to FIG. 2, the enterprise services bus layer 36 may be used to integrate and allow communication between various business engines and applications. The enterprise services bus layer 36 may route, split or combine messages between the platform layer 34 and the various engines and applications, including third-party applications, as may be necessary. Those engines and applications may include, for example, the above-mentioned media management solutions (e.g., VIERO® management solutions), security applications, credit reporting engines, human resources applications, and the like. Such messaging may be facilitated by, for example, Web Services or Microsoft Message Queuing (MSMQ) services. MSMQ is a component of the Windows operating system that allows cooperating applications to send and receive messages to each other, even if the intended recipient application is not running or the computer on which the sender or recipient application is running is disconnected from the network. Messages may be stored and forwarded by MSMQ until they reach the destination queue. Later, when a recipient application runs, it can retrieve the messages from the queue. MSMQ decouples sender and recipient applications so they do not need to run at the same time. Message Queuing provides built-in enhanced security, transaction support, and other features.

Those having skill in the art will understand that the applications and engines may be heterogeneous, vertical and may include those provided by third parties, and legacy systems, as well as other applications particular to the media proposal tool. For example, email and messaging may be provided via Microsoft Exchange Server and Microsoft Outlook. Credit reporting may be provided by Dun & Bradstreet and may use, for example, the DUNS number. Human resources management may be provided through Oracle's PeopleSoft enterprise application. Security may be provided through Microsoft's® Active Directory® directory service for managing the identities and relationships that make up network environments, e.g., allowing the system/network administrator to grant remote access to the media proposal system 10, or grant access to any other application or business engine the account executive may need to access. To manage workflow, such as assigning a task to one of their sales force, or to track business processes within the sale of advertising, users of media proposal system 10 may use Microsoft Windows Workflow Foundation ("WF"). Accordingly, the enterprise services bus layer may include adapters for legacy applications and be insensitive to the various operating systems and programming languages of the various applications.

Workflow may be generally defined as a model to represent real work for further assessment, e.g., for describing a reliably repeatable sequence of operations. More abstractly, a workflow is a pattern of activity enabled by a systematic organization of resources, defined roles and mass, energy and information flows, into a work process that can be documented and learned. Workflows are designed to achieve processing intents of some sort, such as physical transformation, service provision, or information processing. With regards to media proposal system 10, the workflow is the pattern of activities or processes performed by various users (e.g., account executives, sales managers, business managers and traffic managers) from the receipt of a request for advertising from a client, through the creation, acceptance (by the client) and approval (by managers) of a proposal, the injection of the proposal as an order in a traffic and billing system, the airing or placement of advertising in the order, the analysis of the advertising performance and the dynamic feedback and refining of the order described herein.

With continued reference to FIG. 2, the enterprise services bus layer 36 integrates the various applications and engines to provide media proposal system 10 with the various application services noted above. For example, an analytics service in media proposal system 10 may rely on a yield management system, such as the VIERO® BESTRATE yield management system, for making better daily, weekly, monthly, quarterly, and annual pricing decisions through proposal features such as ratings information, up-to-date pricing and real time inventory, ensuring maximum value for radio advertisements; a traffic and billing system, such as the VIERO® RMS traffic and billing engine, for enterprise-wide sales revenue reporting; and a credit reporting application to provide the account executive the ability to look at customer credit history, information on outstanding accounts, and complete transaction history. A transaction queue management service may rely on MSMQ services. An accounts management service in media proposal system 10 may rely on the human resources enterprise services application and services provided with Microsoft Exchange server, such as Microsoft Outlook Email, Calendar, Contacts, Tasks and Notes and other applications that Microsoft Exchange may support. Those skilled in the art will understand that various services may be provided by various underlying engines and applications provided through the enterprise services bus.

The database platform layer 38 may, as noted above, provide a relational database management system. In an embodiment, the database platform may be provided through a Microsoft SQL Server 2008, allow storage, organization, retrieval and manipulation of sales and sales-related data.

Figure 3:
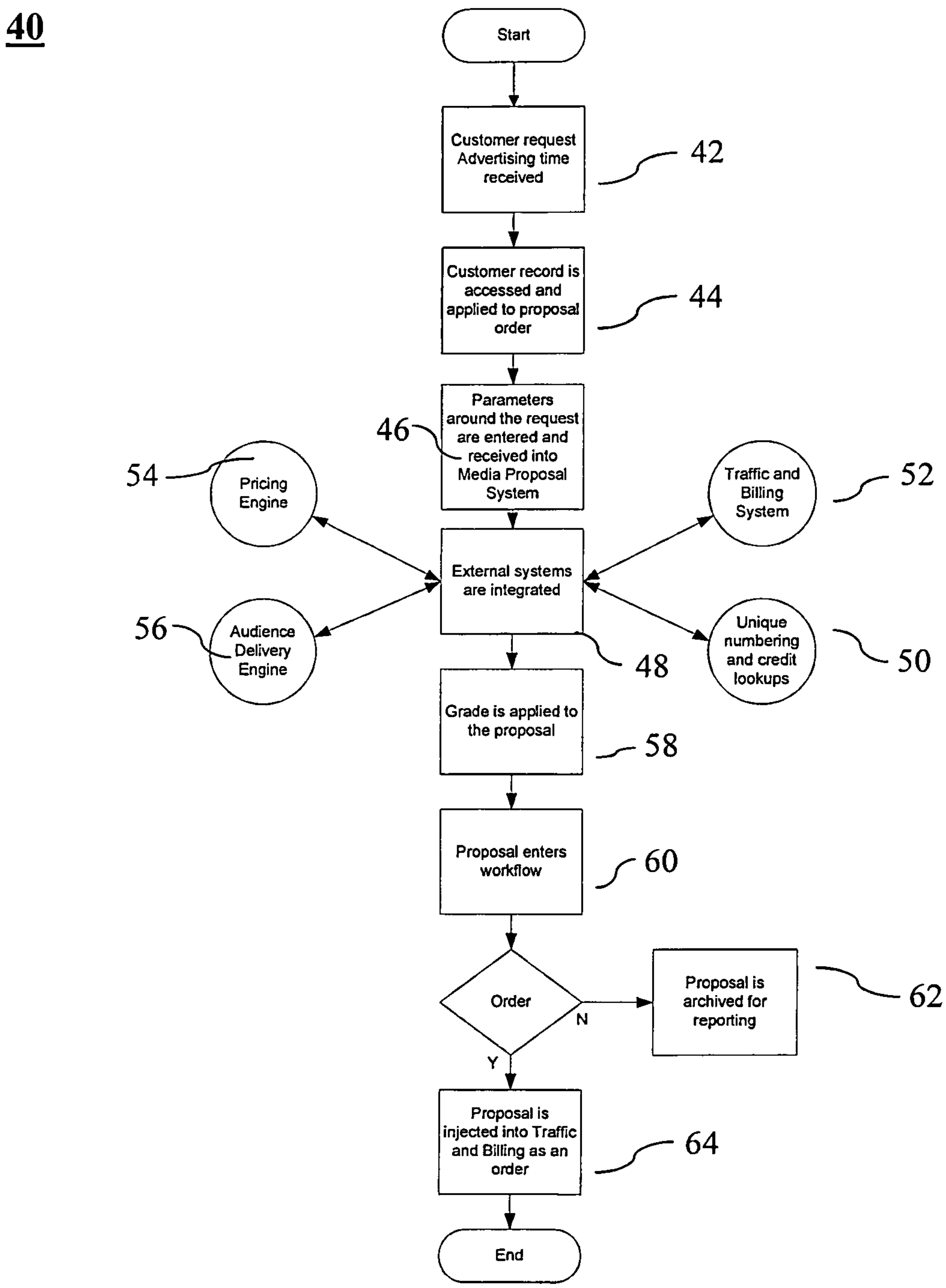
FIG. 3 is a flowchart illustrating an embodiment of a method for creating and managing advertising proposals from inception to completion.

With reference now to FIG. 3, shown is a flowchart illustrating an embodiment of method 40 for managing an advertising proposal from inception to completion of an order with one or more media outlets. Method 40 may start when a customer request for advertising time or placement is received, block 42. For example, a manufacturer may request that a radio station air a 30-second commercial for a new product. An account executive, or other user, may create a media proposal in response to the request. As described above, the media proposal will be a proposed campaign of advertising, with certain parameters (e.g., time slots for advertising, dates for airing, locations for the advertisement, etc.), goals and/or requirements. A campaign is typically for placing (e.g., airing, displaying, posting, publishing, etc.) a single advertisement on or in the media outlet. If the customer is a new customer, a new account may be created for that customer. If the customer has previously advertised with the radio station, the customer account and its records are accessed. In either case, a new entry for the media proposal is created and information from the customer records is entered into the media proposal, block 44. The account executive may create the new account or view the customer records via a media proposal GUI (see below). Advertising parameters for the media proposal are entered into and received by media proposal system 10, block 46. The account executive may enter the advertising parameters, such as the dates and times that the advertisement should run, how many times per day the advertisement should run, which stations and markets the advertisement should run in, and the like, through the media proposal GUI.

Media proposal system 10 may then access external systems in order to integrate information and data into the new advertising proposal, block 48. For example, the account executive or other users may request a credit analysis from a credit reporting engine, block 50, request and evaluate the availability of the date and time slots requested by the customer using a traffic and billing system (e.g., VIERO® RMS), block 52, determine the pricing for the advertisement run using a pricing or yield management engine (e.g., VIERO® BESTRATE Yield Management Solution), block 54, and evaluate the demographics and medium of transmission using an audience delivery engine (e.g., block 56. The traffic and billing system may determine and display available time slots through a media proposal GUI. Embodiments of the traffic and billing system that may be used here are described in the RMS application. Embodiments of a pricing engine that may be used here are described in the BestRate applications. The pricing engine calculates pricing based on various factors including without limitation demand based components, product type, spot lengths, dayparts (e.g., periods or parts of a day when an advertisement is scheduled to be aired or displayed) and reservations weighting. Embodiments of an audience delivery engine that may be used here are described in the AirWaves application. The audience delivery engine uses customer goals and historical performance to generate feedback to the pricing and scheduling engine to provide the best possible scenarios for campaign success.

A grade is applied to the proposal, block 58. The grade may be applied by the account executive or other user or automatically by media proposal system 10 based on various pre-set rules and factors. The grade is generally an estimate of the likelihood of the proposal turning into a customer order. The proposal is entered into workflow, block 60. Entering a proposal into the workflow routes the proposal to various people and roles based on business rules set up for workflow purposes. For example, a new advertiser has a different routing than an existing advertiser, an advertiser who is late in payment has a different routing than advertisers that do not (e.g., need additional managerial approval), etc. An exemplary workflow routing would be: (i) account executive creates proposal; (ii) draft proposal is forwarded to customer for acceptance; (iii) steps (i) and (ii) repeated until proposal accepted; (iv) accepted proposal is forwarded to sales manager for approval; (v) sales manager-approved proposal is forwarded to business manager for approval; (vi) business manager-approved proposal is forwarded to traffic manager for approval and insertion; (vii) return proposal to account executive and repeat any of steps (iv)-(vi) (or (i)-(vi)), as applicable, until proposal approved or finally rejected; (viii) traffic manager inserts approved proposal into traffic and billing system as order. After the proposal is entered into the workflow, the account executive or other user may modify and update the proposal as negotiation continues with the customer. If the proposal does not turn into an order, the proposal may be stored for reporting purposes and added to the history of the customer, block 62. If the proposal turns into an order, the order may be submitted to or injected into a traffic and billing system, e.g., the VIERO® RMS traffic and billing engine, for execution and invoicing, block 64. Additional and/or different process steps are described in connection with various embodiments below.

Media proposal system 10 provides a GUI from which a user, typically an account executive, may create and compile quotations to send to radio stations, television stations, Internet sites, or other media outlets, organize data involving the advertising process, send quotations and proposals to customers, and generate reports. Media proposal system 10 provides customer relationship management for an advertiser or agency account from the time the account executives receives a lead, and allows the account executive to create an e-proposal (media proposal) for a given media outlet (e.g., radio station, television station, internet website, internet radio, outdoor advertiser, newspaper, etc.) or multiple media outlets (e.g., multiple radio stations, television stations, internet website, internet radio station, internet television station, outdoor advertisers, newspapers, etc., and any combinations thereof) that reflects up-to-the-minute inventory of advertisements and demand-reflective pricing. After electronic review and approval of the media proposal, media proposal system 10 may interact with other external systems to maximize the potential revenue.

Figure 4A:
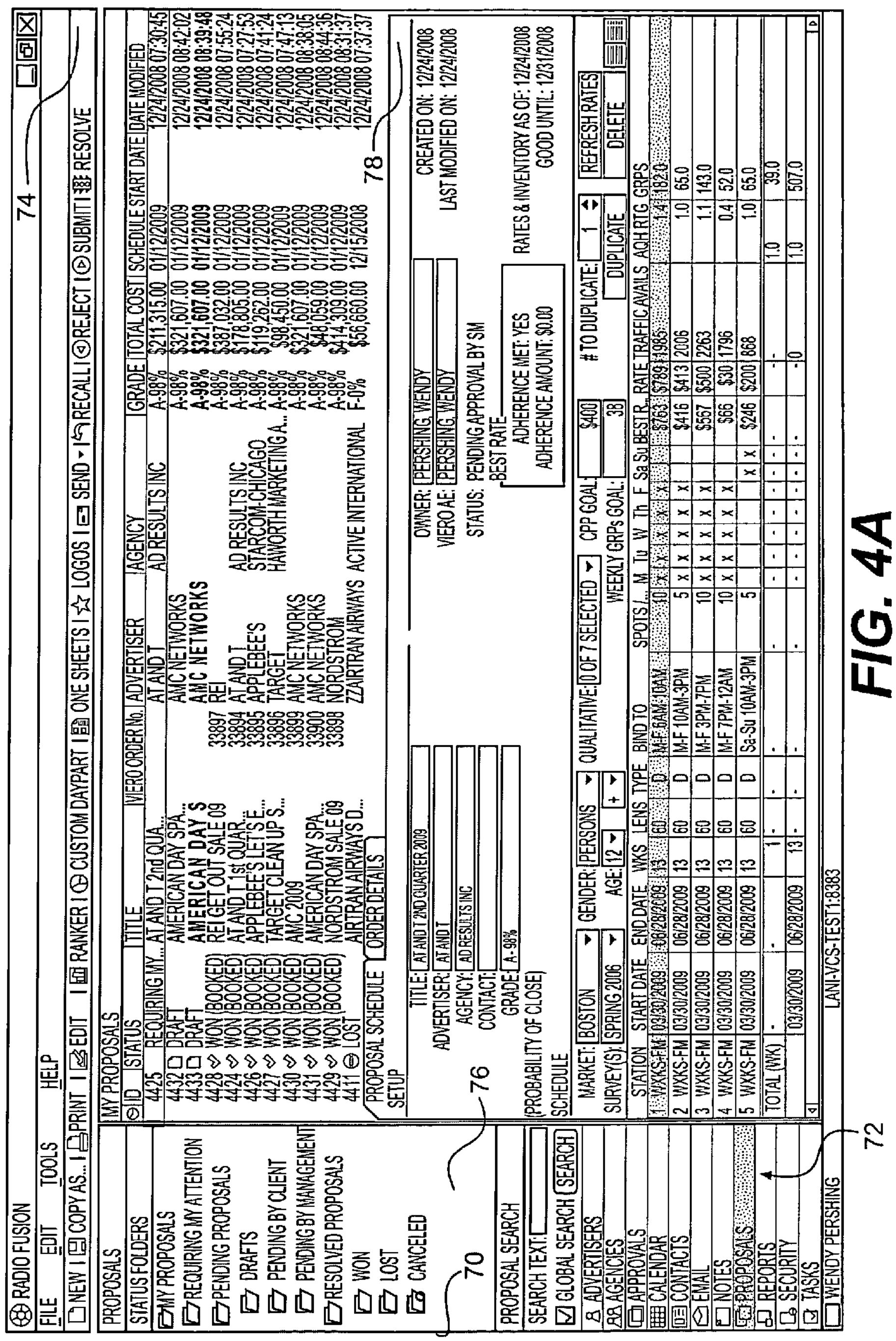
FIGS. 4A and 4B is a screen shot of an exemplary graphical user interface (GUI) for a user to interact with a software implementation of an embodiment of system for creating and managing advertising proposals from inception to completion.
Figure 4B:
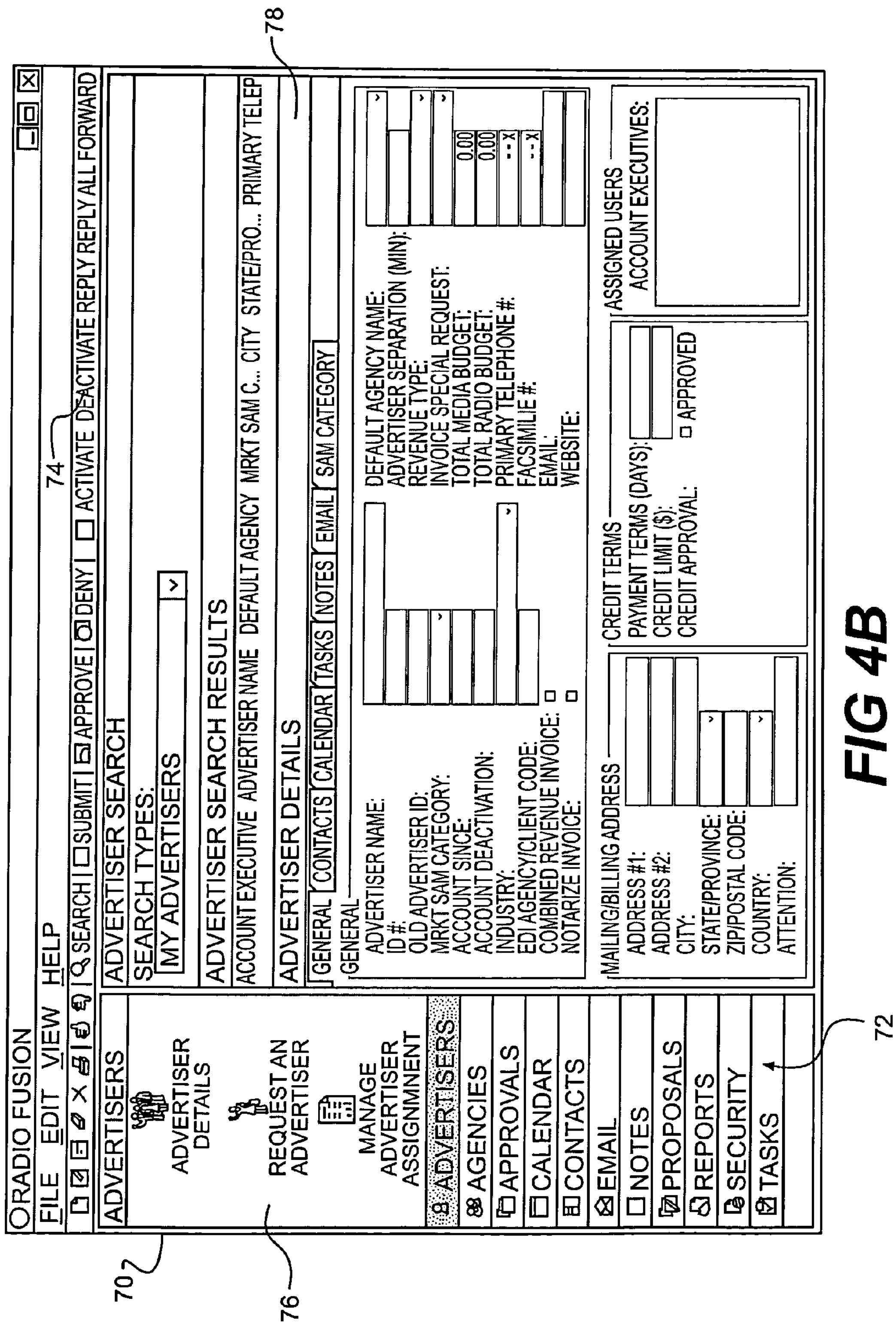

With reference now to FIGS. 4A and 4B, shown is an exemplary graphical user interface ("GUI"), account management screen/media proposal GUI 70 for media proposal system 10. It is understood that the GUI shown is merely an exemplary embodiment and that the various functions and menus offered on the GUI shown (and other GUIs described herein) may be arranged in any variety of layouts, formats, etc.

Media proposal GUI 70 provides users access to various functions of media proposal system 10. The embodiments of media proposal GUI 70 shown provide eleven distinct functional areas that may be accessed from main menu 72 on the left-hand side of media proposal GUI 70: Advertisers, Agencies, Approvals, Calendar, Contacts, Email, Notes, Proposal Generation, Reporting, Tasks and Security. A user, such as an account executive accesses one of the functional areas by selecting or clicking the corresponding main menu 72 item. These areas can be limited by roles. For example, in an embodiment, an account executive ("AE") role does not see the Security tab and cannot access the Security functions. Media proposal GUI 70 may also include toolbar 74 that provides different tools or functions related to the selected functional area that the user may select. Upper left side 76 of media proposal GUI 70 may provide folder listings, search tools and/or different sub-functions related to the selected functional area. Main work area 78 of media proposal GUI 70 typically includes various panes, tabs, etc., as apparent from description below, that relate to selected functional area and selections made in upper left side 76. As described below, main work area 78 may display relevant information, in sortable lists, enable user input, and otherwise enable user to use media proposal system 10 as described herein. Other functionality, apparent to one of skill in the art from the description herein, may be provided from main menu 72, toolbar 74 or other aspects and areas of media proposal GUI 70.

With continuing reference to FIGS. 4A and 4B, the media proposal GUI 70 may also be the "base" GUI for the other GUIs, windows, and panes described herein. For example, windows and panes described herein may be displayed on media proposal GUI 70 as indicated (e.g., in main work area 78) or as separate GUIs. As used herein, a pane generally refers to a portion of a GUI. However, none of the panes or windows described herein should be considered to be limited to the pane or window described. Any GUI described herein may be, e.g., a window or a pane.

A user, such as an account executive, accesses media proposal system 10 by launching media proposal GUI 70 and logging-in to media proposal system 10 in a manner familiar to one of ordinary skill in the art. An embodiment of media proposal system 10 displays media proposal GUI 70 with proposal functionality when launched, as shown in FIG. 4A. Media proposal system 10 accesses appropriate information from media proposal system database 14 (and other databases, such as media traffic and billing system database 16) and displays information that user may access, based on log-in, on media proposal GUI 70. For proposal functionality, upper left side 76 displays a listing of various status folders for the user's proposals (My Proposals). Upper left side 76 also includes a proposal search area for searching listed proposals. Main work area 78 displays listing of user's proposals corresponding to selected folder in upper left side 76 (in this case, all of the user's proposals—My Proposals). Main work area 78 also displays tabbed panes, Proposal Schedule and Order Details. As described below, Proposal Schedule displays schedule of advertising for selected/highlighted proposal in listing of user's proposals. Order Details provides details of booked order corresponding to highlighted proposal.

FIG. 4B illustrates media proposal GUI 70 with advertiser functionality selected on main menu 72. Upper left side 76 displays three sub-functions, e.g., indicated by icons and text, related advertiser functionality, advertiser details, request an advertiser and manage advertiser assignment. Main work area 78 shows advertiser search, advertiser search results and advertiser details panes with various tabs, corresponding to advertiser details sub-function. Since no search has been run, no search results and no advertiser details are displayed.

These various functional areas allow an account executive, or other user, to manage sales accounts. In an embodiment, the account manager (e.g., an account executive) may start the account management process at the screen illustrated in FIG. 4. Management, as used herein, generally is a term for making certain execution is performed on advertising/spot orders. Account management may generally include creating and maintaining up-to-date advertiser and agency (or representative firm) accounts, including all related information tasks as well as approvals for advertiser and agency assignments, establishment and proposals. Such tasks may include managing agency and advertiser assignment requests, contacts, tasks, credit information, and correspondence. In this embodiment, the primary account management modules comprise those for Advertisers, Agencies, Approvals, and Proposals, each of which may be accessed through the main menu in the media proposal GUI 70.

In an embodiment, Calendar, Contacts, Email, Notes and Tasks main menu items may be particularly provided to support account management. Those functionalities may also be accessed through the main menu on the media proposal GUI 70. The account executive may create and manage customer accounts and then go through workflow for injection and booking of orders into the traffic and billing system. The account executive may also view various reports through the Reporting functionality, including without limitation a Master Advertiser/Agency Report, an Advertiser Report, an Agency Report, a Scheduled Revenue Summary Report, a Pending Business Report, and a 1-on-1 Report.

With continuing reference to FIGS. 4A and 4B, those skilled in the art will appreciate that toolbar 74 may be provided across the top of the media proposal GUI 70 to display functions that can be performed in the functional area. For example, an icon may be provided to allow the account executive to hide the details of an advertiser to show only general information. Likewise, an icon may be provided to allow the account executive to show detailed information for a particular advertiser.

A person skilled in the art will recognize that toolbar 74 may be comprised of as many icons or functions as needed to make the functionality of the media proposal GUI 70 more user friendly. Other functionalities that may be accessed via the toolbar are discussed herein. Those having skill in the art will recognize that various icons may be provided in the toolbar to provide various functionalities.

In an embodiment, account management may be accomplished by an account executive or the sales manager of the account executive at local properties (local media outlets). This functionality is not limited to local properties as it is available for regional, national and enterprise account executives (account executives for regional media outlets, national media outlets, and enterprises owning multiple media outlets). For example, a sales manager may be responsible for managing a number of account executives within a given radio advertising market. A sales manager may assign certain advertisers to an account executive, and in that situation the account executive's advertiser list should accurately reflect the accounts with which the account executive is working. In an embodiment, the account executive may be responsible for providing the sales manager with a list of advertisers with which the account executive is working, and the sales manager may be granted access rights in media proposal system 10 to update the database and details of advertisers that the account executive may have access to. Accordingly, when the account executive accesses media proposal system 10, the account executive will be able to access an up-to-date list of advertisers, through various search tools. Those having skill in the art will recognize that other functions and uses are apparent herein.

With continuing reference to FIGS. 4A and 4B, before turning to the Advertiser, Agency, Approval and Proposals functional areas in more detail, the Calendar, Contacts, Email, Notes and Tasks main menu 72 items for supporting account management are described in more detail. These functional areas may appear in all of the Advertisers, Agencies, Approvals or Proposals functional areas that may be entered through main menu 72 of account management screen 70. However, the Calendar, Contacts, Email, Notes and Tasks functions may provide a more narrow functionality in the particular functional area in which a user is working, e.g., Advertisers, Agencies, Approvals or Proposals functional area. For example, as shown in media proposal GUI 10, the Advertiser Details pane provides a number of tabs, including tabs for Calendar, Contacts, Email, Notes and Tasks. If the user were to select the Contacts tab in that pane, only the contacts for the particular selected advertiser will be displayed. However, if a user were to select Contacts directly from the main menu, all contacts in the sales database could be searched and accessed. The information under the Calendar, Email, Notes and Tasks tabs in the Advertiser Details pane and main menu may be similarly specific or general depending on how a user accesses those functions. Likewise, the same may hold true with respect to Agency Details if the Agency main menu item is selected. This is coined as "vertical and horizontal account visibility."

Turning to the Calendar function, the calendar function allows a user to view the calendar with varying degrees of specificity. For example, a user may select from a drop-down main menu and view calendar appointments by day, week, month, or work week. A user may search for all appointments, specific advertiser appointments, specific agency appointments, and appointments by user (scheduler). A user may create a new appointment, or edit or delete an existing appointment. Appointments represent activities tied to the account executive for business purposes. Personal information can be excluded and not visible to upper level roles. This is referred to as "Smart sectioning of activities".

With continuing reference to FIGS. 4A and 4B, a user may access the Calendar tab within the Advertisers Detail pane of media proposal GUI 70. As noted above, the Advertiser Details pane may be accessed by clicking on the Advertisers item in the main menu on the left-hand side of media proposal GUI 70. Those skilled in the art will appreciate that similar functionalities may be provided through the Agency Details pane as accessed by clicking on the Agencies item in the main menu on the left-hand side of the account management screen.

In this embodiment, a user may view the appointments associated with a particular advertiser, agency or representative firm. The Calendar tab may provide details on the Subject of an event or activity, or Location where activity or event will occur, the Start date and time of the activity or event, the End date and time of the activity or event, the Category or type of event or activity, and any Comments/Notes about the event or activity.

As noted above, a user may create a new appointment by adding an event or activity to the Calendar. The toolbar may provide an icon that the user may click on to open a Calendar Details window.

A user may create a new appointment by entering data in the Calendar Details window. In an embodiment, media proposal system 10 may require certain mandatory details, such as without limitation the subject, account identification, start and end of an event or activity. In an embodiment, a user may not edit the account identification field if the calendar item is created from the Advertiser Details or Agency Details functional areas. In an embodiment, a user may input the desired event or activity topic in the Subject field. A user may input the desired starting and ending date and time information in the respective Start and End fields. A user may input the location of the event or activity in the Location field. A user may describe in the Show Time As field how time will be used during the event or activity. A user may enter comments or notes about the event or activity in the Comments/Notes field. The user may also include other individuals in the event or activity by entering appropriate information in the Required/Optional Attendees field. In an embodiment, a user may click on the magnifying glass icon to access another window listing potential attendees, and designate such attendees as either required or optional. Such attendees may include other account executives, sales managers, business managers, advertisers, agencies and other contacts, clients and users.

In an embodiment, media proposal system 10 may designate various users as individuals authorized to access and use media proposal system 10. In an embodiment, media proposal system 10 may designate individuals from a contacts list, such as those that may appear in an electronic address book. Media proposal system 10 may provide various drop-down main menus to accommodate such choices.

In an embodiment, the Calendar Details window may provide a Category field that allows the user to choose the type of event or activity. For example, a user may categorize the type of event or activity as a sales call. Also, in an embodiment, the Calendar Details window may provide an Attachments field that allows the user to search for and attach any documents or files that may be associated with the event or activity.

Once all the event or activity information is entered in the fields from the Calendar Details pane, the user may click on another icon to save the event or activity. The toolbar may also provide an icon to allow the user to edit a Calendar event or activity. In an embodiment, the calendar item may appear in a calendar provided through media proposal system 10 and may also appear in a third-party calendaring application that the user may utilize, such as Microsoft Outlook. One feature of media proposal system 10 is that it instantiates a separate calendar instance that includes only the user's media proposal system 10 calendar items. Any personal or non-media proposal system 10 calendar items are kept separate.

With continuing reference to FIGS. 4A and 4B; focusing next on the Contacts tab in the Advertiser Details pane of media proposal GUI 70 (again, those having skill in the art will appreciate that the Agency Details pane may also provide a Contacts tab), the Contacts tab may allow a user to search all contacts, search for specific contacts, search for specific advertiser contacts, search for specific agency contacts, search for contacts by status, view various contacts (such as without limitation by address cards, phone list, email list, and by location as may be selected from a drop-down main menu on the toolbar), create new contacts, edit contact information (for example through the General tab and Details tab), deactivate contacts, and import contacts from another electronic address book, such as that provided in Microsoft Outlook. Through the Contacts tab, a user may view the contacts associated with a selected advertiser.

The toolbar on the media proposal GUI 70 may provide icons that a user may click on to add or edit contacts. For a new contact, clicking on the appropriate icon may open a new window in which a user may enter various types of information for a new contact into various fields. A Salutation field may be provided for a user to input a title for a contact, such as Mr. or Ms. First, Middle, and Last Name fields may be provided for user to enter the name of a contact for the advertiser. A Suffix field may be provided for a user to enter a suffix such as Jr. or Sr. for the contact. A Job Title field may be the provided for a user to enter a contact's job title. Other fields, such as Email, Email #2, and Email #3, may be provided for a user to enter the contact's primary, secondary, and tertiary email addresses, respectively. A Business Phone field may be provided for a user to enter a contact's business phone number. A Home Phone field may be provided for user to enter a contact's home phone number. In an embodiment, only alphanumeric characters may be permitted in the Business Phone and Home Phone fields. Business Fax and Mobile Phone fields may be provided for user to enter a contact's business fax or mobile phone numbers, respectively. Address 1 and Address 2 fields may also be provided for a user to enter the primary address and secondary address of a contact, respectively. These fields may include the street address, suite or building numbers, city, state or province, zip or postal code, and country. Other fields may also be included for a contact, for instance Spouse's name or Resume fields.

Once the user has finished entering new contact information, the user may click on a Save icon that may be provided in the toolbar. Additionally, a user may edit a contact by selecting an Edit icon that may be provided in the toolbar. A pop-up message may then be provided to confirm that the save is complete or display a message showing which fields need to be completed. If any changes were made to the general information in the contact without being saved, a warning may be provided to ensure that changes are saved before moving on to another tab. To cancel any changes, a user may select a Cancel icon from the toolbar. In an embodiment, the contacts item may appear in a third-party address book or contact management application that the user may utilize, such as Microsoft Outlook.

With continuing reference to FIGS. 4A and 4B, focusing next on the Notes tab in the Advertiser Details pane of the media proposal GUI 70, the Notes tab enables a user to maintain, retrieve, and create notes associated with a particular advertiser. In an embodiment, a user may search for all notes, search for specific advertiser notes, search for specific agency notes, search for notes by a particular user, and create and edit notes. Those skilled in the art will appreciate that similar functionalities may be provided through the Agency Details pane as accessed by clicking on the Agencies item in the main menu on the left-hand side of the account management screen.

In an embodiment, existing notes displayed in the Advertiser Details window may not be edited or deleted by a particular user. In an embodiment, the Notes tab may provide a user with a Date/Time field that displays the time and date the note was entered, a User field that displays which user entered the note, a Notes field that displays the text of the note, and an Advertiser/Agency Name field that displays the name of the advertiser and agency associated with the note. In an embodiment, a user may click on the note entry under the Tab to gain access to an Account Note Details window that allows the user to view the complete note text and other note details.

Media proposal system 10 may also allow a user to create a new note by clicking a "New" icon in the toolbar on the media proposal GUI 70. Clicking on such an icon may provide a user with access to a window similar to the Account Note Details window, in which a user may input details into the provided text field. For example, a user may note that a particular advertiser or agency faces a merger with another company. Once the user enters all of the note information into the Account Note Detail window, the user may click on a Save icon that may be provided in the toolbar to save changes. In an embodiment, a message may be provided to confirm to the user that the note is saved. Also, a Cancel icon may be provided in the toolbar for selection by the user if the user does not want to save the note. In an embodiment, a note may not be edited or deleted once saved. Those having skill in the art will recognize that other fields may be included for a note. For example, a confidential field may be provided to alert a user that a note is sensitive and should be kept confidential.

In an embodiment, media proposal system 10 tracks the notes, and other information, associated with a media proposal. In other words, subsequent users, such as sales managers, business managers, and traffic managers may, upon viewing a media proposal, access and view notes associated with the media proposal by the account executive or other users.

With continuing reference to FIGS. 4A and 4B, focusing next on the Email tab in the Advertiser Details pane of the media proposal GUI 70, the Email tab may allow a user to view all emails associated with an advertiser, draft emails, or sent emails, search for emails, create, edit and delete emails, reply to and forward emails, and attach files to emails. Those skilled in the art will appreciate that similar functionalities may be provided through the Agency Details pane as accessed by clicking on the Agencies item in the main menu.

In this embodiment, a user may view the emails associated with a particular advertiser, and create and edit new emails associated with that advertiser. In an embodiment, the user may search for an email sent to the advertiser to which the Advertiser Details pane pertains. The email tab may list all emails sent to a selected advertiser, and may provide search fields that a user may use to search for particular emails within the list. For example, a To field may be provided for searching for a recipient of the email, a Sent field may be provided for searching the date that the recipient received the email, and a Subject field may be provided for searching the topic of the email. In an embodiment, by clicking on the To, Sent, or Subject fields, the account executive may filter the emails from the respective field.

In an embodiment, an email may be associated with a particular account. The toolbar in the media proposal GUI 70 may provide a New Email icon that may permit a user to create a new email. A new email window may be provided. In an embodiment, an email format may be provided similar to that provided through Microsoft Outlook. Those having skill in the art will recognize that if a new email is created within the Advertiser Details pane, the email may be automatically associated with a particular advertiser. In an embodiment, if a user creates a new email from the email functioning selected from the main menu, a user may enter data into an Account field to link the email to a particular Advertiser. A user may enter the addressee in a To field, and subject of the email in a Subject field. The CC field and the Attach field may also be provided for data entry by a user. A person skilled in the art will recognize that other fields may be included for an email, for instance a BCC field to allow blind copies to be sent. A user may click on a Send button to send email to addressee(s). In an embodiment, upon sending, sent email may be automatically added to the Sent Emails section under the Email tab in the Advertiser Details-pane. In an embodiment, an email may be sent and received using a third-party email application that the user may utilize, such as Microsoft Outlook.

As noted above, email functionality may also be accessed from the main menu in the media proposal GUI 70. In an embodiment, when a user selects email functionality from the main menu, all emails will be listed, not just the emails sent to or received from a particular Advertiser or Agency.

With continuing reference to FIGS. 4A and 4B, focusing next on the Tasks tab in the Advertiser Details pane of the media proposal GUI 70, the Tasks tab may allow a user to view and sort all tasks associated with a particular advertiser. Those skilled in the art will appreciate that similar functionalities may be provided through the Agency Details pane as accessed by clicking on the Agencies item in the main menu on the left-hand side of the account management screen. The Tasks tab may provide a user with a list of tasks associated with a particular client, and indicate to the user the status, subject, date, priority and owner of the task.

Figure 5:
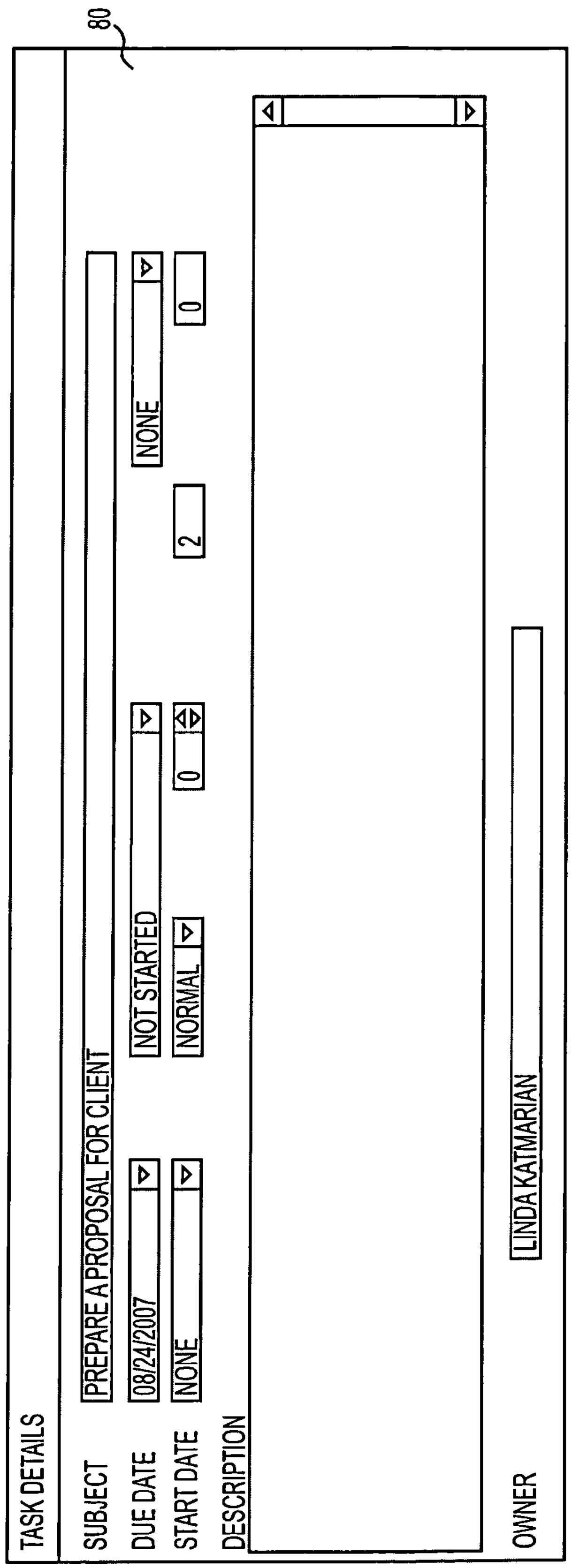
FIG. 5 is a screen shot of an exemplary task details GUI in a software implementation of an embodiment of system for creating and managing advertising proposals from inception to completion.

Media proposal system 10 may also provide users with the ability to create new tasks. With reference now to FIG. 5, shown is an embodiment of a window for entering data for a new task, a task details pane 80. In an embodiment, the toolbar of the media proposal GUI 70 may provide New Task icon on which a user may click to access a task details pane 80. The task details pane 80 may provide a Subject field to allow user to describe the topic of the task. For example, a sales manager may want an account executive to organize a conference, and so may list the subject of the task as Sales Conference. A Due Date field may also be provided to allow a user to choose the due date of the task from a drop-down calendar. A Start Date field may be provided to allow a user to choose the start date to begin the task from a drop-down calendar. A Priority field may also be provided to allow a user to designate the priority of the task as, for example, low, normal, or high. A Status field may be provided to allow a user to choose the status of the task as, for example, not started, in progress, waiting on someone else, deferred, or complete. A percent ("%") Complete field may be provided to allow a user to choose the current completion percentage for the task using, for example, up or down arrows. In an embodiment, a Date Completed field may be inaccessible by a user and to updates when a task's status is set to complete. A Total Work field may be provided to allow a user to enter the number of estimated hours needed to complete the task. An Actual Work field may be provided to allow a user to enter the number of hours actually worked on the task. A Description field may be provided to enable a user to enter a description of the task. An Owner field may be provided to display the name of the user adding the new task. In an embodiment, the Owner field cannot be edited. A person skilled in the art will recognize that other fields may be included for a task. For example, an Assigned to field may be provided to list which members of the sales force are required to perform the task.

A user may save a new task or save changes to a task by clicking on a Save Task icon that may be provided in the toolbar. A user may also edit a task by clicking on an Edit Task icon that may be provided in the toolbar, and may cancel a new task or task it by clicking on a Cancel icon that may be provided in the toolbar of the media proposal GUI 70.

The daily activities of the account executives may be coupled tightly with a personal information manager ("PIM") application (e.g., Outlook® or ACT!®) to provide visibility and accountability into the work efforts of sellers (account executives) by upper level managers (sales managers, business managers, etc.). This coupling allows for extensibility to any and all tools the account executives use for daily productivity. Media proposal system 10 integrates and allows for multiple PIM applications such as Lotus Notes®.

As noted above, a user may focus particularly on advertisers by clicking on the Advertisers item in the account management main menu of the media proposal GUI 70. As may be seen in the embodiment of FIG. 4B, clicking on the Advertisers main menu item may allow a user access to icons for Advertiser Details, Request an Advertiser, and Manage Advertiser Assignments in upper left side 76. The Request an Advertiser icon may allow a user to request a new advertiser. The Manage Advertiser Assignment icon may, as discussed above, allow a sales manager to assign an account executive to an advertiser, and add any notes pertinent to the advertiser and the assignment.

Those skilled in the art will recognize that other icons may be added depending on the needs of the user. A person skilled in the art will also recognize that various icon options may change depending on which main menu selection the user selects.

With continuing reference to FIG. 4B, as described above, media proposal GUI 70 with Advertiser functionality selected displays toolbar 74 related to advertisers across the top of the screen, advertiser functions in the upper left side 76, account management main menu 72 on the lower left side, an advertiser search pane, advertiser search results pane, and an advertiser details pane, in the upper, middle and lower right side of main work area 78. In an embodiment, a user may search for advertisers by using a drop-down main menu in advertiser search pane that allows various search options. The toolbar may provide a Search icon that a user may click on to trigger a search for advertisers. Search results are displayed in advertiser search results pane. Details of a selected advertiser in advertiser search results may be displayed in advertiser details pane.

Figure 6:
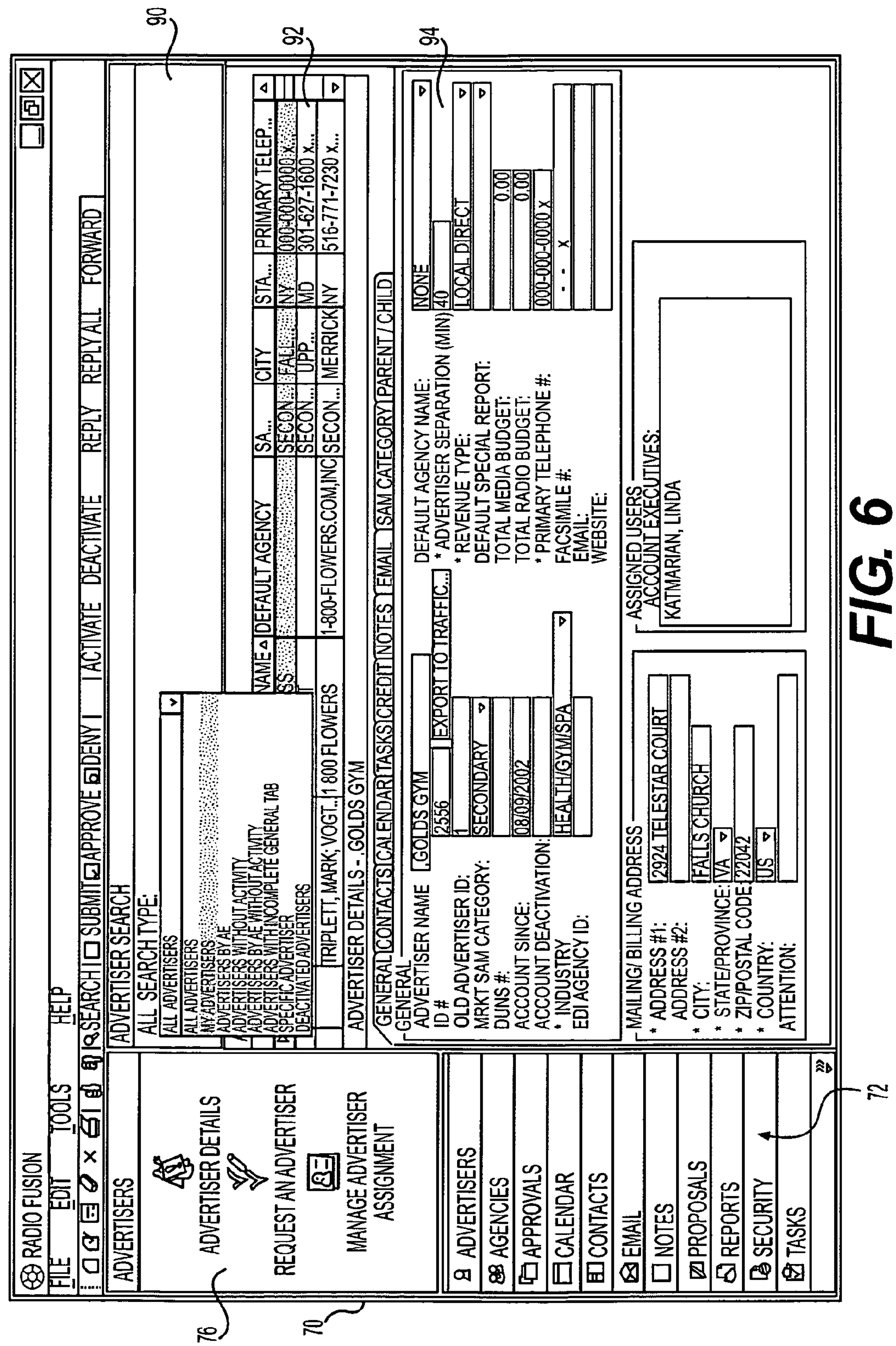
FIG. 6 is a screen shot of an exemplary advertiser search GUI in a software implementation of an embodiment of system for creating and managing advertising proposals from inception to completion.

With reference now to FIG. 6, shown is an embodiment of advertiser search pane 90, advertiser search results pane 92 and advertiser details pane 94 (i.e., on media proposal GUI 70, with advertiser functionality selected). In embodiment shown, as opposed to FIG. 4B, a search has been run, advertiser search results 92 displays search results and advertiser detail pane 94 includes detail for an advertiser, e.g., Gold's Gym, selected in advertiser search results pane 92. Also shown in a drop-down menu 96 that may be provided in the advertiser search pan 90.

In this embodiment, search types drop-down menu 96 may provide a way for the user to search for advertisers, according to various classifications. In the search type drop-down menu 96 a user may select My Advertisers to list all advertisers associated with the current user. In an embodiment, selecting the My Advertisers category may allow user to search the lists of all advertisers assigned to them. The extent of the list may depend upon the user requesting the search. For example, if an account executive selects the My Advertisers category, only those advertisers associated with the account executive will be listed. If a sales manager or business manager selects the My Advertisers category, then all the advertisers in a given market may be listed.

Depending on the selection, a second drop-down menu may appear. For example, if a user selects a "Specific Advertiser" search, a second drop-down menu may appear in advertiser search pane 90 that may permit searching by Advertiser List/Partial Advertiser categories. If a user selects All Advertisers from the drop-down menu 96, a list of all advertisers may be returned. If the user selects Advertiser by AE, the search may return all advertisers assigned to the account executive selected or assigned to multiple account executives that may be selected from a drop-down main menu that may become visible only after the "Advertiser by AE" list is selected. In an embodiment, an Advertiser List/Partial Advertiser drop-down main menu may be provided both when a user selects Advertiser by AE and when a user selects Specific Advertiser from search types drop-down menu 96. If a user selects Advertisers Without Activity from the drop-down menu 96, the search may return all advertisers that have not performed a specified activity since the specified date. If a user selects Advertisers with Incomplete General Tab from the drop-down menu 96, the search may return all advertisers that do not have the necessary or sufficient information entered on the General tab (discussed below). For example, various fields on the General tab may be required to be complete before an advertiser can be injected to traffic and billing system. A Deactivated Advertisers selection may return all advertisers that have been deactivated. This functionality gives the users a sense of the advertiser landscape prior to implementation of media proposal system 10 and, while media proposal system 10 is in use, it provides an indication of advertisers removed from the media proposal system 10. In essence, the media proposal system 10 provides a continuous, ongoing data cleansing process.

Figure 7:
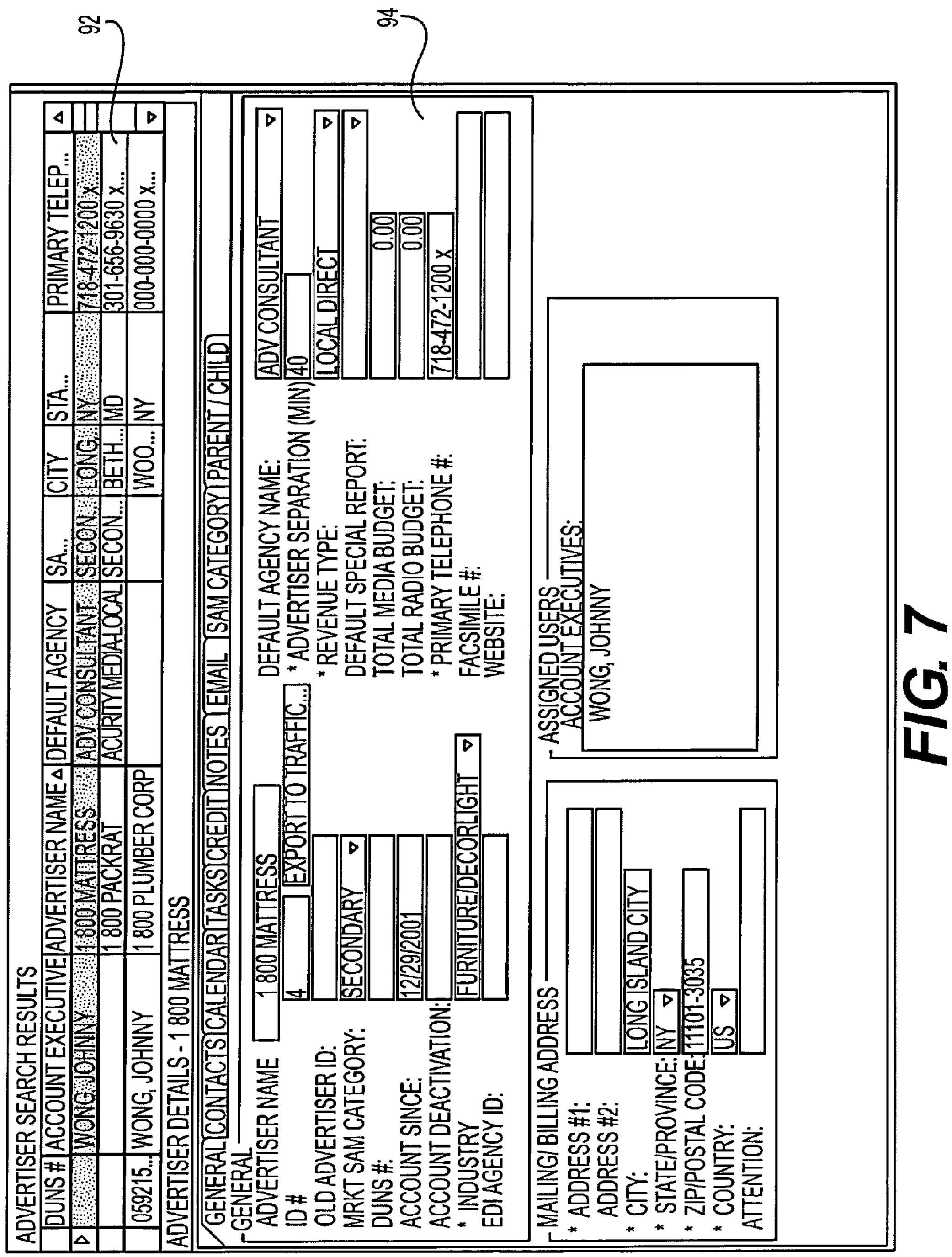
FIG. 7 is a screen shot of an exemplary advertiser search results GUI in a software implementation of an embodiment of system for creating and managing advertising proposals from inception to completion.

With reference now to FIG. 7, shown is another embodiment of advertiser search results pane 92 and advertiser details pane 94. Advertiser search results pane 92 and advertiser details pane 94 may be displayed, e.g., in main work area 78 of media proposal GUI 70 or as separate window. As noted above, advertiser search results pane 92 may show the results of a search based on the selected criteria selected from the search types drop-down list 96. The results may be, for example, sorted by advertiser name in ascending order.

Those having skill in the art will recognize that the advertiser search results pane 92 may be configured to show a variety of information. In an embodiment, the search results pane 92 may list, for each returned advertisement, a DUNS number, the account executive(s) Advertiser assigned to the advertiser, advertiser name, advertiser agency, strategic account management (SAM) category (discussed below), and contact information. The DUNS # column displays the Dun and Bradstreet number assigned to the advertiser. The Account Executive column displays the name of the account executive assigned to the advertiser. There may be multiple account executives assigned to an advertiser. The Advertiser Name column displays the name of the advertiser. The Default Agency column displays the agency typically associated with the advertiser. The SAM Category displays a Strategic Account Management market category (e.g., Key/Primary, Secondary, Target, Extra) assigned to the advertiser. The SAM categories categorize advertiser accounts and provide various tools to enable the sales manager to manage the activities necessary for each category (e.g., see below for alerts triggered by underperformance by key accounts). The City and State/Province columns respectively display the city and the state or province where the advertiser physically resides. Finally, the Primary Telephone # column displays the primary telephone number for the 14 advertiser. Those having skill in the art will recognize that other columns may be included in the advertiser search results pane 92.

Embodiments of media proposal system 10 create workflow and reporting for prospecting activities with the SAM category used as an input. Although SAM categories have been used previously, media proposal system 10 builds on these SAM categories to create various triggers, such as: e.g., triggers that alert sales managers when account lists are either too large or too broad for account executives to be efficient; triggers that alert business managers to review credit activities more closely when advertisers are requested; triggers that alert sales managers when key (or primary) accounts are under performing, etc. All of these triggers are preferably tied to the SAM inputs.

Key or primary accounts are defined on a per account executive basis. For example, a major fast food chain advertiser may be a key account for an account executive. Moreover, the same advertiser may be a key account for multiple account executives; in other words, multiple account executives may service the same advertiser. Furthermore, while an advertiser may be a key account for one account executive, the same advertiser may be a secondary (or tertiary, etc.) account for another account executive. This primacy of advertiser accounts may be defined when advertiser record or account executive records are created or edited in media proposal system 10. Similar primacy of agencies, representative firms, etc., may also be similarly defined in media proposal system 10.

With continuing reference to FIG. 7, the user may wish to view and manipulate the results of an advertiser search. For example, each of the columns in the advertiser search results pane 92 may be used to sort the list by clicking on the column's title. If the user clicks the column once, the list will be sorted in ascending order, if the column is clicked twice, the list will be sorted in descending order.

Additionally, each of the columns may contain a drop-down arrow that the user may click to select a specific item by which to filter the results or define a custom column filter. A person skilled in the art will recognize that there are other methods that can be employed to search through different fields in the advertiser search results pane 92.

As also may be seen in the embodiment of advertiser details pane 94 shown, the "Advertiser Details" may provide a number of tabs with which a user may view the information associated with an advertiser selected from the advertiser search results pane 92. When a different advertiser is chosen, the new advertiser information appears. The Content, Tasks, Notes, Email and Calendar tabs are discussed above.

The General tab of advertiser details pane 94 displays general information associated with the advertiser selected in advertiser search results pane 92. In an embodiment, the General tab may be the default tab displayed when the advertiser details pane 94 appears. An account executive or other user may need to update information about a particular advertiser throughout the sales process. In an embodiment, a user may edit information for a selected Advertiser by selecting the Edit icon from the toolbar of the media proposal GUI 70.

With continuing reference to FIG. 7, an embodiment, the General tab may provide a number of fields. An Advertiser Name field may be provided to display the name of the advertiser. An Industry Code field may be provided as a drop-down field for entering the industry for the advertiser. In an embodiment, the industry provided for an advertiser may match the records provided in the traffic and billing system (e.g., VIERO® RMS) database 16. An Advertiser Separation field may be provided to allow the user to input the minimum number of minutes that must exist between advertisements of the same category when scheduled in the traffic and billing system. A Revenue Type field may be provided as a drop-down field that may be used to enter the revenue type for the account. A Primary Telephone field may be provided to input the primary telephone number for the advertiser. The Mailing/Billing Address field may be provided to enter an address for invoices and confirmations.

In an embodiment, other fields in the advertiser details for a given advertiser may be entered by a user. An ID # field may correspond to the traffic and billing system (e.g., VIERO® RMS) identification number that supports integration between the traffic and billing system and media proposal system 10. If the ID # field is not populated, the media proposal system 10 may treat the advertiser as a new advertiser for which an order has not yet been injected into the traffic and billing system. When an advertiser places an order (e.g., accepts a media proposal) and the accepted proposal is approved through the proposal process, the order may be injected/loaded into the traffic and billing system and given an ID number. An additional button, Export to Traffic, may also be made available so that new advertiser information can be forced into the traffic and billing system, even without a complete order. An Old Advertiser ID # field may designate the old advertiser number that may have been used in the traffic and billing system to refer to previous traffic and billing system numbers for the selected advertiser. The SAM Category field may, in an embodiment, only be edited by the sales manager.

With continued reference to FIG. 7, the DUNS # is the Dun & Bradstreet number field. The DUNS number may be from the traffic and billing system, and may automatically populate this field. An Account Since field may be provided to show the date on which the account was created. In an embodiment, this field may not be edited by a user. An Account Deactivation field may be provided to display the date on which the account was deactivated. In an embodiment, only a sales manager or business manager may have access rights to deactivate an account by selecting the Deactivate button on the toolbar.

An electronic data interchange (EDI) Agency ID field may be provided to allow a user to enter the electronic invoicing ID number of the agency for the selected advertiser. A Default Agency Name field may be provided to allow a user to input the main agency that represents this advertiser. A Default Special Request field may be provided as a drop-down main menu and may be used to define any additional information that is used in the proposal. This entry may be modified before an order is injected into the traffic and billing system.

A Total Media Budget field may be provided to allow a user to input a dollar amount representing what the advertiser is spending annually across all advertising media. A Total Radio Budget field may be provided to allow a user to input a dollar amount that displays what the advertiser is spending annually on radio advertising. A Facsimile# field may be provided to allow a user to input the fax number for the advertiser. An Email field may be provided to allow a user to input the email address for the selected advertiser. A Website field may be provided to allow a user to input the website URL of the selected advertiser. This and other data input will be used in the future to provide forecasting and reporting as a key performance indicator ("KPI").

With continued reference to FIG. 7, a Mailing/Billing Address section of General tab of advertiser details pane 94 may be provided to show the address for invoices and confirmations, and may provide fields for data input by a user. For example, a field Address #2 may be provided to allow a user to input the selected advertiser's suite or building number where advertiser's mail should be sent. An Attention field may be provided to allow a user to enter the name of the individual who should receive billing or mailing items.

An Assigned Users field may be provided to allow a sales manager to list account executives that are assigned to an advertiser. A person skilled in the art will recognize that other fields may be added under the General tab to further integrate information for and automate the sales process. A person skilled in the art will also recognize that the General tab may also be used in the other main menu selections. For example, the Agencies main menu selection may also display a General tab with similar fields.

Once a user has finished entering all new general information, a Save icon on the toolbar of the media proposal GUI 70 may be clicked to save the information. A pop-up message may be provided to confirm that the save is complete or to display a message showing which fields need to be completed. If any changes were made to the general information without being saved, a warning may be provided to ensure that changes are saved before moving on to another tab. To cancel any changes, a user may select the Cancel icon from the toolbar.

Figure 8:
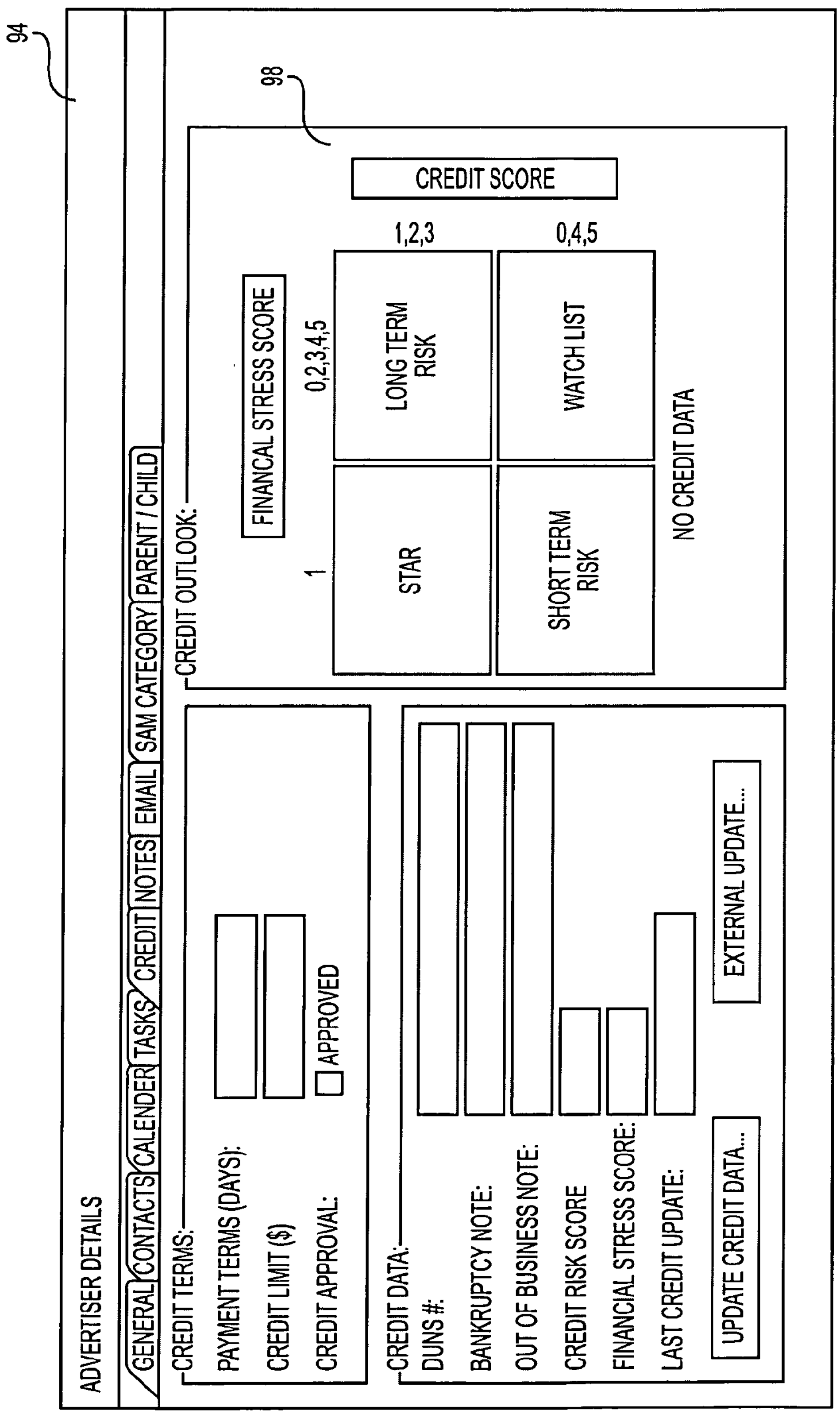
FIG. 8 is a screen shot of an exemplary advertiser details GUI, showing a credit tab, in a software implementation of an embodiment of system for creating and managing advertising proposals from inception to completion.

With reference now to FIG. 8, shown is an embodiment of a credit pane 98, accessed through selecting credit tab on advertiser detail pane 94. In an embodiment, Dun and Bradstreet credit information for businesses, and a third-party system for providing that information, may be interfaced with media proposal system 10 to provide users such as account executives or sales managers with credit information on advertisers, agencies, or other customers. In an embodiment, other users such as business managers may be limited to recording credit terms and data for an advertiser. In an embodiment, a business manager may be in charge of assessing the current risk for a given advertiser or agency, and specify the terms on which credit may be extended. An account executive or sales manager may then view those terms in credit pane 98 to follow through with them. A sales manager or account executive may choose a search option in the Search Types drop-down list, and then click Search in the icon toolbar. A user may edit credit information for a selected advertiser or agency by selecting the Edit icon from the toolbar.

By providing this credit information, media proposal system 10 automates this credit-check step in the sales process. A media outlet, such as a radio station, must evaluate the credit risk that may be posed by advertisers and agencies before rendering services. In an embodiment, the business manager needs to be able to determine whether the advertiser or agency is sufficiently creditworthy to be sold radio advertising, such as without limitation radio streaming advertising or terrestrial radio advertising. In an embodiment, a DUNS number may be required for the business manager to view credit data on an account, but after this number is matched to the advertiser or agency, the business manager can update the Advertised Agency Record with the credit risk on the account.

With continuing reference to FIG. 8, in an embodiment, a business manager may provide information in a number of fields of credit pane 98. Credit Terms fields may be provided in which a business manager may edit a Payment Terms field (which may, for example, be listed in days), a Credit Limit field (which may, for example, be listed in dollars), and a Credit Approval field in which a business manager may affirmatively indicate that credit has been approved for an advertiser as reported by Dun and Bradstreet.

In an embodiment, a business manager may be able to view the fields described below in a credit data section of the credit pane 98. The Bankruptcy Note field lists any notes about the bankruptcy status of the advertiser, and the Out of Business Note field lists any notes about the out-of-business status that may apply to the advertiser. A Credit Risk Score field may be provided to allow a business manager to view a number that predicts the likelihood that an advertiser will pay its bills in a severely delinquent manner, for example, 90+ days past term, or the likelihood that the media outlet or enterprise will have to obtain legal relief from creditors, or the likelihood that an advertiser will cease operations without paying all creditors in full over the next 12 months. In an embodiment, scoring may be provided a range from 1 to 5, with 1 being the most favorable ranking. Similarly, a Financial Stress Score field may be provided to assist a business manager in assessing the likelihood of an advertiser ceasing business without paying all creditors in full, or reorganizing, or obtaining relief from creditors under state or federal law over the next 12 months. A Last Credit Update field may be provided to show the date on which any updates were made to the advertiser's credit. Additionally, in an embodiment of the credit pane 98, an Update Credit Data button may be provided to allow a business manager to automatically update credit data for an advertiser based on available information. An External Update button may be provided to allow a business manager to access data from a third party credit reporting service, or if a more recent update is needed. In an embodiment, the External Update button may provide a link to a third-party web site or application connected to Fusion through the Enterprise Bus.

With continuing reference to FIG. 8, in an embodiment, the credit pane 98 may also provide a Credit Outlook section that may allow a business manager to view a graphical representation of the combined Financial Stress Score and the Credit Score. This automated graphic may provide a business manager a quick way to evaluate credit risk in order to decide whether to extend credit to an advertiser (or agency, as the case may be). In an embodiment, four types of credit valuations may be displayed in a grid graphic. In the grid graphic, a Star graphic may be provided to denote an advertiser likely to pay, and to pay quickly. A Short Term Risk graphic may be provided to denote an advertiser likely to pay, but perhaps not likely to pay within the first 90 days of invoicing. A Long Term Risk graphic may be provided to denote an advertiser that is likely to either pay quickly, or if payment is not made quickly, likely not to pay for a long time or at all. A Watch List graphic may be provided to denote an advertiser not likely to pay in the first 90 days, if at all.

When the business manager finishes entering data into the Credit Terms fields under the credit pane 98, and after the business manager views the Credit Data fields and Credit Outlook graphic, a business manager may choose to click the "Credit Approval" field to allow the sales process to continue. After all data has been entered, the business manager may select the Save icon in the toolbar to save changes to the account. If the business manager desires to edit any of the terms later for a selected Advertiser, the Edit icon may be selected from the toolbar.

Those skilled in the art will recognize that other fields populated based on the DUNS number could be included in the credit pane 98. A person skilled in the art will also recognize that the credit pane 98 may also be used in the other main menu selections. For example, the Agencies main menu selection may also display a Credit tab with similar fields. A person skilled in the art will recognize that variations of the Credit Outlook graphic could be displayed, such as displaying different colors for the different credit risk evaluations.

Figure 9A:
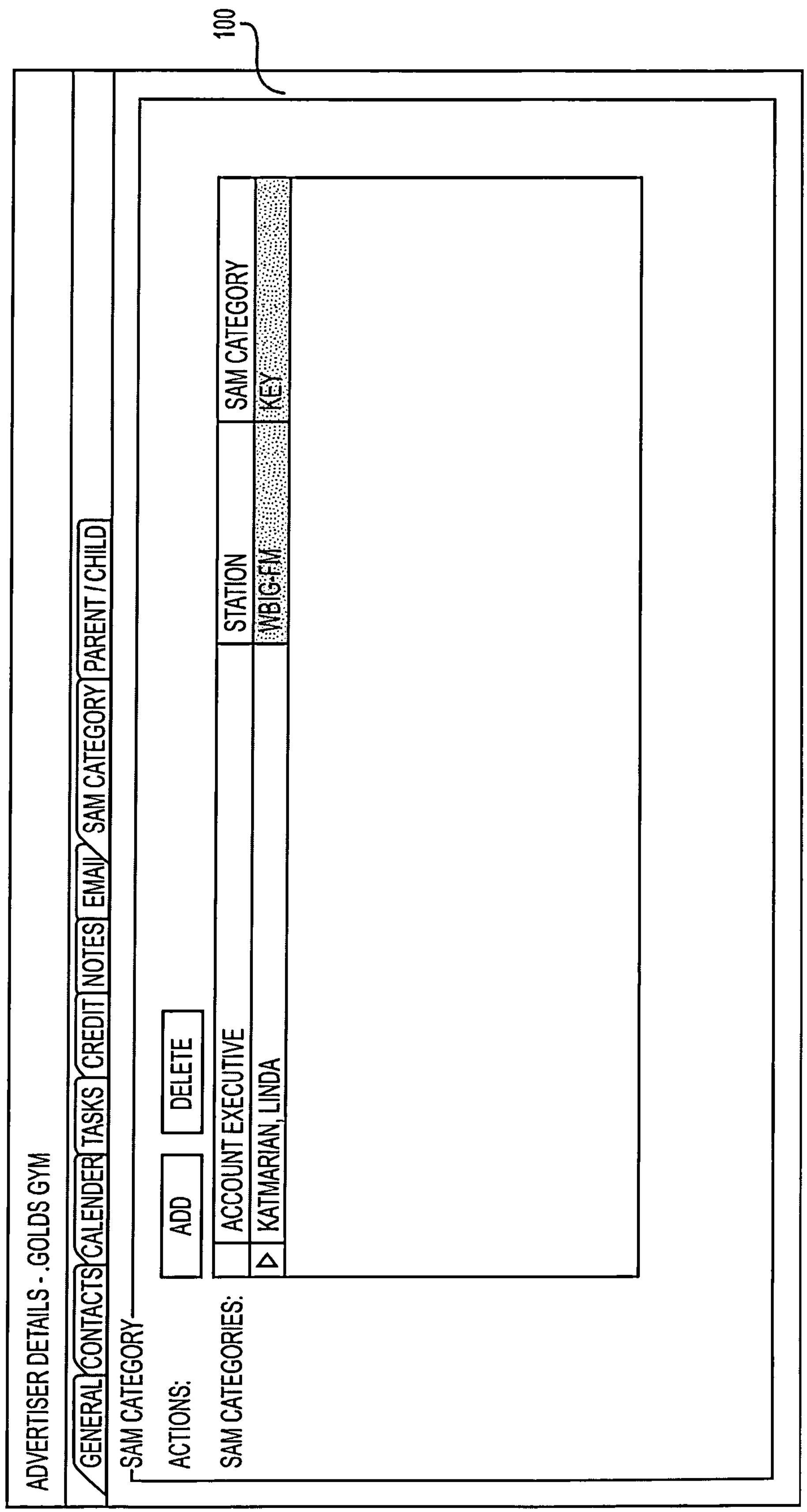
FIG. 9A is a screen shot of an exemplary advertiser details GUI, showing a strategic account management tab, in a software implementation of an embodiment of system for creating and managing advertising proposals from inception to completion.

With reference now to FIG. 9A, shown is an embodiment of a SAM pane 100, accessed through selecting SAM tab on advertiser detail pane 94. Media proposal system 10 allows for strategic account management. Those skilled in the art would appreciate how the embodiments described herein handle SAM. SAM, as it is known in the media industry, is a way to classify clients to better enable account executives to prioritize their time prospecting or servicing the accounts assigned to them. Key or primary accounts are the primary revenue stream for the account executives and as such are top priority for maintaining current campaigns and future activity. Secondary accounts are usually those that have bought media offerings in the past but do not do so consistently. Target accounts are those that could greatly benefit from media offerings and as such are "targeted" in the account executive's lists. Extra accounts are those that are hit or miss for using media products. Embodiments described herein use these categories to more efficiently handle workflow and account management. One way that embodiments assist account executives is by providing a higher visibility in reporting of Key and Target accounts. Another way is to display to sales managers the quantity of key accounts each account executive has in his/her list, so that sales managers can ensure the account executive maintains a balanced account load. Another is to provide the account executive with "tickler" alerts on accounts that need attention based on a rule set for each category (e.g., more reminders for a key account than a second account, etc.).

With continuing reference to FIG. 9A, just as an account executive may be assigned to an advertiser or agency, an account executive may be assigned to a particular media outlet (e.g., a radio station) to manage the various advertiser or agency accounts for that station. To add or delete an account executive assignment, a sales manager may select the Edit icon from the toolbar or select add or delete on SAM pane 100. Then, a sales manager may add a SAM category and corresponding station from drop-down main menus within the field SAM Category by clicking on an Add button. To delete a category, a sales manager may click on a "Delete" button. After all of the changes to the SAM category pane 100 are made, the sales manager may select a Save icon in the toolbar to save changes to the account.

Figure 9B:
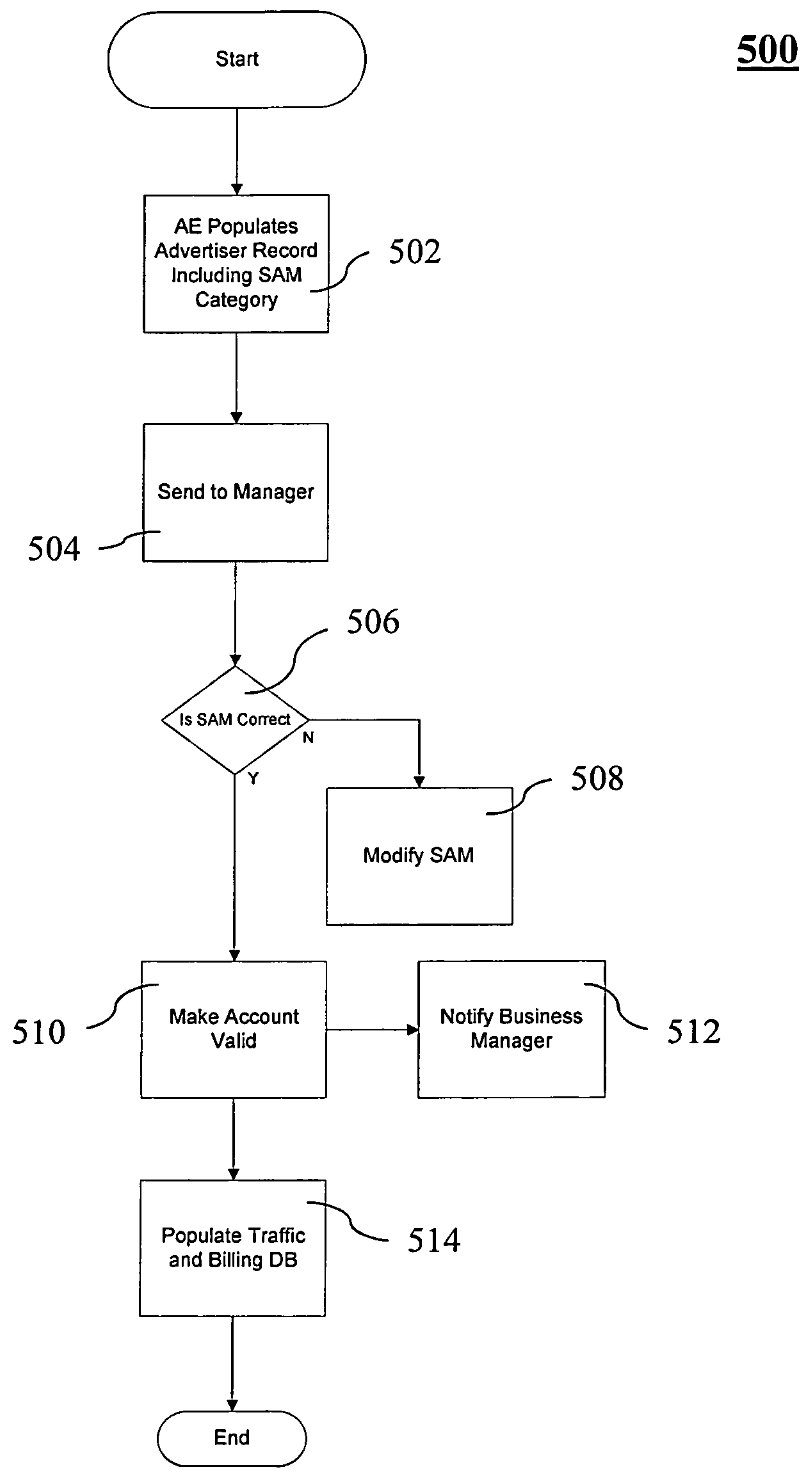
FIG. 9B is a flowchart illustrating an embodiment of a method for adding an advertiser in an embodiment of system for creating and managing advertising proposals from inception to completion.

With reference now to FIG. 9B, shown is an embodiment of method 500 for adding a new advertiser account to media proposal system 10. Method 500 may utilize media proposal system 10 GUIs as described herein. Media proposal system 10 receives user (e.g., account executive) input of advertiser account record, including a SAM category, block 502. An account executive, for example, may enter this information through GUIs as described herein. Media proposal system 10 sends new account record to sales manager, block 504. For example, media proposal system 10 may list new customer account under a "Needing My Attention" folder or pane of sales manager's media proposal GUI 70. Sales manager determines whether SAM is correct, block 506 and modifies SAM in customer record, block 508, if not correct. Sales manager validates account (e.g., selects "Valid" on customer record screen), block 510. Media proposal system 10 notifies business manager, block 512, e.g., by removing new customer account from sales manager instance of media proposal GUI 70 and listing new customer account under on business manager's media proposal GUI 70. Media proposal system 10 then forwards new customer record to traffic and billing system, populating traffic and billing database 16 with customer record, block 514. In this manner, media proposal system 10 synchronizes with traffic and billing system.

In an embodiment, media proposal system 10 provides a system and method for creating and maintaining parent/child relationships between media customer (e.g.; advertiser) records in the traffic and billing system (e.g., VIERO® RMS) and media proposal system 10. In an embodiment, media proposal system 10 enables users (e.g., account executives) to define multi-dimensional relationships between media customers, media agencies (e.g., advertising agencies), media advertising providers, and/or account representatives (representing one or more media outlets—e.g., radio station, television station, interne site, newspaper, etc.). The method and system of relationship defining enables media customers to be easily brokered through third-party representation, enables strategic account tagging in media proposal system 10 and traffic and billing system, defines relationships between account representatives and media customers, provides electronic billing data that can be parsed to multiple invoice customers and aggregated across a media enterprise and allows for unique report.

With reference now to FIGS. 10A to 10G, shown are block diagrams illustrating various types of exemplary advertiser relationships that may be defined using media proposal system 10. In an embodiment of media proposal system 10, the advertiser record is the central record. Around the advertiser record, stored in media proposal system database 14, a user may build proposals, relationships and conduct reporting. One of ordinary skill in the art will realize from the description herein that the illustrated relationships are examples and that many different relationships may be defined within the scope of media proposal system 10 and the description herein. An account executive typically defines the relationships by associating them with the advertiser record. In some circumstances, relationships are parent/child relationships, and the account executive typically defines who within a relationship is parent and who is child. This may be done, for example, using functionality shown in FIGS. 11A-C and described below.

Figure 10A:
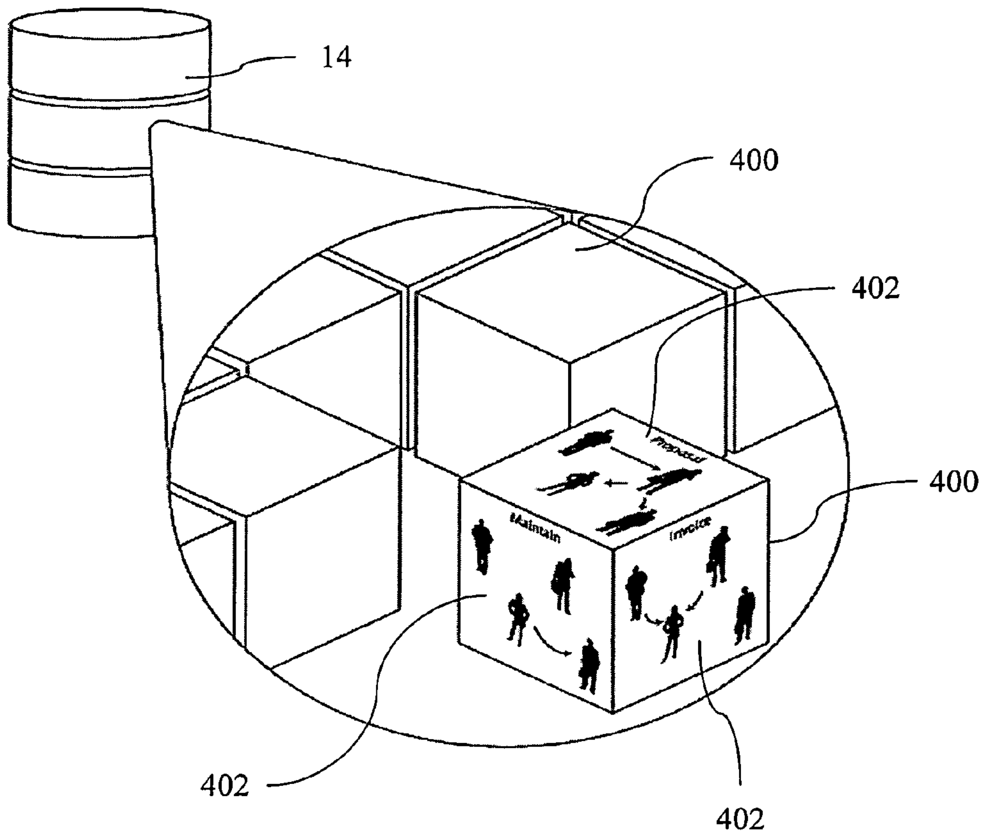
FIG. 10A is a diagram illustrating an advertiser record in a media proposal system database in an embodiment of system for creating and managing advertising proposals from inception to completion.

With reference to FIG. 10A, it is particularly noteworthy that relationships for an advertiser may be different depending on the context. Specifically, an advertiser may have different relationships for each stage of workflow within the proposal process of media proposal system 10. These stages include proposal (creation, submission, approval and injection of proposal in traffic and billing system), maintenance (maintaining campaign schedule and reporting on orders after injection and invoicing (invoicing customers for completed advertising campaigns). The relationships defined for each advertiser establish and include business rules that are utilized by media proposal system 10 in the performance of each of these stages.

As shown in FIG. 10A, media proposal system database 14 includes advertiser records 400 for each advertiser. In an embodiment, each advertiser record 400 includes user-defined relationships and the business rules to be applied for each of the relationships. As shown, the relationships for advertiser record 400 include different relationships 402 for the proposal, maintenance and invoicing stages. In the proposal stage, for example, the relationship 402 may be defined as being between media representative (e.g., account executive) and national advertiser, via representative firm and agency. The relationship 402 may be defined with business rules so that media proposal system 10, applying business rules, knows to submit proposal to representative firm for forwarding to advertiser for approval. In the maintenance stage, for example, relationship 402 may be defined as being between media representative and advertiser directly, in which business rules direct media proposal system 10 to forward generated reports to advertiser directly; alternatively, relationship may be defined as just between media representative and representative firm, with corresponding business rules. Likewise, in the invoicing stage, relationship 402 may be defined as being between media representative and representative firm or agency alone, with corresponding business rules that direct media proposal system 10 to invoice, or instruct associated invoicing system to invoice representative firm or agency directly. One of skill in the art may see the almost innumerable permutations of relationships and corresponding business rules here.

Figure 10B:
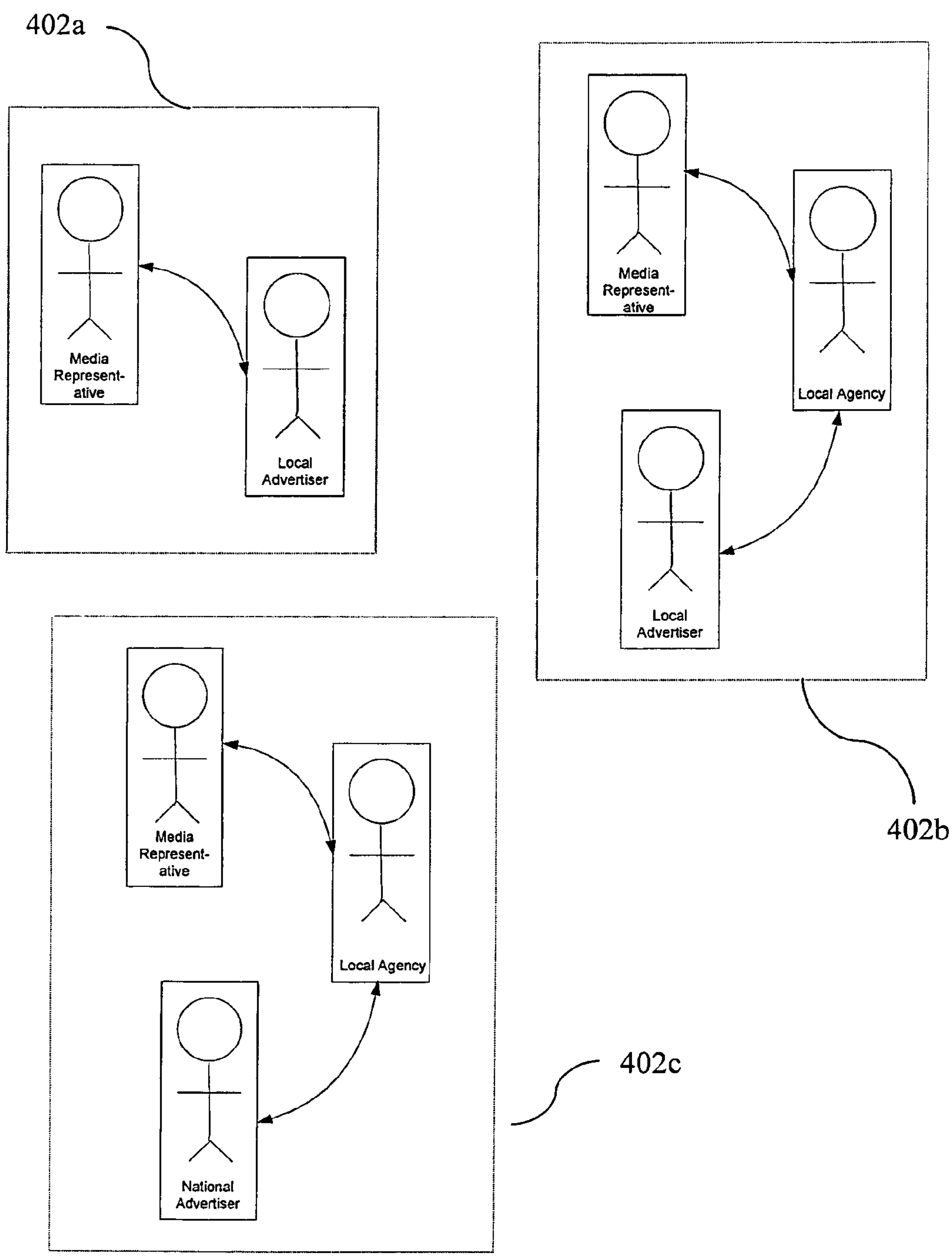
FIGS. 10B-10G are diagrams illustrating various relationships defined and implemented using an embodiment of system for creating and managing advertising proposals from inception to completion.

With reference now to FIG. 10B, shown are three exemplary relationships 402 connecting a single media customer (e.g., a local advertiser or national advertiser) and a single media outlet (e.g., a radio or TV station). The relationships 402 shown here may be proposal stage relationships. In the first relationship 402*a* shown, media proposal system 10 has defined a relationship 402*a* between a media representative (e.g., account executive) for media outlet and a local advertiser (an advertiser in the local market of the media outlet). In this relationship 402*a*, the media representative deals directly with the local advertiser and relationship 402*a* business rules direct media proposal system 10 to submit media advertising proposals directly to the local advertiser. In the second relationship 402*b* shown, media proposal system 10 has defined a relationship 402*b* between a media representative, a local advertising agency, and a local advertiser. As mentioned above, the account executive may define the agency as the parent and the advertiser as the child (see below for discussion of relationship defining). However, the details of a particular purchase or "buy" of advertising typically determine the definition of the parent child relationship. In relationship 402*b*, the media representative deals with local advertising agency and relationship 402*b* business rules direct media proposal system 10 to submit media advertising proposals to the local advertising agency, which places advertising with media outlets for local advertiser. In the third relationship 402*c* shown, media proposal system 10 has defined a relationship 402*c* between a media representative, a local advertising agency, and a national advertiser. In relationship 402*c*, the media representative deals with local advertising agency, which places advertising with local media outlets for national advertiser. In all of the relationships shown, there is a 1-to-1 relationship between media outlet and advertiser and are stored in the advertiser record 400.

Figure 10C:
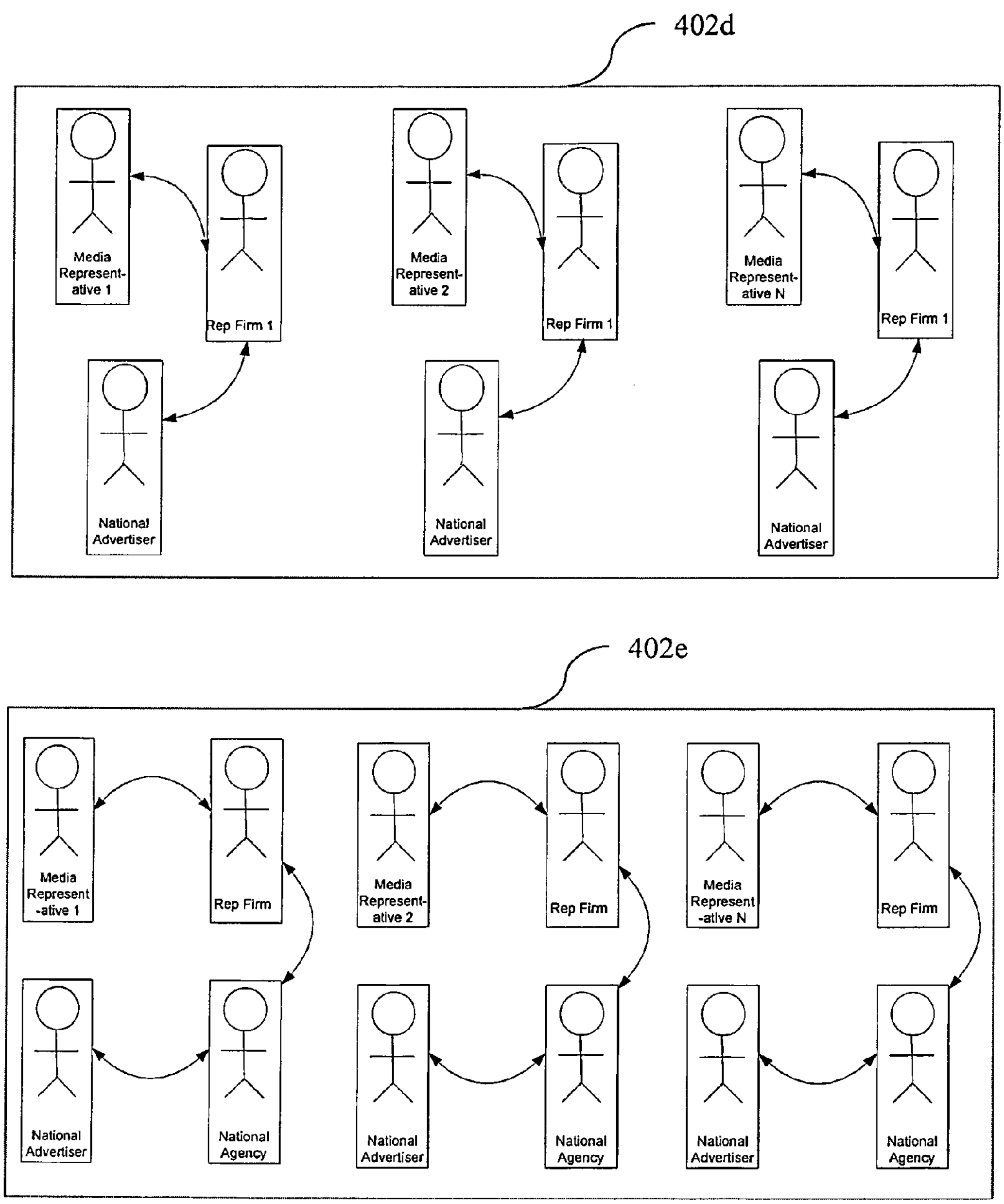

With reference now to FIG. 10C, six additional exemplary relationships 402 connecting a single media customer (e.g., a local advertiser or national advertiser) and multiple media outlets (e.g., a radio stations) are shown. The relationships 402 shown here may also be proposal stage relationships. In the first three relationships 402*d* shown, media proposal system 10 has defined relationships 402*d* between media representatives (e.g., account executives) for three media outlets, a representative firm (e.g., KATZ media) and a national advertiser. As above, the representative firm may be defined as the parent, the national advertiser and/or the media representative as the child, and this may change based on functions executed in the buy, as described above. In these relationships 402*d*, the media representatives for each media outlet (e.g., television stations—note can be multiple media types) deal with the representative firm and relationship 402*d* business rules direct media proposal system 10 to submit media advertising proposals to the representative firm, which places advertising for national advertiser.

In the second three relationships 402*e* shown, media proposal system 10 has defined relationships between media representatives (e.g., account executives) for three media outlets, a representative firm, a national advertising agency, and a national advertiser. In these relationships 402*e*, the media representatives for each media outlet (e.g., interne sites) deal with the representative firm and relationship 402*e* business rules direct media proposal system 10 to submit media advertising proposals to the representative firm, which places advertising for national advertiser, who is represented by national advertising agency. All of these relationships 402*d*, 402*e* represent a one-to-many relationship for the advertiser and are stored in the advertiser record 400.

Figure 10D:
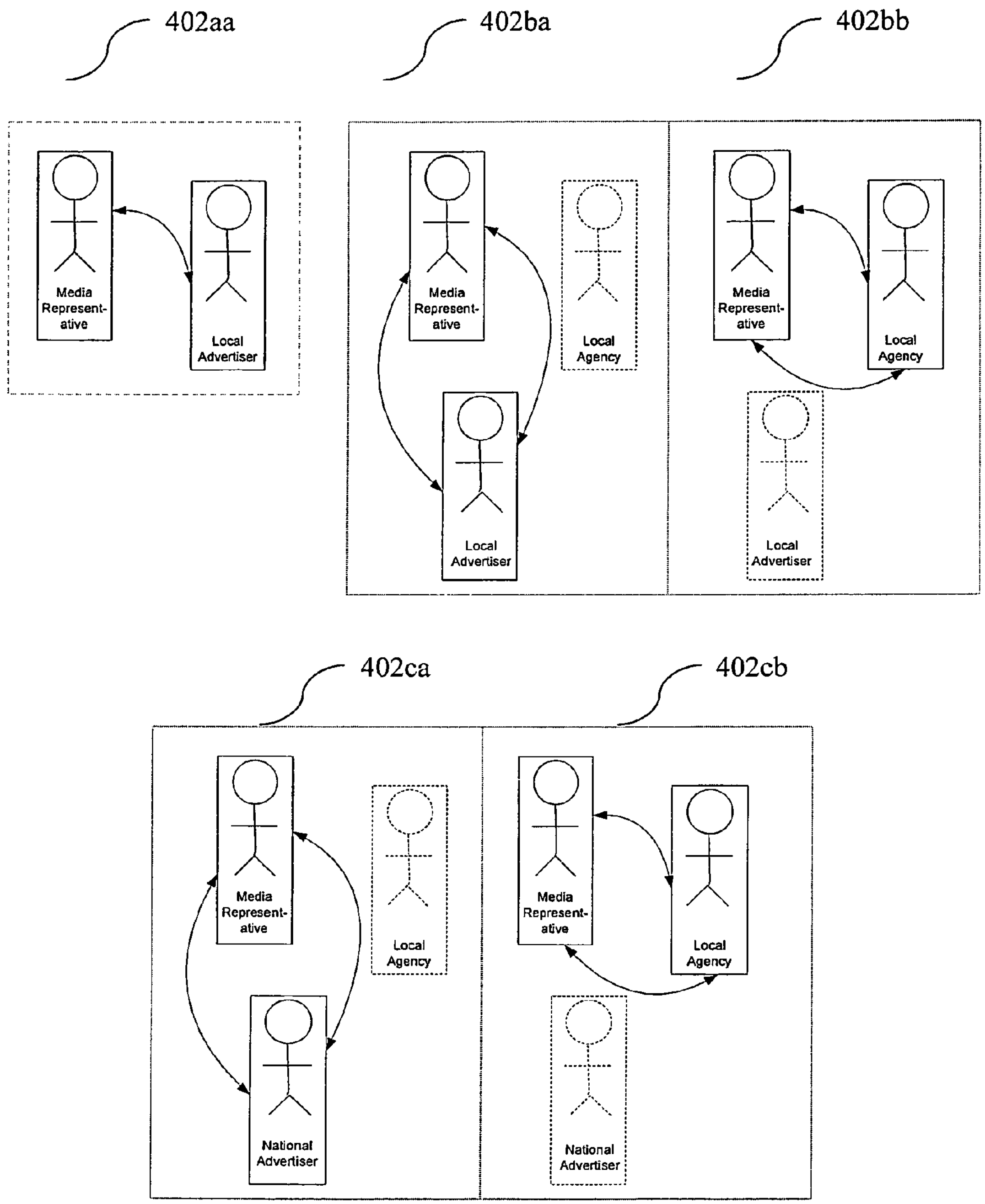

With reference now to FIG. 10D, shown are relationships 402 corresponding to the single advertiser, single media outlet relationships 402 shown in FIG. 10B. The relationships 402 shown here may be maintenance stage relationships 402. Media proposal system 10 has defined a relationship 402*aa* between a media representative (e.g., account executive) for media outlet and a local advertiser (an advertiser in the local market of the media outlet). As above, in this relationship 402*aa*, the media representative deals directly with the local advertiser and relationship 402*aa* business rules direct media proposal system 10 to send reports, communications, and other information regarding order scheduling maintenance directly to the local advertiser.

Media proposal system 10 has defined two relationships 402 corresponding to relationship 402*b* in FIG. 10B: relationship 402*ba* between a media representative and a local advertiser, in which local agency is omitted, and relationship 402*bb* in which advertiser is omitted (for maintenance purposes). The relationships 402 shown here may be maintenance stage relationships 402 (alternatively, the relationships 402 could be proposal stage relationships in which proposals are communicated per business rules defined by relationships 402). In relationship 402*ba* business rules dictate media proposal system 10 sends reports, communications, and other information regarding order scheduling maintenance directly to the local advertiser, and local advertiser communicates directly with media representative. In relationship 402*bb* business rules dictate media proposal system 10 sends reports, communications, and other information regarding order scheduling maintenance directly to local agency, and local agency communicates directly back with media representative. Media proposal system 10 has also defined two relationships 402 corresponding to relationship 402*c* in FIG. 10B relationship 402*ca* between a media representative and national advertiser, in which local agency is omitted, and relationship 402*cb* in which national advertiser is omitted (for maintenance purposes). In relationship 402*ca* business rules dictate media proposal system 10 sends reports, communications, and other information regarding order scheduling maintenance directly to the national advertiser, and national advertiser communicates directly with media representative. In relationship 402*cb* business rules dictate media proposal system 10 sends reports, communications, and other information regarding order scheduling maintenance directly to local agency, and local agency communicates directly back with media representative. All of these relationships are stored in the advertiser record 400.

Figure 10E:
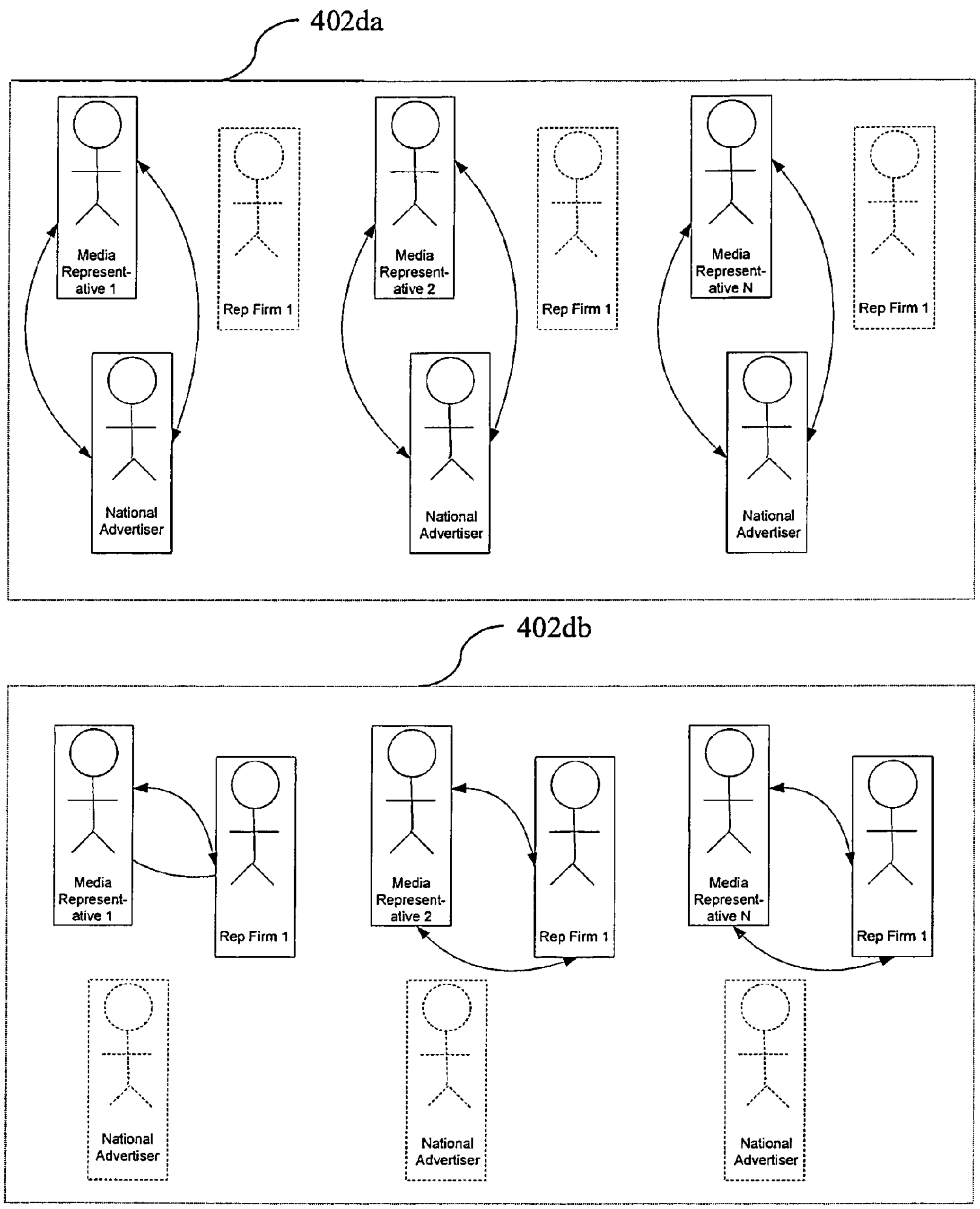

With reference now to FIG. 10E, shown are multiple relationships 402 corresponding to relationships 402*d* in FIG. 10C: relationships 402*da* between media representatives and a national advertiser, omitting a representative firm, and relationships 402*db* between media representatives and a representative firm, omitting the national advertiser. The relationships 402 shown here may be maintenance stage relationships 402 (alternatively, the relationships 402 could be proposal stage relationships in which proposals are communicated per business rules defined by relationships 402). In relationships 402*da*, business rules dictate media proposal system 10 sends reports, communications, and other information regarding order scheduling maintenance directly to the national advertiser, and national advertiser communicates directly with media representatives. In relationships 402*db* business rules dictate media proposal system 10 sends reports, communications, and other information regarding order scheduling maintenance directly to the representative firm, and representative firm communicates directly with media representatives. All of these relationships are stored in the advertiser record 400.

Figure 10F:
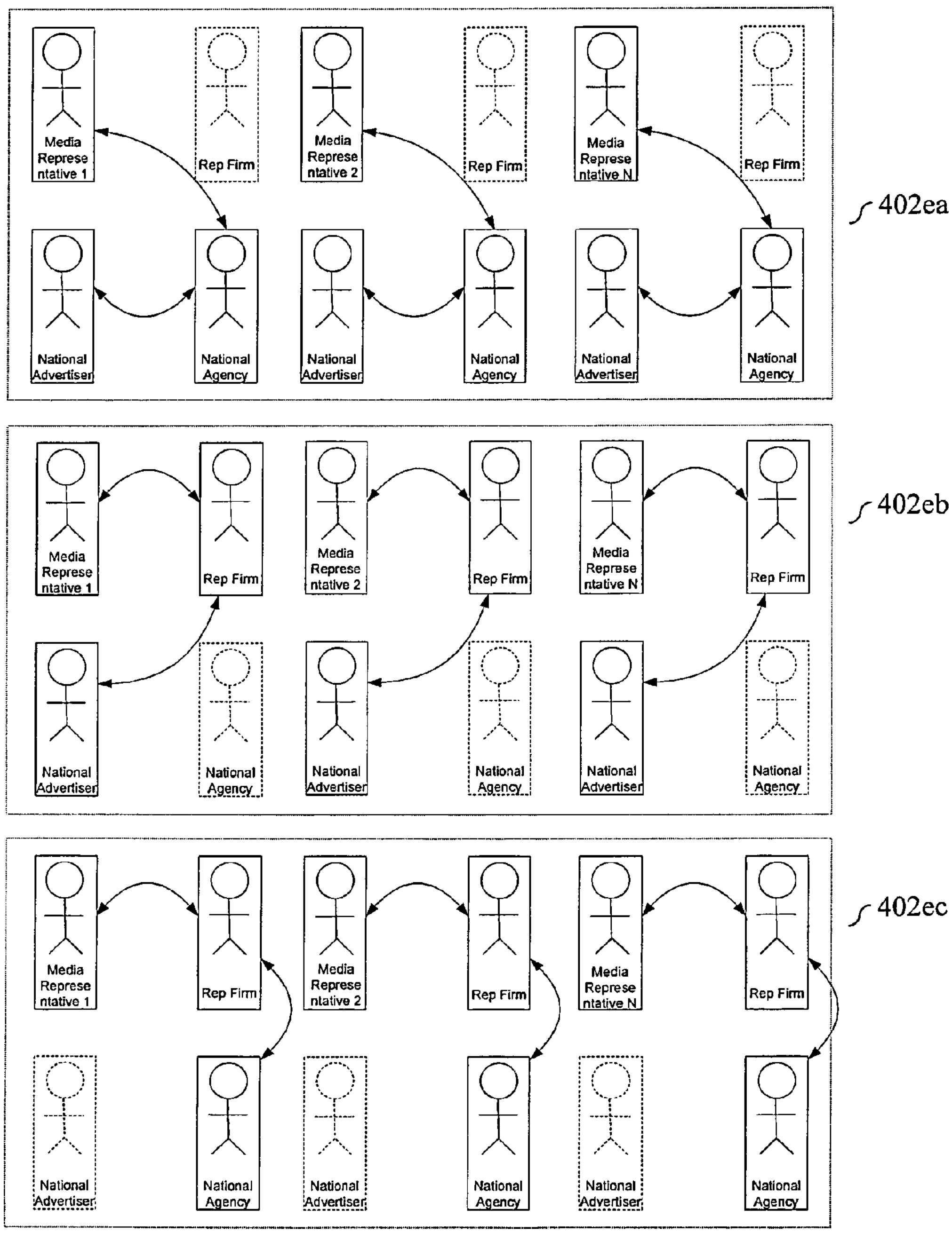

With reference now to FIG. 10F, shown are multiple relationships 402 corresponding to relationships 402*e* in FIG. 10C: relationships 402*ea* between media representatives and a national advertiser via a national agency; relationships 402*eb* between media representatives and national advertiser, via a representative firm; and relationships 402*ec* between media representatives and a national agency, via a representative firm. The relationships 402 shown here may be maintenance stage relationships 402 (alternatively, the relationships 402 could be proposal stage relationships in which proposals are communicated per business rules defined by relationships 402). In relationships 402*ea*, business rules dictate media proposal system 10 sends reports, communications, and other information regarding order scheduling maintenance to the national advertiser via the national agency, and national advertiser communicates with media representatives through the national agency. In relationships 402*eb* business rules dictate media proposal system 10 sends reports, communications, and other information regarding order scheduling maintenance to the national advertiser via the representative firm, and national advertiser communicates with media representatives via the representative firm. In relationships 402*ec* business rules dictate media proposal system 10 sends reports, communications, and other information regarding order scheduling maintenance to the national agency via the representative firm, and national agency communicates with media representatives via the representative firm. All of these relationships are stored in the advertiser record 400.

Figure 10G:
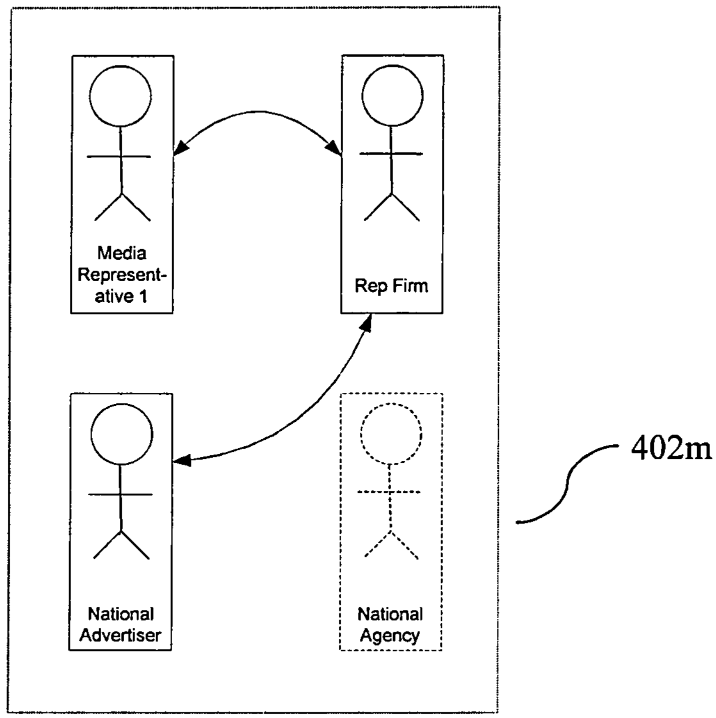
Figure 10G:
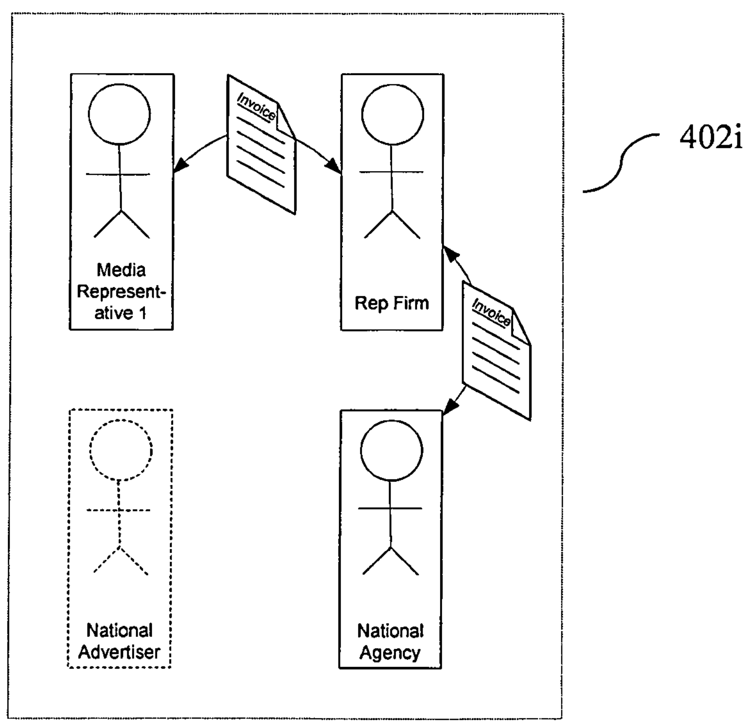

With reference now to FIG. 10G, shown are a maintenance stage relationship 402*m* and a corresponding invoicing stage relationship 402*i*. In maintenance stage relationship 402*m*, media representative communicates to national advertiser through representative firm, omitting national agency (i.e., business rules dictate media proposal system 10 sends reports, communications, and other information regarding order scheduling maintenance to national advertiser via representative firm). In corresponding invoicing stage relationship 402*i*, media representative communicates invoice to national agency via representative firm (i.e., business rules dictate media proposal system 10, or separate invoicing system as directed by media proposal system 10, send invoices to national agency via representative firm). As one of skill in the art can determine from the above, nearly innumerable other maintenance and invoicing relationships may be defined. All of these relationships are stored in the advertiser record 400.

Figure 11A:
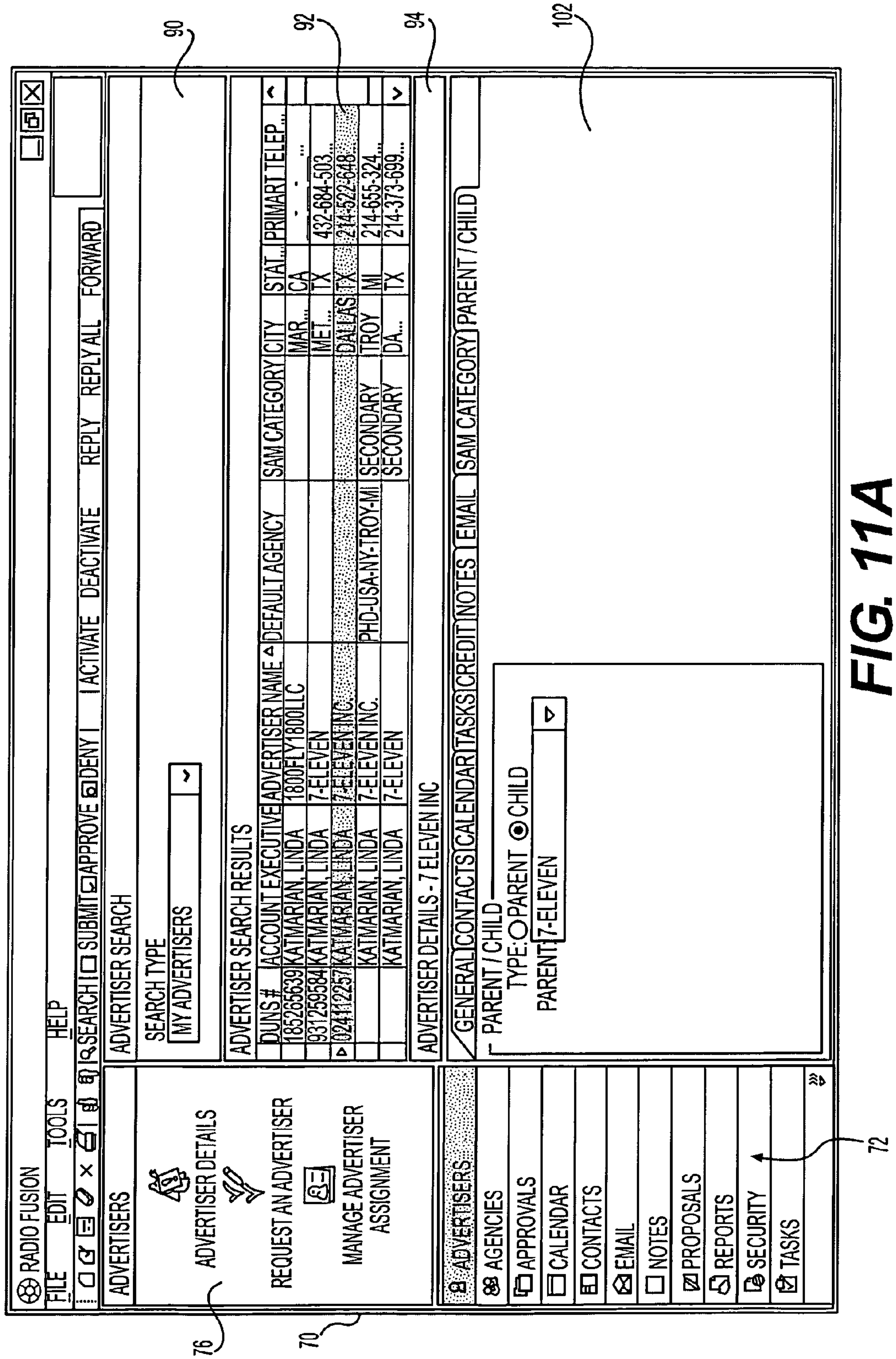
FIG. 11A is a screen shot of an exemplary advertiser search GUI, showing a parent/child tab, in a software implementation of an embodiment of system for creating and managing advertising proposals from inception to completion.
Figure 11B:
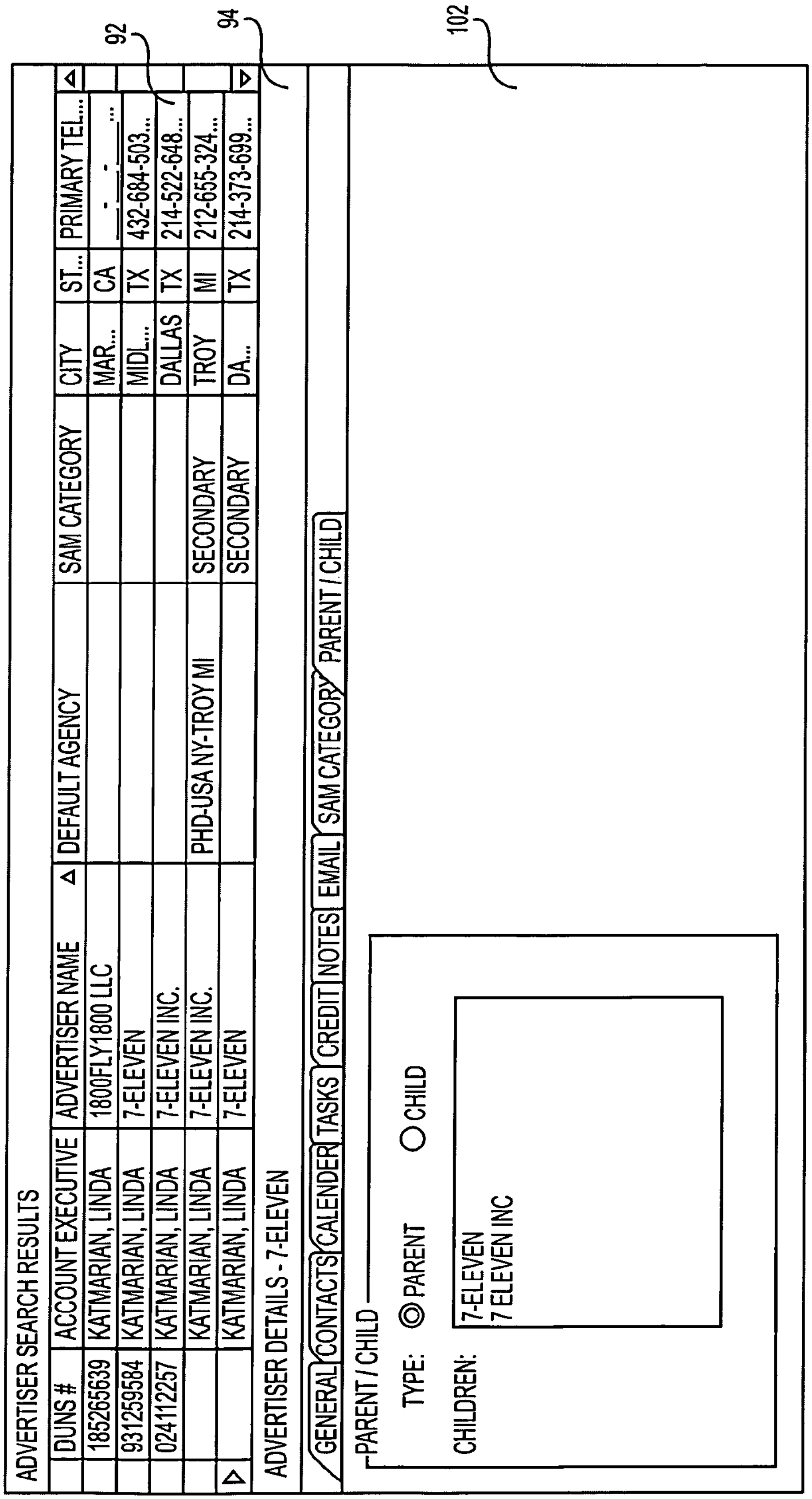
FIG. 11B is a screen shot of an exemplary advertiser search results GUI, showing a parent/child tab, in a software implementation of an embodiment of system for creating and managing advertising proposals from inception to completion.

With reference now to FIGS. 11A-11B, shown is an embodiment of a parent/child pane 102, accessed through selecting parent/child tab on advertiser detail panel 94. Sometimes advertisers and agencies may be related to other advertisers or agencies, or to representative firms, etc., as shown above. For example, a user may desire to relate all of the 7-Eleven stores in a market to an independent regional owner. Media proposal system 10 keeps track of these relationships and allows a user to view relationships very quickly. In an embodiment, the parent/child pane 102 allows a sales manager to assign a parent or child relationship to an advertiser, agency, representative firms, etc. The parent/child pane 102 may also allow for requesting roll-up reporting of revenue; roll-up reporting rolls-up the revenue of all children of a parent into the parent's revenue so that a single view of the parent's and the children's revenue is shown under the parent. In the example of 7-Eleven above, advertising revenue can be viewed for 7-Eleven as a company or by regional 7-Eleven franchise ownerships. The parent/child functionality is a continuation of the data cleansing and standardization that takes place during the implementation of media proposal system 10. As described herein, media proposal system 10 includes tools that do bulk data cleansing at the beginning of implementation after which, the parent/child functionality provides continuous efforts to improve data quality. Workflow and other functionality within the media proposal system 10 force proper validation of advertiser records that are missing data such as parent/child information.

In an embodiment, a user may first designate an advertiser as a parent. Next, the user may, select one or more advertisers that are to be the children of the parent advertiser by highlighting an advertiser from the advertiser search results pane 92 (as see in FIG. 11B). In an embodiment, a user will not be able to edit the parent-child relationships under the parent/child pane 102 unless the user has clicked on the Edit icon in the toolbar and then clicked the Parent or Child checkbox in the advertiser details pane 94 under the parent/child pane 102. A drop-down list called Parent may be used to assign a child advertiser. By highlighting an advertiser from the Parent drop-down list, an advertiser highlighted in the advertiser search results pane 92 may be assigned a child relationship to the parent in the drop-down list. The user may click on the Save icon in the toolbar to save changes made to the parent and child relationship. When the assignments are complete, a user may select the parent in the advertiser search results pane 92 and the children assigned to that parent will be displayed in the parent/child pane 102. A person skilled in the art will recognize that the parent/child pane 102 may be used in other main menu selections. For example, the Agencies main menu selection may contain a parent/child panel with similar fields and functions to enable the user to assign relationships between agencies. This Parent Child relationship is common in media advertiser management.

With continuing reference to FIGS. 11A-11B, in an embodiment, a number of business rules may be applied to parent/child relationships. For example, in an embodiment, an account must be designated as either a parent or a child. All accounts are parents by default until assigned to a parent, a parent cannot be a child of another parent, a child can only be assigned otherwise, a parent can have zero to many children, and, when selecting a parent account, a user may not choose the same account as a parent. Accounts must be stored in a traffic and billing engine (e.g., VIERO® RMS) before they can be assigned a child or parent status. Only active accounts may be displayed on the parent/child pane 102. The child account may be deactivated. A parent account with no children may be deactivated. All children accounts must first be disassociated from a parent account before a parent account may be deactivated. If a user decides that a parent account should become a child account, the user will be asked if the children will inherit the new parent. Parent/child relationships cannot cross between advertisers and agencies. Only sales managers, business managers and traffic managers are provided by default security read/write access to the parent/child pane 102, whereas account executives are not provided read-only access. Those having skill in the art will recognize that such rules as the preceding are exemplary, are helpful, but not necessary, and that other or different rules may be suitable or appropriate.

Figure 11C:
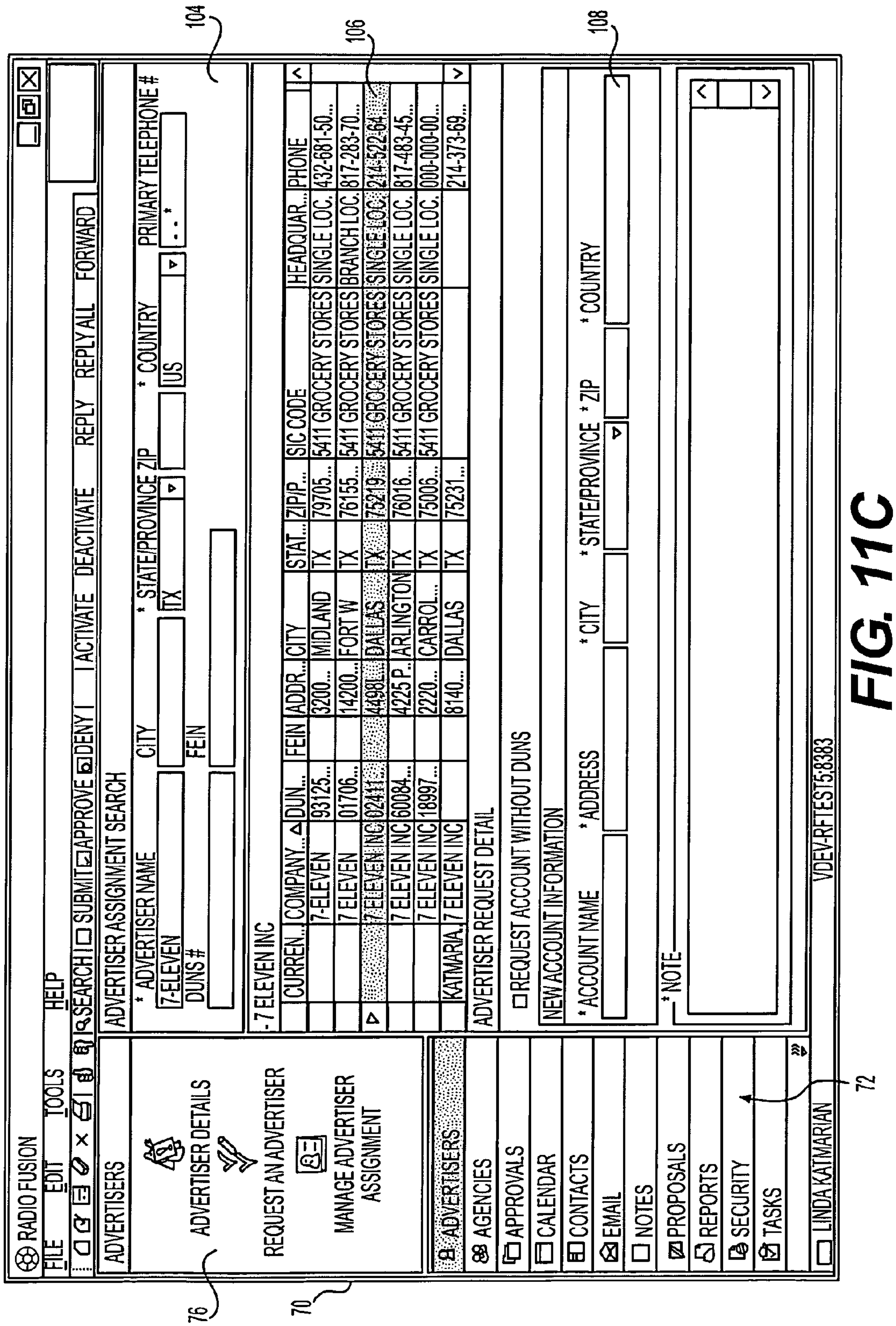
FIG. 11C is a screen shot of an exemplary advertiser assignment search GUI is a screen shot of an exemplary advertiser search GUI in a software implementation of an embodiment of system for creating and managing advertising proposals from inception to completion.

As discussed above, embodiments of media proposal system 10 may allow an account executive to request assignment to a particular advertiser. With reference to FIG. 11C, shown is an embodiment of a window, advertiser assignment pane 104, through which a user, such as an account executive, may request an advertiser assignment. In an embodiment, an account executive may request assignment to an advertiser by clicking on a Request an Advertiser icon that may be provided in upper left-side 76 of the media proposal GUI 70. After the account executive clicks on the Request an Advertiser icon, advertiser assignment search pane 104, advertiser assignment search results pane 106 and advertiser request detail pane 108 may become visible in the media proposal GUI 70.

In an embodiment, an account executive may search for an advertiser using the search functionality provided through an advertiser assignment search pane 104. An account executive may, for example, search by advertiser name, city, state or province, ZIP code, country, telephone number, DUNS number and Federal Employer Identification Number (FEIN). The media proposal GUI 70 may provide a Search icon in the toolbar to execute the search. Search results may be provided in a list of advertisers matching the search criteria. In an embodiment, the list of search results may be provided in advertiser assignment search results pane 106, as depicted in FIG. 11C. The search results may be organized into a number of columns. A Current Assignment column may be provided to display the name of the account executive currently assigned to the account. A Company Name column may be provided to display the name of the company (advertiser). A DUNS # column may be provided to display the DUNS number of the advertiser. A FEIN column may be provided to display the Federal Employer Identification Number of the advertiser. An address column may be provided to display the street address of the advertiser. A city column may be provided to display the name of the city of the advertiser. A State/Province column may be provided to display the state where advertiser has a business location. A Zip/Postal Code column may be provided to display the postal location code of the advertiser. A SIC code column may be provided to display the Standard Industrial Classification of the advertiser. A Headquarters/Branch column may be provided to identify the type of office, e.g., whether a particular office location is used as the advertiser's headquarters, or is a regional or local branch. A phone column may be provided to list the advertiser's phone number. Each column has a drop-down arrow at the top to enable an account executive to sort the result listings. In an embodiment, clicking once on a column head may sort the column in ascending alphabetical order, and clicking twice on a column head may sort the column in descending alphabetical order.

With continuing reference to FIG. 11C, in an embodiment, the results of the search in advertiser assignment search results pane 106 may be coded with different colors. For example, the color green may be used if the advertiser has a traffic and billing system ID (e.g. a VIERO® ID) stored in the media proposal system database 14, the color blue may be used if the advertiser does not have a traffic and billing system ID stored in the media proposal system database and was requested, and no color may be used if the advertiser is not fully registered in the media proposal system database is a result set from DUN and Bradstreet. This functionality and process acts to assist users, whether account executives, sales managers, business managers and/or traffic managers, see visual clues to help data cleansing. Prior to media proposal system 10, many records for the same advertiser would exist because of different or misspellings which created inconsistencies in local, regional and rollup enterprise reporting. Also contained in this process is required workflow based on business rules such as a second set of eyes looking at the advertiser or agency record creations.

An account executive may click on an advertiser in advertiser assignment search results pane 106 to highlight the advertiser they want to request. An advertiser request detail pane 108 may be provided in the media proposal GUI 70, and that pane 108 may be populated with advertiser information. In an embodiment, a Notes field may be provided in advertiser request detail pane 108. An account executive may provide in the notes field reasons for requesting the selected advertiser. In an embodiment, the media proposal GUI 70 may provide a Request Account Without DUNS box in the advertiser request detail pane that may be checked if the advertiser does not have a DUNS number or a DUNS number has not yet been assigned through media proposal system 10. When the Request Account Without DUNS box is checked, a new account information section of the advertiser request detail pane may be provided for the account executive to input advertiser information.

With continuing reference to FIG. 11C, after advertiser request detail pane 108 is completed, an account executive may click on a submit icon that may be provided in the toolbar to send the request to a sales manager. In an embodiment of advertiser request detail pane 108, a message may be provided to notify the account executive that the request was submitted to the sales manager.

A sales manager may review and approve the request by accessing an Approve an Advertiser Request pane that may be provided by clicking on the Approvals item that may be provided in the main menu. In an embodiment, two icons, Advertiser Assignment Requests and Agency Establishment Requests may be provided in an Approvals pane (now shown) of the media proposal GUI 70. A sales manager may search for Advertiser requests using the Search pane that may be provided in the media proposal GUI 70. The Search pane may contain a Search Types drop-down list to search for Advertisers by category. In an embodiment, the Search Types drop-down list may allow a sales manager to search for all items assigned to the sales manager, All Advertisers that returns all advertiser requests, or Submitted Advertisers that returns all advertisers that have been submitted to the sales manager selected from the Sales Manager List. The sales manager may then click on a Search icon that may be provided in the toolbar of media proposal GUI 70 in order to begin the search.

Those having skill in the art will appreciate that other users may access and use the Approvals function to view matters that pertain to a user. For example, in an embodiment, account executives may also search the All Advertisers option of the Search Types drop-down list to view advertisers assigned to that account executive. Sales assistants may also search using the All Advertisers option of the Search Types drop-down list to view advertisers assigned to that sales assistant. Sales managers searching the All Advertisers option of the Search Types drop-down list may see all advertisers in the market displayed. Those having skill in the art will appreciate that various users may have different access rights depending, for example, on the role that the user has in that sales process.

A sales manager may sort for all advertisers according to their approval status by choosing one of three options in the Status drop-down list. The sales manager can select the options Pending, Approved, or Denied from the Status drop-down list to search for Advertisers whose status is pending, approved, or denied. A sales manager may also select from a Sales Manager List drop-down list to search for a sales manager that may have approved or denied a request for an advertiser. After the sales manager selects the search criteria, a list of advertisers matching the search criteria may be provided in an advertiser request search results pane.

The advertiser request search results pane may display search results in multiple columns. Such columns may include Advertiser Name and DUNS # which are self-explanatory at this point. Other columns may include, for example, Requesting Account Executive which may display the account executive requesting assignment to the advertiser, Current Account Executive which may display the account executive(s) currently assigned to the advertiser, Submit Date which may display the request submission date, Current Status which may display the request status, and Status Date which may display the date when status changed. As described above, search results may be organized by clicking on a column's header. Those having skill in the art will also recognize that the column headers may also provide a drop-down list that provides various options for filtering the search results.

The media proposal GUI 70 may also provide advertiser details to the user utilizing the Approval functionality. An embodiment, the media proposal GUI 70 may provide tabs similar to those described above. The media proposal GUI 70 may also provide an Assignment Request tab that may display current approval status, request details, action notes, assigned users and workflow history. In an embodiment, this tab may provide view-only access for account executives.

Other users may have more than view only access, e.g., a sales manager. In embodiment, a sales manager may click on an Edit icon that may be provided in order to make any necessary modifications to the advertiser information on the Assignment Request tab.

In an embodiment, an Assignment Request tab may have a Current Status section that may display whether the request is approved, pending, or denied. The Assignment Request tab may also have a Request Details section that may display details about the requested advertiser, such as advertiser name, DUNS number, address, city, State, zip code, country, requesting account executive, status date and any request notes that may have been entered by the account executive in requesting the advertiser assignment. In an embodiment, a sales manager may also add an approval-related note in an Action field. To approve or deny the advertiser (or agency, as the case may be), a sales manager may click on Approve or Deny icons and may be provided in the toolbar to process the request. A confirmation message may be provided to the sales manager. Upon approval or denial, a notification may be sent to the requesting account executive.

A person skilled in the art will recognize that the approval process may be the same or similar for establishing an agency. A person skilled in the art will also recognize that the tabs on the Advertiser Request pane may have the same functionality and fields as the Advertiser Details or Agency Details panes. A person skilled in the art will recognize that other searchable fields and functions may be added to further automate the sales process wherein the sales manager approves of an advertiser. A person skilled in the art will also recognize that the Agency Establishment Requests icon may have similar fields and functions as the Advertiser Assignment Requests icon. Both icons may provide managers having authority the access necessary for approval of new advertisers or agencies before continuing on with generating proposals and taking orders.

In an embodiment, a sales manager may assign an account executive to an advertiser without the account executive having requested assignment to the advertiser. In this embodiment, advertiser search functionality may be provided to allow a sales manager to search for advertisers using various options. The Search Types drop-down main menu may provide a number of different search options. An All Advertisers search option may be provided to list all advertisers in the sales database. An Advertiser by AE may be provided to list all advertisers assigned to the account executives selected from the Advertiser List/Partial Advertiser drop-down list. A Specific Advertiser search option may be provided to list a selected advertiser that may be chosen from the Advertiser List/Partial Advertiser drop-down list. When a search option is selected, a Search icon that may be provided in the toolbar across the top of the screen may be clicked to process the search.

The search results may appear in the advertiser request search results pane. To assign an advertiser to an account executive, the sales manager may select an advertiser from the search results list. Then, in the advertiser details pane 94 under the Assignment Management tab, the sales manager may scroll through a list of account executives and assign the advertiser to one or more account executives. The advertiser details pane 94 may also provide a field in which the sales manager may enter notes with respect to an account executive. The advertiser details pane 94 may also allow the sales manager to view a history of the various notes written for a given account executive.

The user can also use the Move All and Remove icons to assign all account executives or remove account executives from an assignment. All assigned account executives will be listed in the Assigned field. After a sales manager finishes assigning account executives to advertiser, the sales manager may click a Submit icon that may be provided in the toolbar. In an embodiment, a validation message may be provided to notify the sales manager that the assignment is complete. Because the sales manager have rights to assign advertiser assignments, once submit is the assignment is instantaneous.

A person skilled in the art will recognize that other fields may be included for assigning an advertiser, for instance a Group field to allow a team of account executives to be assigned could be added. A person skilled in the art will also recognize that the Assignment Management tab may also be used in the other Account Management Main menu selections.

Figure 11D:
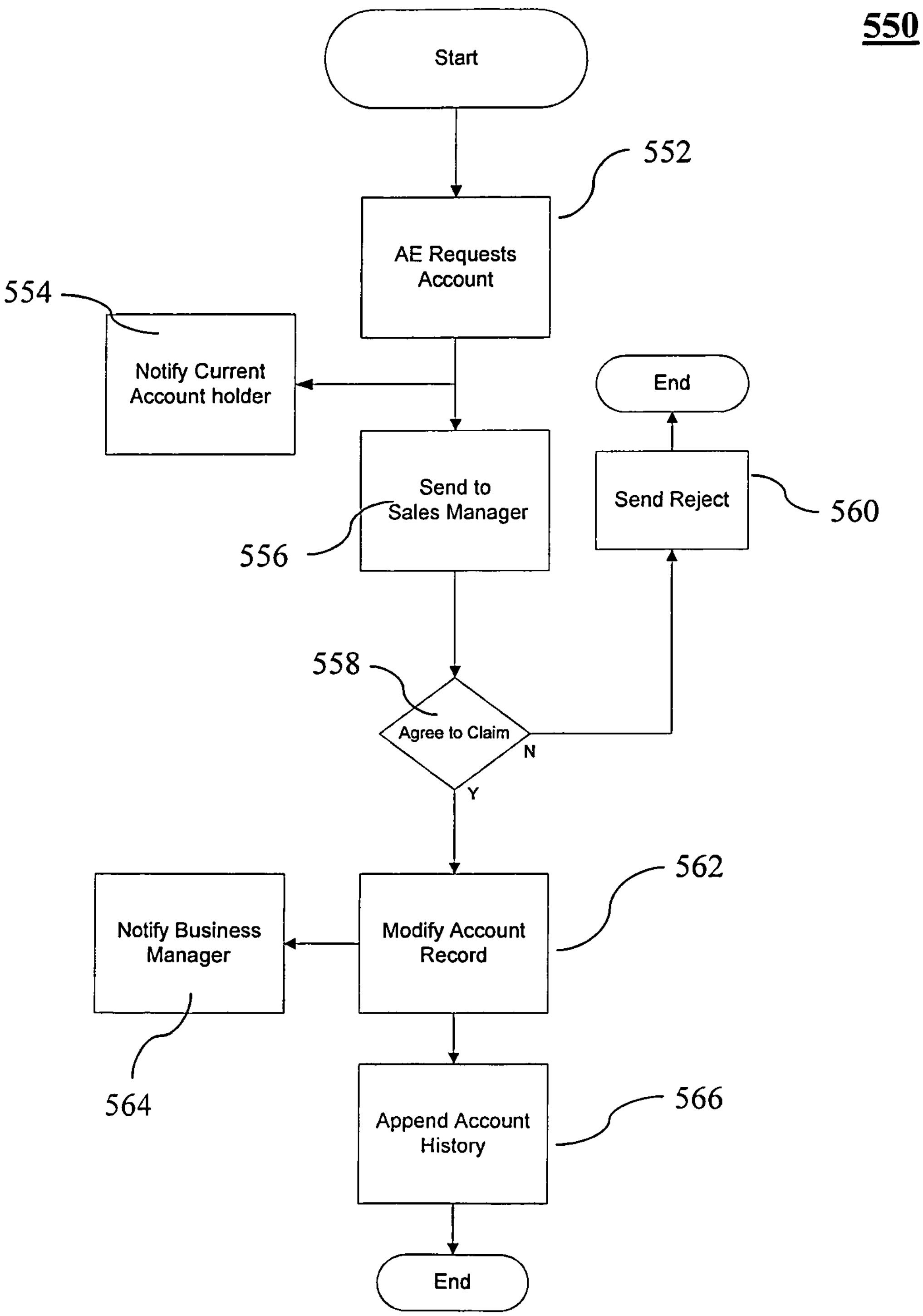
FIG. 11D is a flowchart illustrating an embodiment of a method for requesting assignment of an existing advertiser account.

With reference now to FIG. 11D, shown is an embodiment of a method 550 for claiming an existing advertiser account in media proposal system 10. Method 550 may utilize media proposal system 10 GUIs as described herein. Media proposal system 10 receives an account executive request for an account assignment, block 552. Media proposal system 10 notifies current account executive that is assigned to that account (i.e., the account holder), block 554. For example, media proposal system 10 may display a message or list the requested account in a requiring my attention folder of account executive's media proposal GUI 70 instance. Media proposal system 10 forwards the account assignment request to the appropriate sales manager, block 556. For example, media proposal system 10 may list new customer account under a "Needing My Attention" folder or pane of sales manager's media proposal GUI 70. Sales manager determines whether to approve or agree to the account executive's claim, block 558. If not, the sales manager makes an appropriate selection and media proposal system 10 sends a rejection to requesting account executive, block 560. If the sales manager agrees to the request, sales manager inputs approval and media proposal system 10 modifies the advertiser account record, block 562. Media proposal system 10 notifies business manager, block 5564, e.g., by removing request from sales manager instance of media proposal GUI 70 and listing new customer account under on business manager's media proposal GUI 70. Media proposal system 10 then appends account history, block 566, noting change of account executives. Media proposal system 10 may access traffic and billing database 16 to edit customer record (not shown). In this manner, media proposal system 10 synchronizes with traffic and billing system.

Figure 12:
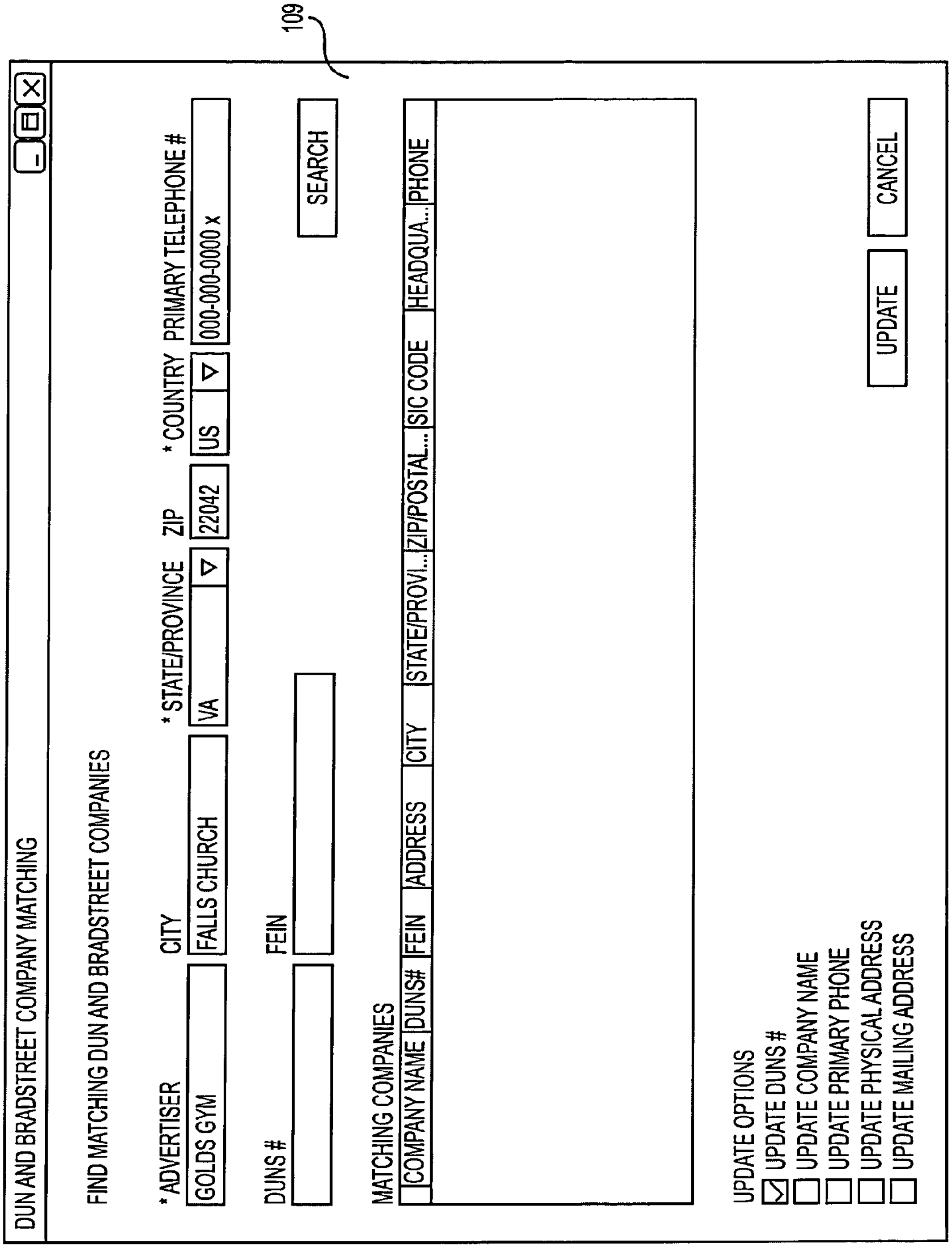
FIG. 12 is a screen show of an exemplary Dun and Bradstreet company matching GUI in a software implementation of an embodiment of system for creating and managing advertising proposals from inception to completion.

With reference now to FIG. 12, shown is an embodiment of a Dun and Bradstreet Company Matching window 109. Once an account executive is assigned to an advertiser the account executive may access the advertiser account via the Advertiser Details screen as discussed above, as the case may be. For unique identification of the advertiser or agency, the account executive may assign a Dun & Bradstreet DUNS number to the advertiser or agency as noted above. In the embodiment for which credit information is provided via Dun & Bradstreet, an advertiser or agency must have a DUNS number in order to retrieve credit information. The credit information may appear on the credit pane 98, in the advertiser details pane 94 or agency details pane, as the case may be. To do so, the account executive may conduct an advertiser or agency search in the manner described above, and selected advertiser or agency from the research results list. The account executive may click on a Data Clean Up icon in the toolbar of media proposal GUI 70 to open up a Dun and Bradstreet Company Matching window 107.

Media proposal system 10 will attempt to match a DUNS to the selected advertiser or agency. To narrow the field of search, the account executive may provide a city, state, zip code, county and/or telephone number to assist media proposal system 10 in finding a DUNS number that matches the selected advertiser or agency. Alternatively, if no matches are found using the Dun and Bradstreet Company Matching window 107, the account executive may remove or add extra spaces between words, remove the City field from the search, or input the Zip field, and then click on the Search button again. Those skilled in the art will appreciate that many advertisers and agencies have similar names, and matching a DUNS number to a given advertiser or agency may require particularized searching. If there is a match or near match, media proposal system 10 will provide potential matches in the results field, and the account executive may use a scroll bar to move to the correct account and click on the account to selected.

Dun and Bradstreet Company Matching window 107 also provides the account executive an option of updating and saving the advertiser or agency account information with the selected DUNS number. Other checkboxes in the Update Options box may include Update Company Name for updating the company name in the sales database, Update Primary Phone, Update Physical Address, and Update Mailing Address that will update the respective fields for the selected account. In an embodiment, this will also update other systems such as traffic and billing.

Those having skill in the art will appreciate that media proposal system 10 may also provide a way to reconcile or purge duplicate advertiser and agency entries, as well as accounts having the same DUNS number. For example, a sales manager may inadvertently enter the same DUNS number for multiple accounts. In an embodiment, Fusion provides for identification and automatic reconciliation of DUNS number duplication.

In an embodiment, the sales manager may resolve duplicate entries through either the Advertisers or Agencies items on toolbar of media proposal GUI 70. The sales manager may then access a window (not shown) that provides search fields with which the sales manager may Search by company name and address, or Search by DUNS #. In this embodiment, the accounts that have the same DUNS number are displayed with the following columns of information: a DUNS # column, a Company column that displays the name of the advertiser or agency, a traffic and billing system ID (e.g., a VIERO® ID) column that displays the ID given to the account by the traffic and billing system, and the Active column that will be checked if the account is active. Duplicate accounts, for example, may be unnecessary, and may be deactivated. As noted above, a sales manager may check or uncheck the accounts in the Active column to make them active or inactive.

After the search for duplicate advertisers, agencies, or DUNS # is complete, the sales manager may click an OK button and a validation message may appear giving the list of all accounts that have been deactivated. In an embodiment, the accounts that have been deactivated from the Active column will no longer appear in active account searches. Only those users with permission will be able to view deactivated accounts. Once advertisers and agencies have been matched to their DUNS numbers, the sales manager may deactivate accounts that are out of business. When an account has been deactivated, the Account Deactivation date is set to the current date and the account is no longer available for account executives to access.

Media proposal system 10 may provide other ways for a sales manager or account executive to deactivate an account. In another embodiment, a sales manager or business manager may deactivate an account by selecting the Advertisers or Agencies items on toolbar of media proposal GUI 70. Through an advertiser details or agency details window, such as those described herein, the account manager can conduct an Advertiser or Agency search as described above. In the advertiser search results or agency search results panes (such as described herein), sales or business manager may highlight the account and then click the Deactivate icon in the toolbar. A confirmation message may appear to confirm deactivation. The manager may then click an OK button to deactivate the account, or click a Cancel button to discontinue the deactivation. Once an account is deactivated in media proposal system 10, it will no longer be available for account executives to access. A sales or business manager may reactivate an account. In an embodiment, an account executive may submit a request that an agency or advertiser account be reactivated, or that a new account be added for an agency or advertiser.

A person skilled in the art will recognize that the "Agencies" selection on toolbar of media proposal GUI 70 may have the same or similar fields, functions, process flow, notifications and panes as the "Advertisers" selection described above.

Generation of advertising proposals may follow a typical process used by media outlets in selling advertising time or space. Media proposals for, e.g., radio, may contain time period definitions, day and daypart identifiers, product type, availability as defined from the traffic and billing system, e.g., VIERO® RMS, and a billing rate as may be defined by a pricing engine (e.g., BestRate), audience delivery analysis as may be defined by an audience ratings engine, and order definitions as may be required by the traffic and billing system. Once media proposals are created, workflow may be applied according to the media proposal system 10 user's selling model. The proposals that may appear across workflow in a similar manner to email in a "requiring my attention" inbox where they can be accepted or rejected by the account executive. Proposals may be directed at placing a single advertisement/spot, a campaign involving the single advertisement/spot (multiple placements of the same advertisement/spot), a campaign of related advertisements/spots, etc. Those having skill in the art will recognize that the proposal approval process may be multistage. In one stage, the client (e.g., the advertiser or agency) may be required to approve a proposal before the proposal is made available for approval by a media outlet (e.g., radio station) manager.

Figure 13A:
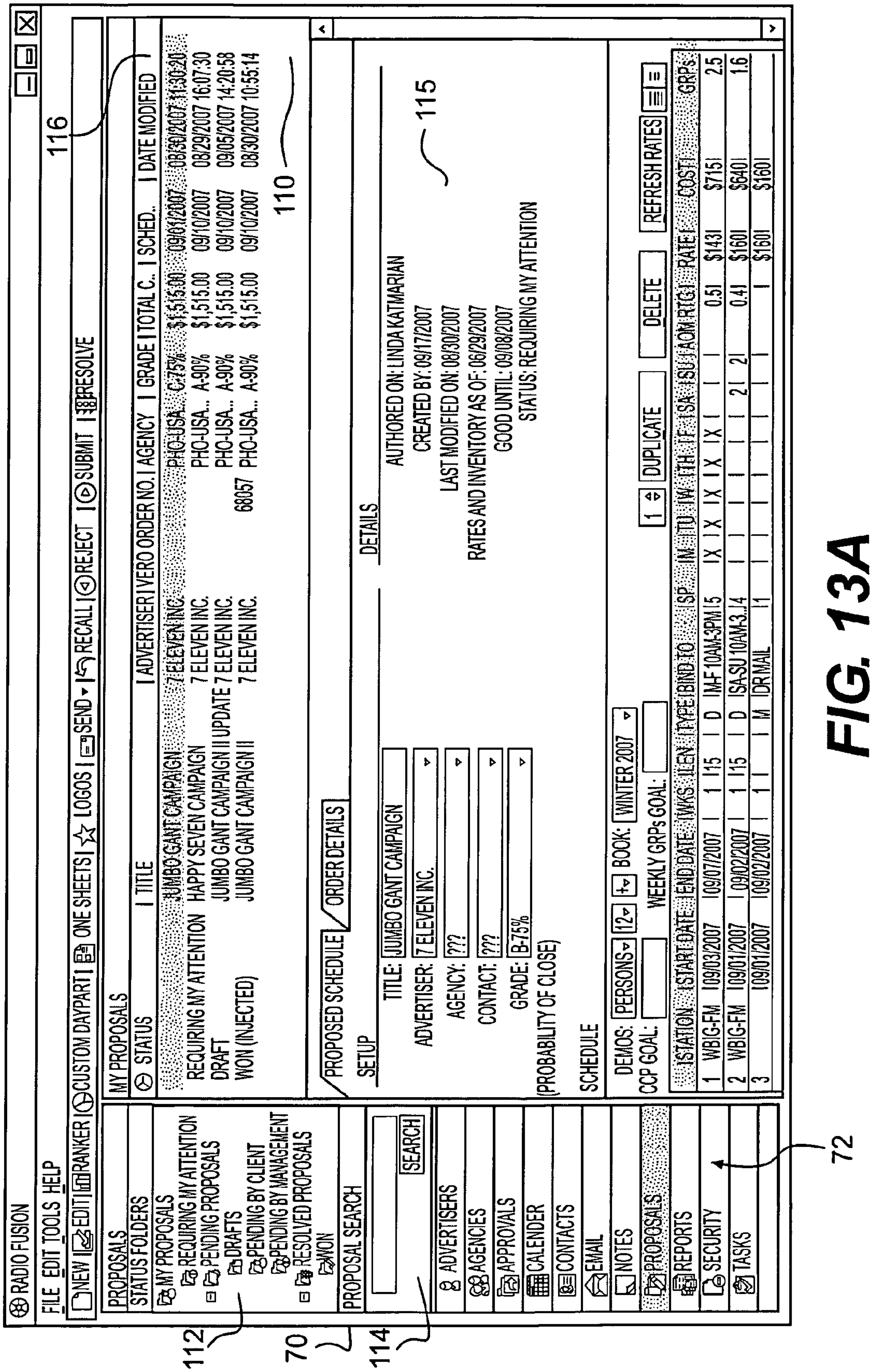
FIG. 13A is a screen shot of an exemplary proposals GUI in a software implementation of an embodiment of system for creating and managing advertising proposals from inception to completion.
Figure 13B:
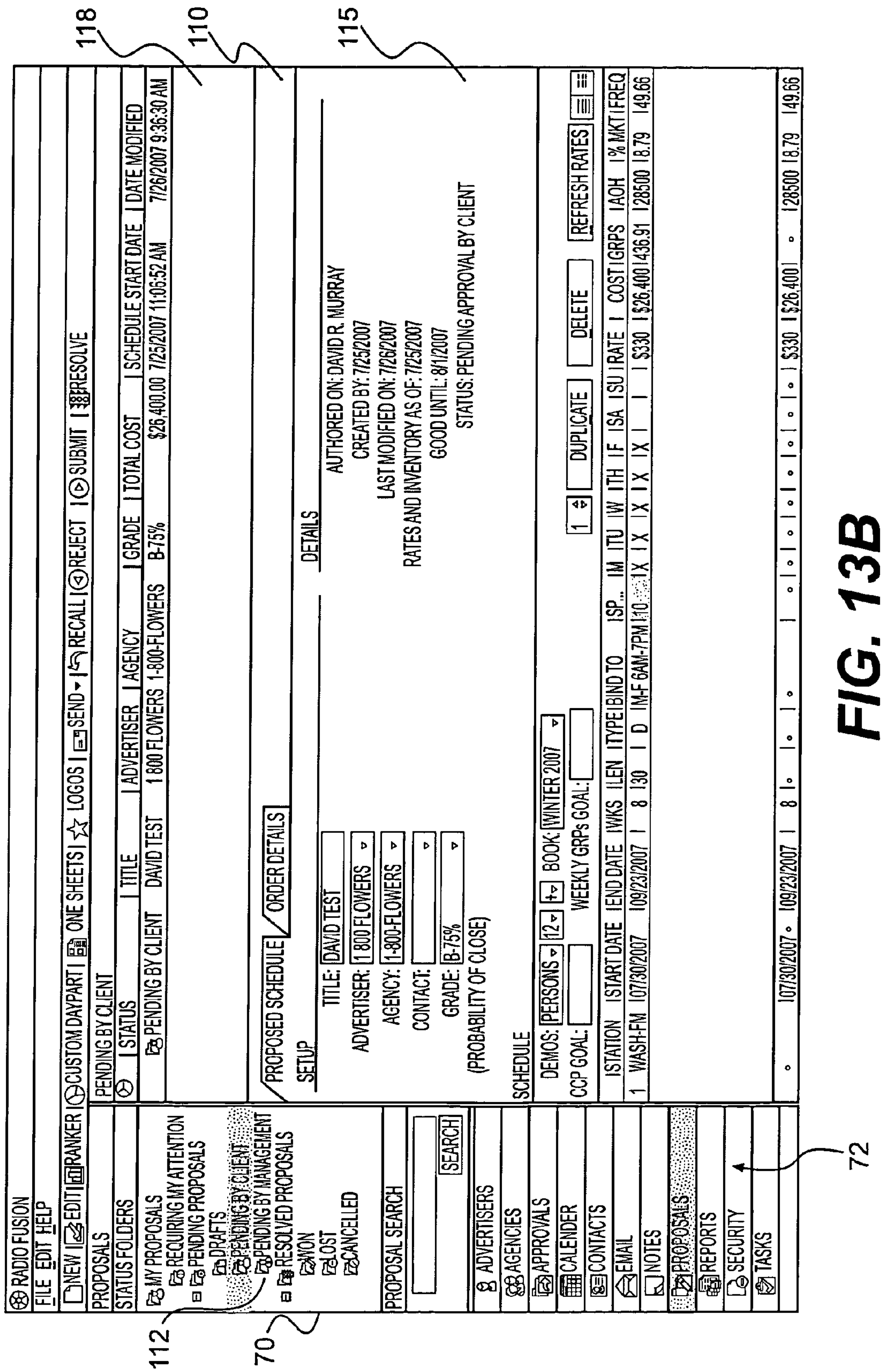
FIG. 13B is a screen shot of an exemplary proposals GUI in a software implementation of an embodiment of system for creating and managing advertising proposals from inception to completion.
Figure 13C:
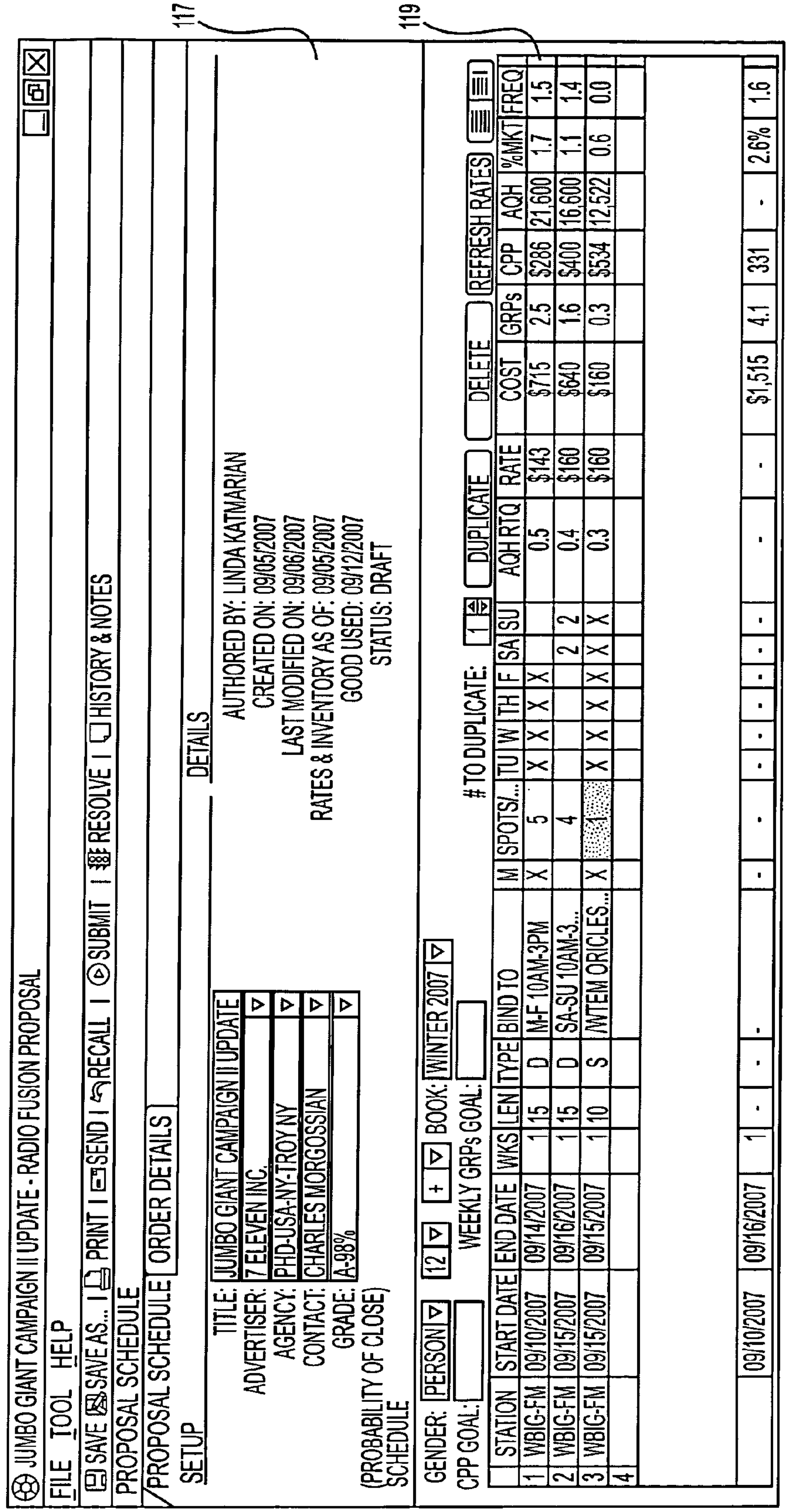
FIG. 13C is a screen shot of an exemplary proposal schedule GUI in a software implementation of an embodiment of system for creating and managing advertising proposals from inception to completion.

With reference now to FIGS. 13A-D, shown are embodiments and panes of proposals window 110 (e.g., media proposal GUI 70 with proposal functionality selected—see FIG. 4A) through which a user may create, edit and view proposals and proposals' status. An account executive may select the Proposals item from the main menu 72 (e.g., toolbar on media proposal GUI 70), and be provided with an interface for proposals, such as seen in FIGS. 13A-C. As with other data and records used and described herein, the proposals and the data entered the proposals as described herein may be stored in and retrieved from media advertising database 14.

In an embodiment, when a user clicks the Proposals item from the main menu, status folders pane 112 and proposal search pane 114 of proposals window 110 (e.g., in upper left side 76 of media proposal GUI 70) may be provided for further user interaction. An account executive may use the status folders pane 112 to view proposals that may be in various stages. For example, proposals may be provided in a status "tree" in which proposals may be grouped by status. A user may click on a folder in the "tree" to view the proposals contained therein.

Also, a user may type a keyword into the proposal search pane 114 and click a search icon from the toolbar to search for one or more particular proposals. The results of such a search may be provided in search results pane similar to that described above. The user may then click to select a particular proposal and view its proposal schedule and order details.

In an embodiment, the user may view the contents of a folder or search results in my proposals pane 116, such as that shown in FIG. 13A. My proposals pane 116 is accessed by selecting My Proposals in status folders pane 112. As shown, my proposals pane 116 displays a list of all of the user's proposals, with columns of information about each proposal listed (such as, e.g., proposal status, title, advertiser, traffic and billing system order number (if injected), agency and/or representative firm (if applicable), grade, total cost, scheduled date, date modified, etc. A user may sort the columns (i.e., sort the proposals by the proposal information in each column) in ascending or descending order by clicking the column head. A user may select a proposal and view and/or edit its schedule on a proposal schedule pane (e.g., see FIG. 13C) by clicking on a proposal schedule tab. A user may also click on an order details tab in a separate pane to view and edit billing, e-invoicing, routing and sales competition information for a selected proposal.

As shown in FIG. 13A, proposals window 110 includes a proposal details pane 115 that displays details regarding the media proposal selected in the my proposals pane 116. Proposal details pane 115 lists various proposal schedule details under a proposals schedule tab. Proposal details pane 115 also includes an order details tab that includes additional details about the selected media proposal.

With reference now to FIG. 13B, shown is proposals window 110 of media proposal GUI 70 with Pending by Client selected in status folders pane 112. As such, proposals window 110 displays a pending by client pane 118 instead of my proposals pane 116. The pending by client pane 118 illustrates pending proposals organized by client. In the example shown, there are no pending proposals. Selecting other options in status folders pane 112, such as Requiring my Attention, Pending Proposals, Drafts, Pending by Management, Resolved, Won, Lost and Canceled, will cause proposals window 110 to display corresponding panes with corresponding proposals (e.g., proposals requiring account executive's (or other user's) attention, pending proposals, draft proposals, pending by management proposals (with sales, business or traffic managers awaiting approval), resolved, won, lost and canceled proposals for the account executive (or other user)).

In an embodiment, an account executive may create and send proposals to prospective advertisers and agencies. In an embodiment, proposals window 110 may provide a toolbar to assist an account executive in navigating and executing the proposal process. To create a new proposal, an account executive or other user may click on a New icon that may be provided in the toolbar. Upon doing so, a proposal schedule pane may become visible.

With reference now to FIG. 13C, shown is proposal schedule window 117 (as with other panes and windows described herein, proposal schedule window 117 may be a pane on another window, such as proposals window 110, or a separate window). Proposal schedule window 117 may appear similar to proposal schedule tab in proposal details pane 115. An account executive may interact with the proposal schedule pane 117 to fill in the details, parameters, goals, etc., of the proposal. In an embodiment, a user of media proposal system 10 may provide a title for a proposal, associate an advertiser or agency with the proposal (e.g., from a drop-down list), and assign a grade to the proposal. In an embodiment, a proposal grade may be the account executive's estimation of the likelihood that the proposal will result in an order. Alternatively, media proposal system 10 may automatically grade the proposal based on various factors, such as past proposal fulfillment (buys) history of advertiser, how well proposal meets advertiser's requirements, etc. Grades are made available, as part of proposal histories, to other users, such as sales managers, business managers and traffic managers for review. A manager may view the assigned grade when reviewing a proposal for approval. When reviewing a proposal, a manager may adjust the grade by selecting on the grade in the proposal.

Also, a user may provide a contact for the advertiser or agency. After proposal data is entered, an account executive or other user may click on Save or Save As icons that may be provided in the toolbar of proposals window 110 (or proposal schedule pane 117). Those skilled in the art will recognize that the media proposal system 10 may automatically populate the fields for which information has already been provided in another part of media proposal GUI 70, for example, in the General tab of the Advertiser Details or Agency Details panes.

Upon creation of the new proposal, an account executive may view the new proposal by clicking on the appropriate folders in the "tree" that may be provided in status folders pane 112. In an embodiment, an account executive may view and access for editing the new proposal in the Drafts folder depending from the Pending Proposals branch of the "tree" of proposals window 110. In an embodiment, media proposal system 10 permits account executives to copy a proposal from one advertiser to another, and to edit existing proposals using an Edit icon that may be provided in the toolbar depicted in FIGS. 13A-13C.

With continuing reference to FIG. 13C, media proposal system 10 may also provide within the proposal schedule pane 117 additional fields in which an account executive may add desired demographic information. For example, Gender fields may be provided wherein an account executive may define the target audience as Persons, Men, Women, and further define a preferred start age and end age for the demographic as defined by a rating service (e.g., 12 years old as shown). In an embodiment, choosing the plus sign (+) for the demographic end age indicates the demographic age ranges from the beginning age selected to all following ages. Other fields may include a Book field that allows the user to choose the booking period for the demographic. A Market field may be provided that allows the user to choose a target market for booking the advertising. This selection may cause listing of media outlets, e.g., stations, for that market to be displayed in proposal schedule pane 117. The media outlets may be displayed as lines 119 (see below) that may be edited (e.g., by user clicking on various fields described herein) to create an orderline for the media advertising proposal or deleted if the user does not want to include the media outlet in the media advertising proposal. A qualitative field may be provided so that the account executive may target the audience for the advertising based on a set of predefined categories such as, e.g., college-educated and earning $60K per year, or other similarly demographics-based categories. A cost per point ("CPP") Goal field may be provided so that an account executive may estimate or provide the cost goal (e.g., in dollars) of achieving a number of impressions (e.g., listeners, click-throughs, viewers, views, readers, web page downloads, etc.) equivalent to one percent of the population in a given demographic group. A cost per thousand ("CPM") Goal field may be provided so that an account executive may estimate or provide the cost goal (e.g., in dollars) per thousand impressions. A weekly gross rating points ("GRPs") Goal field may also be provided so that an account executive may estimate or provide the sum goal (e.g., in positive integers) of all rating points achieved for a particular spot schedule. Those having skill in the art will understand that GRPs may be calculated by multiplying the average number of persons listening during a 15-minute period by the number of spots in the advertiser's schedule (i.e., average quarter-hour ("AQH") times the number of spots in an advertising schedule). Those having skill in the art will also understand that additional goal fields that relate to a measure of an advertisement's reach and effectiveness, and other parameter fields for proposal, may be used.

In an embodiment, the media proposal system 10 may provide various lines 119 (generally referred to as order lines or flight lines) with fields or columns of information, in proposal schedule pane 117 or other GUI, in which to a user enter details of the proposal. Order lines 119 may correspond to media outlets available for proposal (e.g., corresponding to market selected or otherwise chosen by user for proposal). Order lines 119 for each available media outlet may automatically populate proposal schedule pane 117 or chosen from a list by user. In the embodiment shown, an order line 119 (e.g., for a radio advertisement) may include fields for media outlet (e.g., station) identification (Station), advertising campaign start date (Start Date), advertising campaign end date (End Date), the number of weeks that the advertisement is to run (Wks), the length of the advertisement (Len), the type of advertisement (Type), the schedule (e.g., time of day), miscellaneous revenue, and special events that the advertisement may be linked or bound to (Bind To), the number of advertisements to run each day of the defined period of time (Spots), which days of the week the advertisements are to run (M, Tu, W, Th, F, Sa, Su), the AQH rating (AQH Rtg), the advertisement rate (Rate), the total cost for the advertising run (i.e., Rate×Spots×Wks) (Cost), the GRPs (GRPs) and CPP (CPP), the AQH (AQH), the percent of the market population that an advertisement is reaching (% Mkt), and the number of times a person is exposed to an advertisement (Freq). The advertisement rate (Rate) is what the account executive, or other user, will pitch to the advertising customer. The account executive enters or selects data/information for certain fields, such as Start Date, End Date, Wks, Len, Type, Spots, Bind To, time of day, days, ACQ Rtg, Rate, GRP, CPP, AQH, % Mkt and Freq (Cost is calculated from the Rate, Spots and Wks). ACQ Rtg, GRP, CPP, AQH, % Mkt and Freq. are the goals that the account executive, or other user, and the customer set and agree to for the proposal. When the proposal is injected as an order, how well these goals are met is evaluated to determine the performance of the advertising in the order. As described below, this evaluation may be used to provide feedback to the media proposal system 10 in order to revise the proposal to better meet these goals.

Those having skill in the art will recognize that another media advertisement may have different, similar, less and additional fields/columns. Likewise, order line 119 may include a field for specifying the media type so that appropriate media outlets are shown for selection.

With continuing reference to FIG. 13C, in an embodiment, if requested inventory is greater than available inventory, the Spots field in the order line 119 of scheduled proposals shown in proposal schedule window 117 that is "oversold" may turn red or otherwise be colored, shaded or highlighted (see indicated by shading of spots field for third order). If a parent row contains one or more child rows that are oversold, but the parent row itself is not oversold, the parent row's Spots field may turn yellow-orange or otherwise be colored, shaded or highlighted. In this case, the "floor" of the inventory progress bar described below may turn red (see FIG. 14A). Allowing the cursor of a pointer device (e.g., a mouse), used to interact with media proposal GUI 70, to touch or rest on the orderline of a media outlet (i.e., "mousing" over orderline) causes media proposal system 10 to display exact advertising availability information for media outlet. In an embodiment, the availability information will be provided as a popup window or bubble above orderline. In an embodiment, the exact number of available weeks, days and dayparts (or other portions of days) for the media outlet in the orderline may be shown. For other media outlets, such as periodicals, billboards, etc., the exact number and, e.g., size or other relevant information, of advertising spaces, weeks and days (or, e.g., issues) available may be displayed. If flightlines are displayed and moused over, the aggregate of this information may be displayed. Media proposal system 10 may retrieve this information from, e.g., traffic and billing system.

Those having skill in the art will recognize that some fields may automatically populate based on data entered into other fields. For example, the Wks field may automatically report the length of the advertising campaign in number of weeks when the end date is entered. Conversely, the End Date field may populate automatically if a number is entered into the Wks field. Those having skill in the art will also recognize that the fields may provide various options through drop-down menus or lists. For example, the Len field may provide a drop-down list of default settings for 2, 5, 10, 15, 30, 60 and 90 minute advertisement lengths. The Type field may provide a drop-down list from which an account executive may select D (daypart), M (miscellaneous revenue) or S (special event). Those having skill in the art will recognize that the AQH rating provides the average quarter hour rating based on the average number of persons listening to a particular station, and may be expressed as a percentage of the population being measured (e.g., AQH/Population×100=AQH Rating (%)). The AQH is the average number of persons listening to a particular station for at least five minutes during a 15-minute period. A station may calculate the AQH rating for special events in order to calculate audience figures that may not be provided by a third-party reporting service such as Audience delivery.

With continuing reference to FIG. 13C, in an embodiment, a Duplicate button may be provided in the proposal schedule window 117 so that an account executive may specify how many copies of the selected flight line the user wants to make. A Delete button may be provided so that an account executive may delete a selected line, and a Refresh Rates button may be provided so that an account executive may refresh the proposal rates for the current demand rates as provided by the yield management system. In essence, this unfreezes the rates of the current proposal and updates the rates best on the yield management system calculations (e.g., of the Best Rate available). When rates are refreshed for a media proposal, media proposal system 10 retrieves the current rates from the yield management system (see, e.g., block 54 in method 40 of FIG. 3).

In an embodiment, an account executive may click on the History & Notes icon that may be provided in the toolbar 74 on media proposal GUI 70 to open a History & Notes window to add information about the proposal. An account executive may type information in the New Note field and then click the Add Note button. When the account executive is finished adding notes, the Done button may be clicked to close the window, and the account executive may click on a Save icon that may be provided in the toolbar to save the notes.

In an embodiment, media proposal system 10 allows an account executive or other user to submit a completed proposal to a client (e.g., an advertiser or agency) by clicking on a Send icon that may be provided in the toolbar of proposals window 110 or proposal schedule window 117. In an embodiment, sending the proposal to a client may automatically change the proposal status from Pending to Pending Approval By Client. An account executive may click on a Send icon that may be provided in the toolbar to access a drop-down menu from which an Email to Client option may be chosen. If Email to Client option is chosen, a separate Email to Client window may open.

With continuing reference to FIGS. 13A-13D, an account executive may then click on a Send icon, in the toolbar 74 of proposals window 110 or proposal schedule window 117, to email the proposal. Two drop-down lists are available in an Email to Client window, including the Proposal Type and the Logo lists. The Proposal Type menu may provide the account executive an option of inputting the intended party proposal type, and the Logo menu may provide the account executive the option of attaching a radio station or other corporate logo to the email. Various proposal types include proposals with ratings, without ratings and custom built. Proposals with ratings contain audience delivery metrics and generally are meant for advertising campaigns that need the goals defined against audience delivery. Proposals without ratings have just quantity and pricing for the order lines and are meant for advertising campaigns that are broad in product (e.g., Streaming+Terrestrial+Co-op, etc.) or have value outside of reach and frequency. Custom reports allow the user to select from every data point available in media proposal system 10 and build the proposal to their liking. Those having skill in the art will also recognize that other proposal types may be defined.

Those having skill in the art will also recognize that an account executive may also attach other files to email. For example, an account executive may attach a "one sheet" summary of the proposal, or other attachments. The toolbar may provide a One Sheets icon to allow a user to attach station marketing material to be supplied to the customer, and may also provide a Logos icon to allow the user to attach a logo to an emailed or printed proposal. Those having skill in the art will also recognize that a Print icon, in toolbar of proposals window 110 or proposal schedule window 117, may be provided on the toolbar to allow a user to print a proposal, attachments or various reports as described below. For example, a user may print out a proposal. FIG. 13E illustrates an excerpt of a printed sample proposal.

With regard to logos, a user may generate a company logo to add to the proposal. To add a logo, a user may click on a Logos icon in the toolbar of proposals window 110 or proposal schedule window 117, whereupon a list of logos or a logos administration window may be displayed. In an embodiment, the logos administration window enables the user to create, upload or select a company logo to add to the proposal. A user may create a logo or provide a path to where the logo is stored, e.g., in the media proposal database 14 or local hard drive. In an embodiment, a logo may be affixed to a proposal to better identify the proposal with a particular radio station.

When client approval has been obtained, an account executive may then submit the proposal for management approval. As also may be discussed above, media proposal system 10 may be used to automate the proposal process by allowing an account executive to submit a proposal electronically to the appropriate managers. In an embodiment, once an account executive has created a proposal that is approved by the client, he or she submits it to the sales manager for approval. After a sales manager reviews the proposal, the sales manager may either reject it or approve and submit it to a business manager and a traffic manager for further approval.

With continuing reference to FIGS. 13A-13D, as noted above, an account executive may save a draft of a proposal for later submission for approval. Alternatively, an account executive may delay submitting a client-approved proposal to a manager for approval. If, for example, an account executive wishes to submit a client-approved proposal to a manager for approval, the account manager may select a proposal from a Pending By Client folder in the manner described above. The account executive may then click on a Submit icon that may be provided in the toolbar 74. In an embodiment, an account executive submits proposals to a sales manager for approval. The sales manager may reject the media proposal, requesting changes from the account executive. After approval, the sales manager submits the media proposal to a business manager for approval. The business manager may reject the media proposal, requesting changes from the account executive. After approval, the business manager submits to a traffic manager for approval and insertion into traffic and billing system as an order. The Submit icon may be provided with a drop-down list with a Submit to SM (i.e., sales manager) selection. If an account executive clicks on the Submit to SM selection, a new window enabling submission to a sales manager may be displayed.

Once submitted, embodiments of media proposal system 10 require that all media proposals be acted upon. In other words, a submitted proposal must be accepted, rejected or canceled, as described herein. If a sales manager or other manager cancels a media proposal, a written reason for cancellation must be submitted.

Similar to the History & Notes functionality described above, an account executive may add notes to a media proposal submitted to a sales manager in a History & Notes field. Such notes may be those provided by an account executive, notes based on discussions with a sales manager, or notes from another user about the media proposal. A new note may be added by typing text in the New Note field and then clicking the Add Note button. An account executive may select a sales manager to which the media proposal is to be routed from the Choose Sales Manager drop-down list. After changes are made to the Submit to SM window, the account executive can click the Submit button. The media proposal's status in media proposal system 10 will change to Pending Approval by SM and the media proposal will appear in the sales manager's Requiring My Attention folder.

With reference again to FIGS. 13A-13C, in an embodiment, proposals window 110 and/or proposal schedule window 117 may provide an Additional Information button that the user may click on to retrieve additional information about typical account executive, agency or advertiser rates, and about further details on the order line set up, rates and media outlet advertising space availability (e.g., radio station airtime inventory).

Figure 13D:
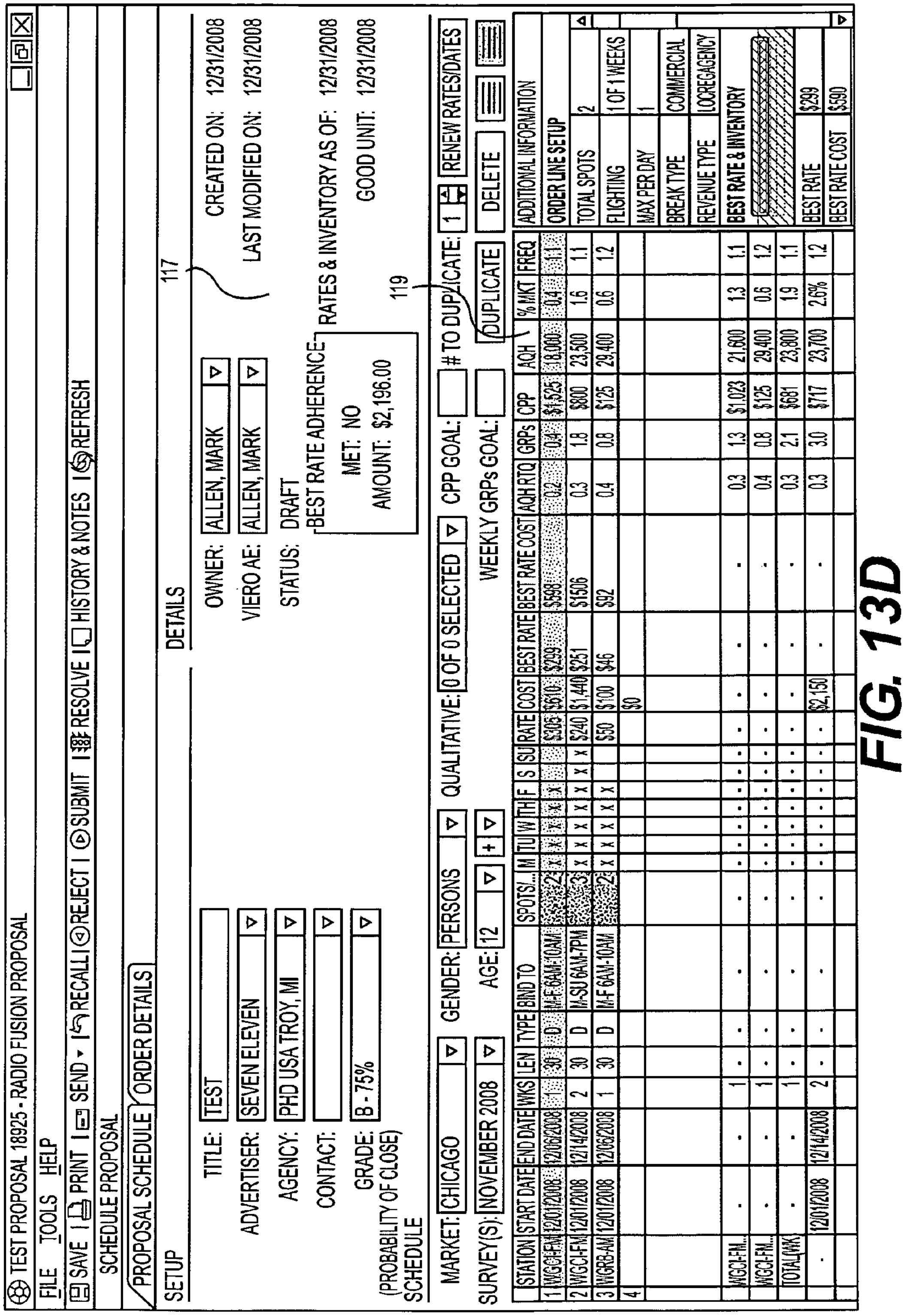
FIG. 13D is a screen shot of an exemplary proposal schedule GUI in a software implementation of an embodiment of system for creating and managing advertising proposals from inception to completion.

With reference now to FIG. 13D, shown is another embodiment of proposal schedule pane 117 of proposals window 110 that includes Best Rate information. The Best Rate information shown in FIG. 13D will not be shown to the customer or included in the media advertising proposal sent to the customer. In an embodiment, the Best Rate information shown is only displayed on proposal schedule pane 117 viewed by managers (e.g., sales manager, business manager and/or traffic manager) so they can evaluate whether proposal meets Best Rate and how well account executive is performing under that metric. The advertisement rate (Rate) is what the account executive, or other user, pitches to the customer (as mentioned above), and is included in the media advertising proposal sent to the customer. Ideally, the account executive will want to pitch at or above the Best Rate to ensure that the station, enterprise, etc., financial goals are met.

Proposal schedule pane 117 includes, in setup area, a Best Rate adherence indication ("Adherence Met"). The Best Rate adherence indicates whether the Best Rate amount is met by the proposal. Utilizing the functionality of a yield management system connected to media proposal system 10 (e.g., see Best Rate applications), the Best Rate for the proposal is calculated. This calculation may use various inputs from a yield management system as well as other inputs as described herein. The "Best Rate" for any orderline or for the overall proposal is a function of meeting the pricing goals as defined by the yield management system. The Best Rates provide the pricing goals for an orderline and for the overall proposal. The media proposal system 10 uses the Best Rates as data points through the proposal and subsequent order process to ensure the orders, when sold, follow management's pricing directives based on demand. The account executive, and/or other users, are given financial incentives for adhering to these goals (i.e., for meeting the Best Rates). The Adherence Met provides an immediate indication of the Best. Rate being met. If the Best Rate is not met, the Best Rate adherence indication states this failure. The Best Rate adherence indication may also indicate the adherence amount (what the overall Cost for the proposal would have to be to meet Best Rate (see below)). The overall Cost of the proposal may be calculated by totaling the Cost for all of the orderlines. These totals may be weighted, as described below, for different media types (see, e.g., FIG. 23) in order to provide a like values comparison.

As shown, the order lines 119 of the proposal have additional columns indicating the current Best Rate and Best Rate Cost for each order line 119 of the proposal. The Best Rate indicates the pricing goal (i.e., ideal advertising rate (Rate)) for the given orderline. The Best Rate Cost indicates what the cost of the orderline would be if the Best Rate were met, and is calculated as number of spots in the orderline (Spots) multiplied by number of weeks in the orderline (Wks) multiplied by the Best Rate. For example, in the 1st orderline shown in FIG. 13D, the Best Rate is $299, the number of spots is 2 and the number of weeks is 1. Accordingly, the Best Rate Cost is $598. By comparing to the Rate, $305, and Cost, $610, it is seen that the 1st orderline meets the Best Rate (actually, it exceeds the Best Rate). On the contrary, the 2nd orderline, with a Best Rate of $251 and a Best Rate Cost of $1506 (3 (Spots)×2 (Wks)×$251), does not meet the Best Rate because its Rate is $240 and Cost is $1440. The overall proposal has a Best Rate Cost of $2,196 (sum of Best Rate Costs for 1st-3rd orderlines), which is shown in the Best Rate Adherence Amount. The overall Cost of the proposal is $2150 (sum of Costs for 1st-3rd orderlines); hence, the Best Rate is not met for the proposal.

With continuing reference to FIG. 13D, the additional lines at the bottom of the proposal schedule pane 117. The top two lines are weekly ratings (ACH Rtg, CPP, AQH, % Mkt, Freq) total for the stations shown in the orderlines 119. The third line totals both stations weekly ratings total. These lines allow the user to enter a mixture of orderlines 119 for various weeks, flights, and other parameters and then see for an average week what ratings they will achieve for the station, enterprise, etc. These weekly ratings total lines may be color-coded (e.g., green). The bottom line shows that proposal totals. The min. start date (Start Date) and max. end date (End Date) are used to depict the total duration of the proposal. The number of weeks (Wk) are the calculated total of weeks in the proposal. The Cost is the total cost for the proposal. The total ratings for the proposal are also shown. As shown, additional information pane may also be displayed with proposal schedule pane 117.

Figure 14A:
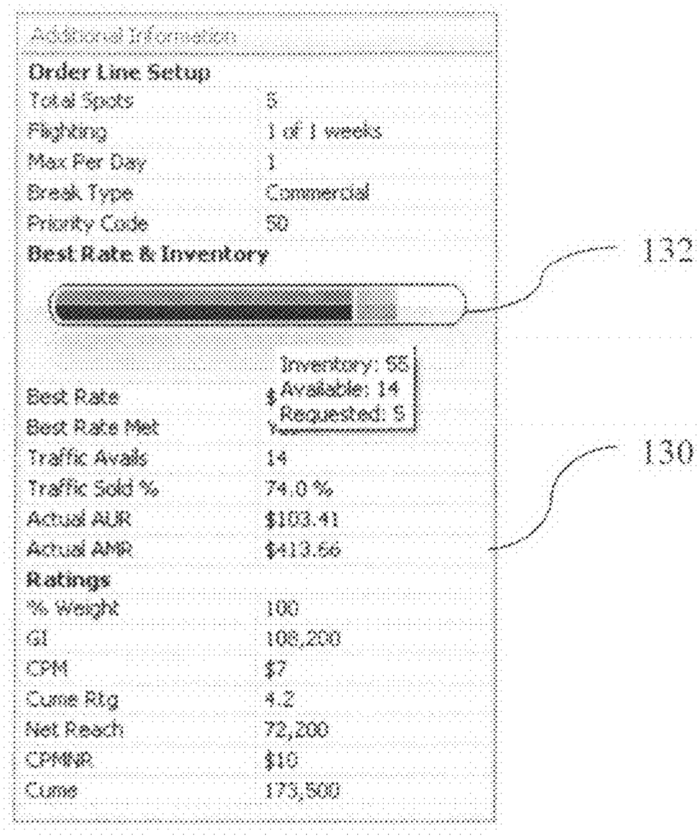
FIGS. 14A-B are screen shots of exemplary additional information GUIs in a software implementation of an embodiment of system for creating and managing advertising proposals from inception to completion.
Figure 14B:
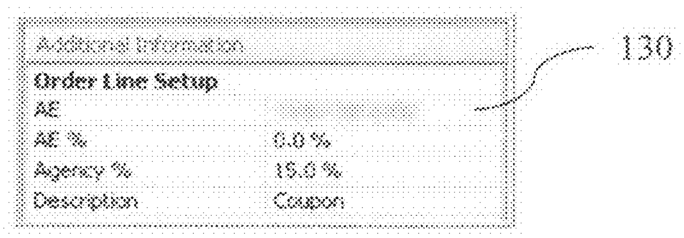

With reference now to FIG. 14A-B, shown is additional information pane or window 130, which provides additional information that is useful for a user. In an embodiment, clicking on the Additional Information button may cause the additional information pane 130 to open up to the right of the order or flight line. Additional information pane 130 includes a graphical inventory progress bar 132. Inventory progress bar or pill 132 provides a graphical representation of the advertising inventory and its status. Advertising inventory is the spots made available for advertisers to placed advertisements. Inventory progress bar 132 may depict inventory information for inventory available from a single media source, from multiple media sources, from a single media type, from multiple media types, etc.

In an embodiment, additional information pane 130 and inventory progress bar 132 include information regarding best rate and inventory. The inventory progress bar 132 depicted shows the total airtime inventory (e.g., radio, television, broadband media airtime available for advertising). Inventory progress pill 132 may show print, webpage, sign, billboard, etc. advertising space availability, or various combinations of these and airtime inventory. The inventory progress bar may provide visual feedback of the total inventory available, inventory sold, inventory requested and available inventory for the selected order line. The entire bar may represent the total airtime inventory. The inventory progress bar may be color-coded. For example, the color blue (shown as darkest shade) in the left portion of the bar may indicate sold inventory. The color green (shown as medium shade) in the middle-right portion of the bar may indicate requested inventory. Non-colored, or open space in the bar may indicate available inventory. The color red filling the bar and a red "floor" (or background area on which the bar rests) may indicate that the requested inventory is greater than available inventory. In one embodiment, a user may place a cursor over a section of the bar to display values for the properties graphically displayed by the bar. See FIGS. 14C-14H below with more description of inventory progress pill 132.

With continuing reference to FIG. 14A, those having skill in the art will recognize that "best rate" may refer to the highest rate for which an advertisement may be sold under the proposal. The Best Rate field in the additional information pane 130 may provide the dollar amount of the preferred rate, the Best Rate Met field may indicate whether the best rate has been met for the proposal, the Traffic Avails field may indicate current available inventory (i.e., total inventory minus scheduled inventory, where total inventory indicates total number of spots or advertising placements available prior to scheduling and scheduled inventory equals number of spots or advertising placements filled by ordered and booked advertising), the Traffic Sold % field may indicate the percentage of spots sold (i.e., calculated as scheduled inventory divided by total inventory (or scheduled inventor/scheduled inventory plus current available inventory) times 100), the Actual AUR (i.e., average unit rate) field may indicate average unit rate (i.e., revenue sold divided by spots sold), and the Actual AMR (i.e., average minute rate) field may indicate average minutes rate (i.e., revenues divided by minutes sold).

In an embodiment, with respect to ratings, the % Weight field may indicate the total number of advertisements/spots aired (or advertisement placements) divided by total rate dollars and may be adjusted for special events, the GI field indicates gross impressions, the Cume Rtg (i.e., cumulative rating) field may indicate the ratings measurements based on the number of different people who have sampled the media outlet (e.g., the Cume rating may be expressed as a percentage of all persons estimated to be in specified demographic groups, and may be expressed as a percentage: Cumulative persons/population×100=rating (%)), the Net Reach field may indicate the number of individuals reached at least once in a given schedule, the CPMNR (i.e., cost per thousand net reach measurement) field may indicate the cost per thousand net reach measurement (e.g., for Internet-based radio), and the Cume (i.e., cumulative) field may indicate the cumulative audience or number of different people who have sampled a media outlet or program (e.g., the total number of different persons who tune into a radio station, internet radio or television station during the course of a daypart for at least five minutes). Those skilled in the art will recognize that CPM refers to Cost per Thousand, or the cost of delivering 1,000 gross impressions, and that Net Reach refers to the number of different persons reached in a given schedule. Gross Impressions refers to the sum of all AQH audience persons for all spots in a given schedule.

In an embodiment, to produce a more accurate rate for certain media outlets (e.g., radio, television, newspapers, internet radio, etc.), Best Rate may be weighted by the day selected, the rates for those days, and the number of spots. If weeks are skipped, the weighted rate also takes into account which weeks are selected. For example, if an account executive selects two spots on Friday at $50 per spot, 10 spots on Saturday at $2 per spot, and 10 spots on Sunday at $2 per spot:

| DAYS | SPOTS | RATE | TOTAL |
|---|---|---|---|
| Friday | 2 | $50.00 | $100.00 |
| Saturday | 10 | $2.00 | $20.00 |
| Sunday | 10 | $2.00 | $20.00 |

Best Rate takes into account the rates on Saturday and Sunday in comparison to the higher-priced Friday rates. A straight average would result in an $18 best rate (($50+$2+$2)/3); however, a weighted average would result in a $6.36 best rate (total number of spots (22) divided by total rate dollars ($140)). Therefore, if the account executive selects more spots to run on Friday and fewer spots to run on either Saturday or Sunday, the weighted rate will rise. In an embodiment, averages are weighted based on beginning inventory. Accordingly, if one (1) spot exists at $1000 on Saturday and 10 spots exists at $100 on Sunday, the one (1) spot on Saturday will not have an equal influence on the average due to the probability of one in eleven (1 in 11) that the $1000 spot will be filled in a Saturday-Sunday rotator. See the Best Rate applications for exemplary methods and systems for calculating and ensuring Best Rate.

With reference to FIG. 14B, in an embodiment, if the selected order line in FIG. 13C is for miscellaneous revenue, the additional information pane 130 may further provide information about the account executive commission rate ("AE %") and agency commission rate ("Agency %"). Those skilled in the art will recognize miscellaneous revenue is everything except traditional advertising/spot revenue —terrestrial or streaming commercial inventory (e.g., a live appearance by a media entertainer or a coupon campaign). In an embodiment, the AE % and Agency % fields reflect the default commission rates set in media proposal system 10, and only a business manager may have permission to change these rates. In the example shown in FIG. 14B, the account executive commission rate is 0% and the agency commission rate is 15% of the amount paid by the advertiser for each advertisement placed by the agency (the spot rate).

In yet another embodiment, if the selected order line is bound to a daypart or a special event, the additional information pane 130 may display advertisement type and break type information (not shown). A user may click on a flighting field in additional information pane 130 to view and modify flighting information. Those skilled in the art will recognize that flighting generally refers to the timing pattern for running advertisements at different intervals. The additional information pane 130 may provide a drop-down menu that allows users to set flight week functions, and may provide the user a further way to modify flighting information.

Once the account executive, or other user, has submitted a client-accepted media proposal, the sales manager may then use media proposal system 10 to review the media proposal and determine what action needs to be taken. In an embodiment, proposals may be initially reviewed by sales managers, and then reviewed by business managers and/or traffic managers. Media proposals may be rejected by the client (in which case they are "resolved" and classified as lost or canceled), rejected by management, recalled for additional changes, or approved and injected automatically by media proposal system 10 into a traffic and billing system (e.g., VIERO® RMS) (i.e., media proposal is sent to traffic and billing system for scheduling and airing by media outlet).

In an embodiment, a sales manager, business manager, or traffic manager may approve a proposal by using the media proposal GUI 70. Such a user may approve a proposal by accessing the proposals window 110 and then searching through the Status Folders. A Requiring My Attention folder may be provided in the Status Folders tree for access by a manager for review and approval of pending proposals submitted for approval. A manager may also use a Submit icon that may be provided in the toolbar 74 of proposals window 110, and, through a drop-down menu, click on an item that may allow submission to another manager. For example, a sales manager may click on a Submit to BM (i.e., business manager) or Submit to TM (i.e., traffic manager) selection in the drop-down menu, in which event a Submit to BM or Submit to TM window may open. Likewise, for example, a business manager may click on the Submit to TM selection to submit a proposal to a traffic manager for approval.

In an embodiment, the Submit to BM window may provide similar functionality to the Submit to SM window discussed above, and a Submit to TM window may also provide similar functionality. For example, a manager may select a business manager or sales manager from a Choose Manager drop-down list. After changes are made to the Submit to BM or Submit to TM window, the manager may click the Submit button. For example, if a business manager submits a proposal to a traffic manager for approval, the proposal's status will change to "Pending Approval by TM" and the proposal will appear in the traffic manager's Requiring My Attention folder.

In addition to displaying a media proposal's current status, embodiments of media proposal system 10 store every media proposal's complete history. Consequently, when a media proposal appears on proposals window 110, for example in the Requiring My Attention folder, a user may click on the proposal to see the proposal's history. A transaction manager may view a proposal requiring the transaction manager's attention and click on the proposal to cause the proposals window 110 to display the proposal's history, e.g., any notes attached to the proposal by any user (e.g., account executive, sales manager, business manager, etc.), when the proposal was created, when the proposal was submitted to the sales manager, when the proposal was approved by sales manager and submitted to the business manager and when the proposal was approved by business manager and submitted to the traffic manager. In embodiments, proposals window 110 may display the proposal history as a column item in the listing of the proposal (e.g., in the Requiring My Attention listing). Proposals window 110 may also provide history indicating when a proposal has been previously rejected and modified.

To reject a proposal, a manager can select a Reject icon that may be provided in the toolbar of proposals window 110 to open a Reject window. The rejecting manager may add notes as in the Submit to BM window, and may click on a Reject icon that may be provided in the toolbar to return the proposal to the account executive for rework. A manager may also click on a Recall icon that may be provided in the toolbar to pull a proposal out of the workflow and return it to the manager's Requiring My Attention folder, or the manager may click on a Resolve icon that may be provided in the toolbar to move the proposal to Lost or Canceled folders. In an embodiment, when resolving conflicts, media proposal system 10 may automatically readjust the score of the media proposal (a reflection of the probability of closing a rejected proposal as an order) to 0%.

The media proposal system 10 may also allow a traffic manager to inject a proposal into a traffic and billing system (e.g., VIERO® RMS) by selecting a proposal from the listed proposals in the Status Folders, clicking the Submit icon on the toolbar 74 of the proposals window 110, and clicking on an Inject selection that injects the proposal as an order into the traffic and billing system (e.g., a Inject into VIERO selection) that may be provided in a drop-down main menu, or clicking on a Inject and Book selection that may also be provided in a drop-down menu. In an embodiment, clicking on such a selection causes a Inject window or pane (not shown) to be displayed.

In an embodiment, the Inject window may provide similar functionality to the Submit to SM window discussed above. For example, a user may input notes in the New Note field, click the Add Note button, and then click the Inject button to inject the order into the traffic and billing system. In an embodiment, an Inject Order confirmation message displaying the new order number may be provided.

Figure 14C:
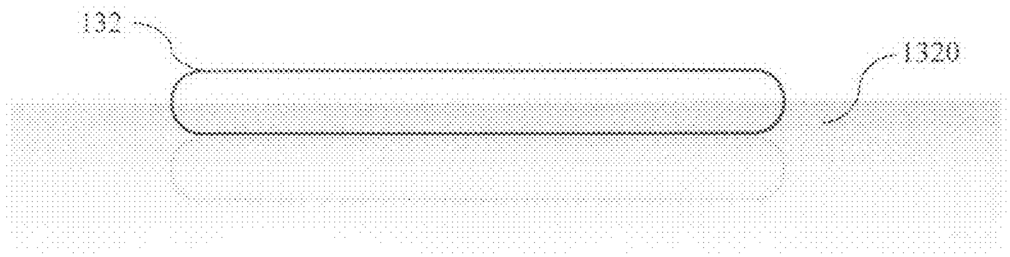
FIGS. 14C-14G are screen shots of exemplary inventory progress bars in a software implementation of an embodiment of system for creating and managing advertising proposals from inception to completion.

With reference now to FIGS. 14C-14G, shown are diagrams illustrating various implementations of inventory progress bar or pill 132. The diagrams illustrate inventory progress bar 132 illustrating different amounts of inventory. The inventory progress bars 132 shown in FIGS. 14C-14G may appear in additional information pane 130, as shown in FIG. 14A, as a separate GUI, or other GUI of media proposal system 10. With reference now to FIG. 14C, shown is inventory progress bar 132 with no bands or coloring. This indicates that no advertising spot or placement inventory has been consumed. This means that the media outlet (or combination of media outlets) for which the media proposal system 10 instance is being used have maximum availability for placing advertisements. As shown, inventory progress bar 132 also has an accompanying progress bar floor 1320 that provides further information. The lighter shaded floor 1320 shown in FIG. 14C indicates that there are no "oversold" conditions either at the orderline level or flight level. Those skilled in the art would recognize flighting or flight level as the higher level advertisement placement to achieve the overall goals of the campaign. Flighting might be, e.g., alternating weeks of advertising. Orderline level is the lower level individual advertisement placements in an ad campaign. The progress bar floor 1320 may be color-coded to provide a clearer visual indication of this status (e.g., light blue or green to indicate no oversold conditions). In the embodiments shown, progress bar floor 1320 overlaps a portion of the progress bar 132.

Figure 14D:
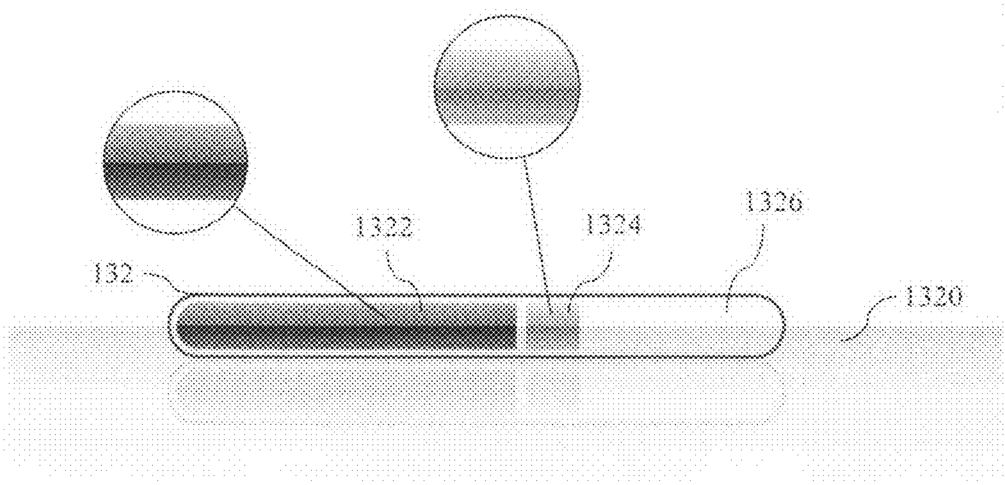

With reference now to FIG. 14D, shown is inventory progress bar 132 indicating that some inventory has been consumed. Consumed band 1322 is darker shaded band that graphically indicates how much inventory is currently consumed (by submitted, booked and scheduled orders) relative to total inventory (remaining portion of inventory progress bar 132). Consumed band 1322 may be color-coded to provide a clearer indication (e.g., consumed band 1322 may be blue). As shown here, a little over approximately 50% of the media outlet(s) inventory is consumed. Proposal band 1324 indicates how much additional inventory the current media proposal would consume if approved, injected, booked and scheduled. Proposal band 1324 is typically a lighter shade than consumed band 1322. Proposal band 1324 may also be color-coded to provide a clearer indication (e.g., proposal band 1322 may be mustard colored). As shown here, current proposal would consume an additional approximately 10% of media outlet(s) inventory. Also as shown, inventory progress bar 132 may include a visual break between consumed band 1322 and proposal band 1324 to further visually differentiate the two bands. Transparent section 1326 indicates how much inventory would remain after current media proposal is scheduled. Progress bar floor 1320 is lightly shaded to indicate that there are no "oversold" conditions either at the orderline level or flight level, as above.

Figure 14E:
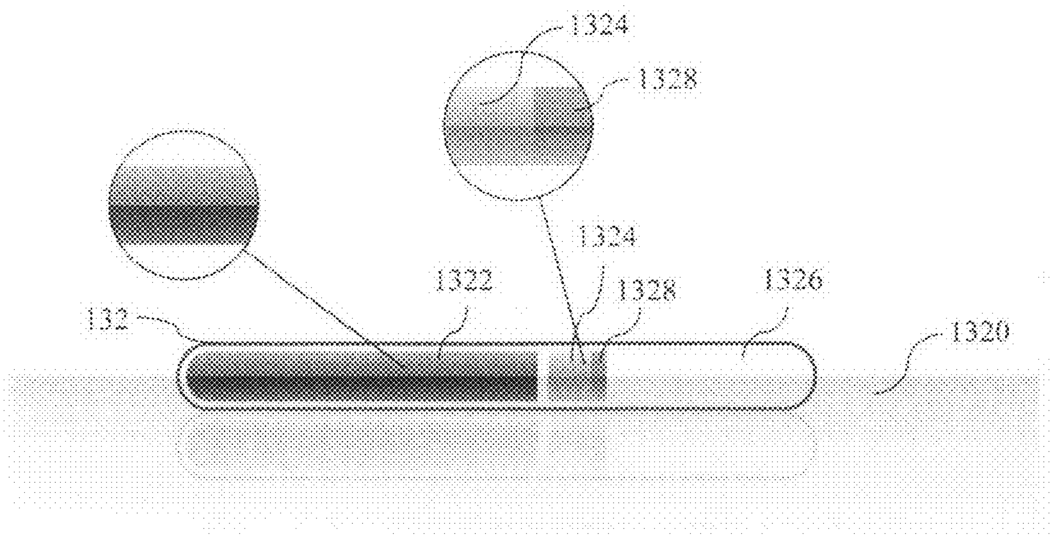

With reference now to FIG. 14E, shown is inventory progress bar 132 in which proposal band 1324 includes probable consumption section 1328 which provides further information. Probable consumption section 1328 indicates how much additional inventory could possibly be consumed by proposal based on probability weighting. Probability weighting is a concept used to provide a more accurate level of consumption of available inventory based the on the account executives belief in the "probability" of actually closing the sale (e.g., the grade assigned as described above). If a media proposal is placed in the system with a low grade probability, only a small amount of effect will it have on future views of what inventory is consumed beyond what is already ordered and scheduled. If a probability grade is set to high, the subsequent proposals take this "reservation of available inventory into account to show what is truly available to sell. Probable consumption section 1328 may be shaded darker than proposal band 1324 or colored differently (e.g., if proposal band 1324 is mustard colored, probable consumption section may be orange).

Figure 14F:
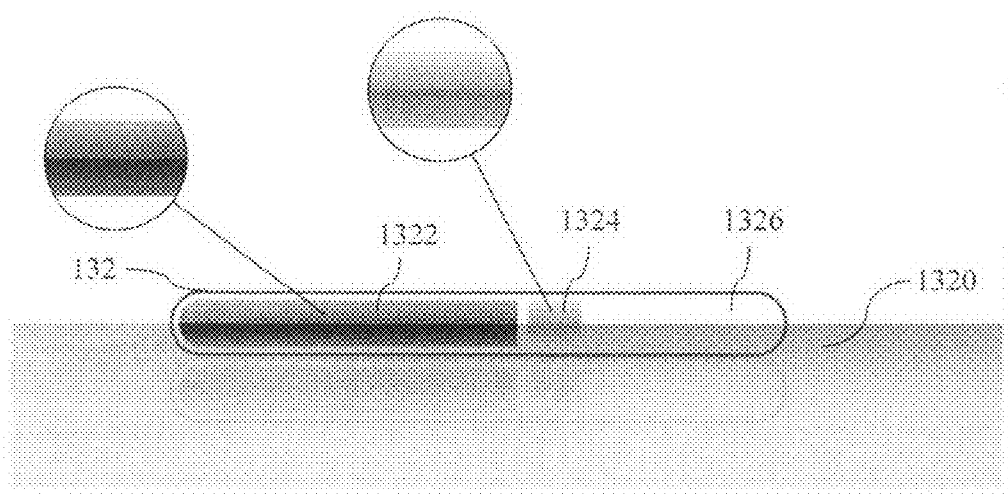

With reference now to FIG. 14F, shown is inventory progress bar 132 in which progress bar floor 1320 indicates overselling at flight level. For such an indication, progress bar floor 1320 may be shaded darker or colored a different color (e.g., purple or red-colored progress bar floor 1320 may indicate overselling at flight level). Overselling at flight level indicates that at least some of the underlying flights are oversold. Flighting as described above is a higher level view of the advertising campaign which usually involves several weeks.

Figure 14G:
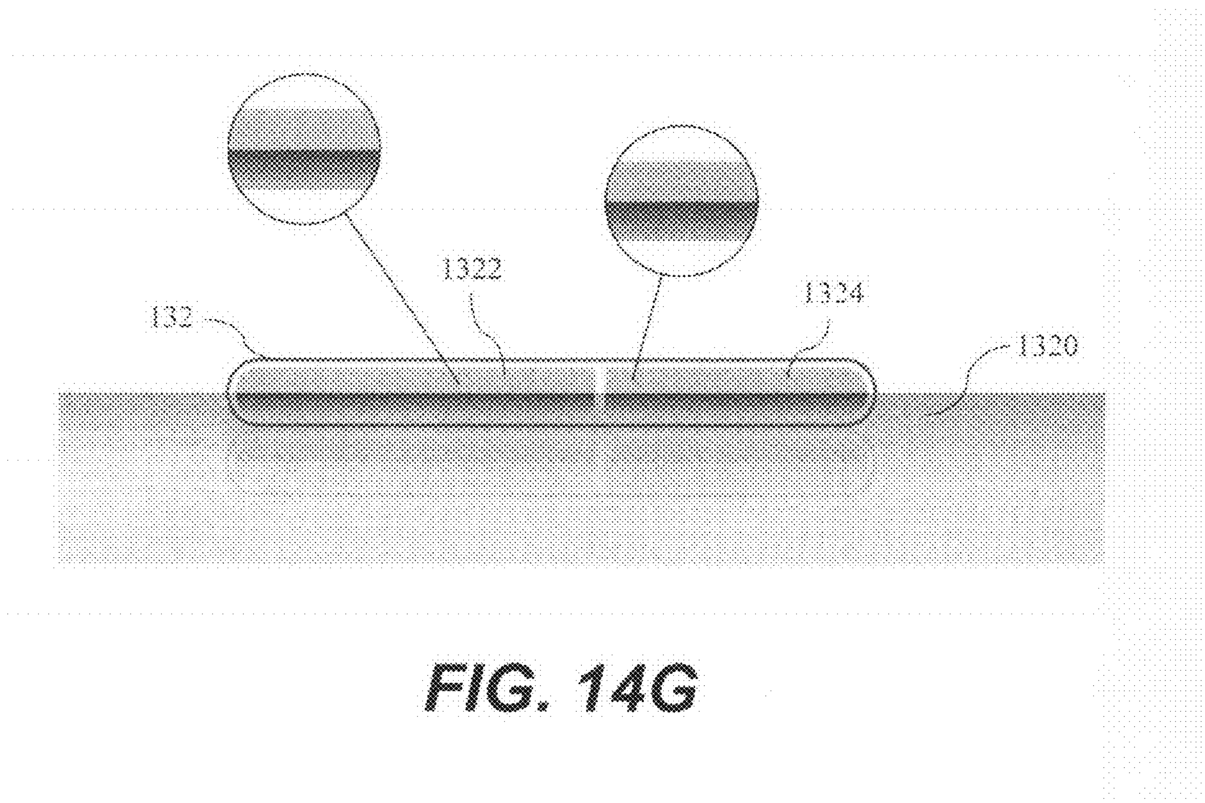

With reference now to FIG. 14G, shown is inventory progress bar 132 in which progress bar 132 is full. Consumed band 1322 and proposal band 1324 completely fill progress bar 132. Additionally, consumed band 1322 and proposal band 1324 may both be colored different shades of red, or otherwise shaded similarly, to indicate an oversold condition. The proposal band 1324 filling remaining inventory space of inventory progress bar 132 but being shaded red indicates that inventory is available but that the requested inventory puts the media proposal over the maximum (e.g., the requested advertising spots or placements are more than the available inventory). Likewise, progress bar floor 1320 may be shaded darker or colored a shade of red to indicate an oversold condition. For example, progress bar floor 1320 may be shaded purple/red to indicate that the selected orderline 119 is oversold. A different color may be used to indicate the entire flight is oversold. Since an advertising campaign can contains several underlying weeks of "orderlines" also known as flighting, those skilled in the art will appreciate this quick and intuitive ability to see from a simple graphical element the ability to quickly and easily find the areas that need to be addressed to make the proposal fully executable with available inventory.

Figure 15:
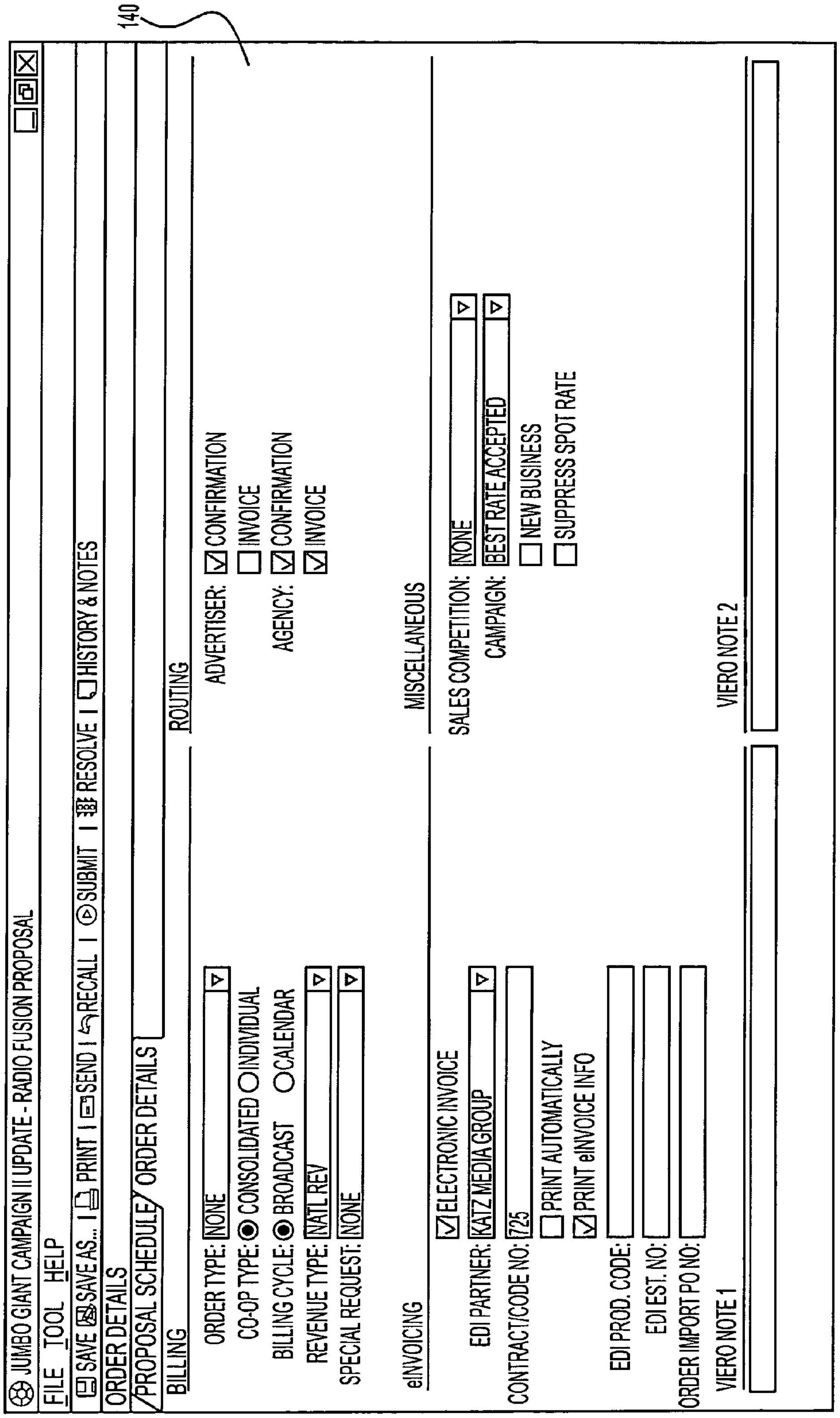
FIG. 15 is a screen shot of an exemplary order details GUI in a software implementation of an embodiment of system for creating and managing advertising proposals from inception to completion.

In an embodiment, the media proposal system 10 may also provide a window with order details that may be used and viewed when a proposal has been approved as an order. With reference now to FIG. 15, shown is an embodiment of an order details pane 140. In an embodiment, the order details pane 140 may be provided if the client (e.g., an advertiser, agency, representative firm, etc.) requires electronic invoicing. In an embodiment, the order details pane 140 does not need to be completed until after the proposal has been approved as an order by the client.

The embodiment of the order details pane 140 shown provides an account executive or other user with various fields to input order data. In the Billing area of the order details pane 140, an account executive may enter data into an Order Type field, or select from a drop down main menu, to specify the type of order (e.g., None or Co-op billing), if a Co-op order, select or enter type of Co-op into a Co-op Type field (e.g., Consolidated or Individual), select or enter billing cycle into a Billing Cycle field (e.g., Broadcast (default selection) or Calendar), select or enter type of revenue generated from the proposal into a Revenue Type field (e.g., national revenue, local revenue, etc.), and select or enter any extraordinary billing requests into a Special Request field.

With continuing reference to FIG. 15, in an embodiment, an account executive may check notifications to be sent in a Routing section of the order details pane 140. For example, if there is an advertiser and no agency, an account executive may choose to send a notice and an invoice to the advertiser. If an agency is included, a notice and an invoice may be sent to both the advertiser and the agency. Similar selections may be provided for other parties, such as a representative firm (see above).

Likewise, in an embodiment, e-Invoicing section of the order details pane 140 may be provided for when an advertiser or agency has an EDI partner (e.g., a representative firm such as Katz Media Group). EDI information, as shown, may be selected or entered and/or imported from a traffic and billing system (e.g., VIERO® RMS) and used in these fields or imported when an order arrives electronically from a representative firm (e.g., Katz Media) or agency.

With continuing reference to FIG. 15, in an embodiment, a miscellaneous section may be provided in the order details pane 140 so as to allow an account executive or other user to flag any sales-related events that may apply to the proposal and/or identify the proposal as “New Business.” The user may, for example, select or enter sales competition (e.g., a local competition between account executives or other users set up by manager, e.g., sales manager, in an attempt to boost advertising sales efforts) or select or enter a campaign type. A selected sales competition or campaign type may have different commission rates or other compensation bonuses for the account executive. Account executives are typically paid commissions which are a percentage of the price paid by the customer for an advertising order. If an order was sold as part of a sales competition awarding a bonus percentage commission, the account executive or other user would select that sales competition here and be paid the bonus commission.

In an embodiment, an account executive may also suppress the spot rate to prevent the spot rate (e.g., the price point tied to each advertising to be sold) from being listed on invoices, which may be useful for co-op billing (in co-op billing, large package proposals are submitted to multiple clients; including the spot rate in the proposal may cause confusion as it would not apply for each of the clients). Additionally, an account executive may enter any pertinent order notes in Note fields at the bottom of the order details pane 140. These notes may be imported into the traffic and billing system when the order is injected into the traffic and billing system (e.g., VIERO® RMS).

The toolbar of the media proposal GUI 70, proposals window 110 or the other GUIs described herein may provide other options for a user, as well. In an embodiment, the media proposal GUI 70 may display a Custom Daypart icon in the toolbar when the proposals item is selected from the main menu. The Custom Daypart selection may allow a user to modify the time of the day that an advertisement (e.g., a radio advertisement) will be aired or broadcast. In an embodiment, there may be sixteen (16) predefined dayparts for use in a media proposal, but custom dayparts may be added by clicking the Custom Daypart icon in the top toolbar. A custom daypart setup window (not shown) may be provided through which the user may add to the predefined dayparts.

In an embodiment, a user may click the part of the list in the custom dayparts window to place the desired daypart. In an add daypart field, the user may enter a description of the new daypart, then by clicking an add button to cause the new daypart to appear in the list.

Those having skill in the art will recognize that other buttons may be provided in the custom daypart window, such as delete and edit buttons, for use in deleting or editing a daypart. Also, move up and move down buttons may be provided to allow a user to change the position of a daypart in the list. A save button may also be provided to allow a user to save any changes the user has made. A person skilled in the art will recognize that other buttons or fields may be added to the custom daypart window as may be necessary or desired to further customize the daypart schedule.

The toolbar of media proposal GUI 70, or other GUI described herein, may provide a Ranker icon to allow a user to view audience delivery market data by station. In an embodiment, under the Proposals main menu item of media proposal GUI 70, a user may generate a list of radio stations in the market according to ratings for a specified demographic. A market ranker report can then be generated based on the selections made. By clicking on the Ranker icon in the toolbar, a market ranker window (not shown) may be provided.

To generate a audience delivery market data report, a user may input data into: a daypart field, which allows the user to choose one or more dayparts from a drop-down main menu; a stations per daypart field, which allows the user to limit the number of stations in the report, the default is to report all stations within a daypart; a gender field, which allows the user to choose the gender (persons, men, women); a start age field, which allows the user to choose a start age for the market demographic; a end age field, which allows the user to choose an end age for the market demographic; a book field, which allows the user to choose the booking period on which to base the ranking; a rank by field, which allows the user to rank report results by selecting AQH, AQH Rating, Cume (cumulative), or Cume Rating. A user may click on the plus sign (+) for the demographic end age to include in the demographic age all age ranges following the beginning age selected.

Those having skill in the art will recognize that the AQH selection ranks the radio station based on the average quarter hour, or the number of persons listening to a particular station for at least five minutes of a fifteen minute period. The AQH rating ranks the radio station based on the AQH estimate expressed as a percentage of the population being measured. The Cume selection ranks the radio station by the estimated number of individuals who listen to a station for a minimum of five minutes during a fifteen minute period within a daypart. The Cume Rating ranks a radio station by the Cume audience expressed as a percentage of all persons estimated to be in a specific demographic group.

After data is input into fields in the market ranker window, a user may click a run icon to generate a report. In the report, a user may click on the minus (−) to collapse results and click on the plus (+) to expand the results. A user may also click a print preview icon in the market ranker window to prepare the report for printing, in a format such as that depicted in FIG. 15A.

A person skilled in the art will recognize that other rankings fields and demographic data may be incorporated in the market ranker generator in media proposal system 10.

Figure 16:
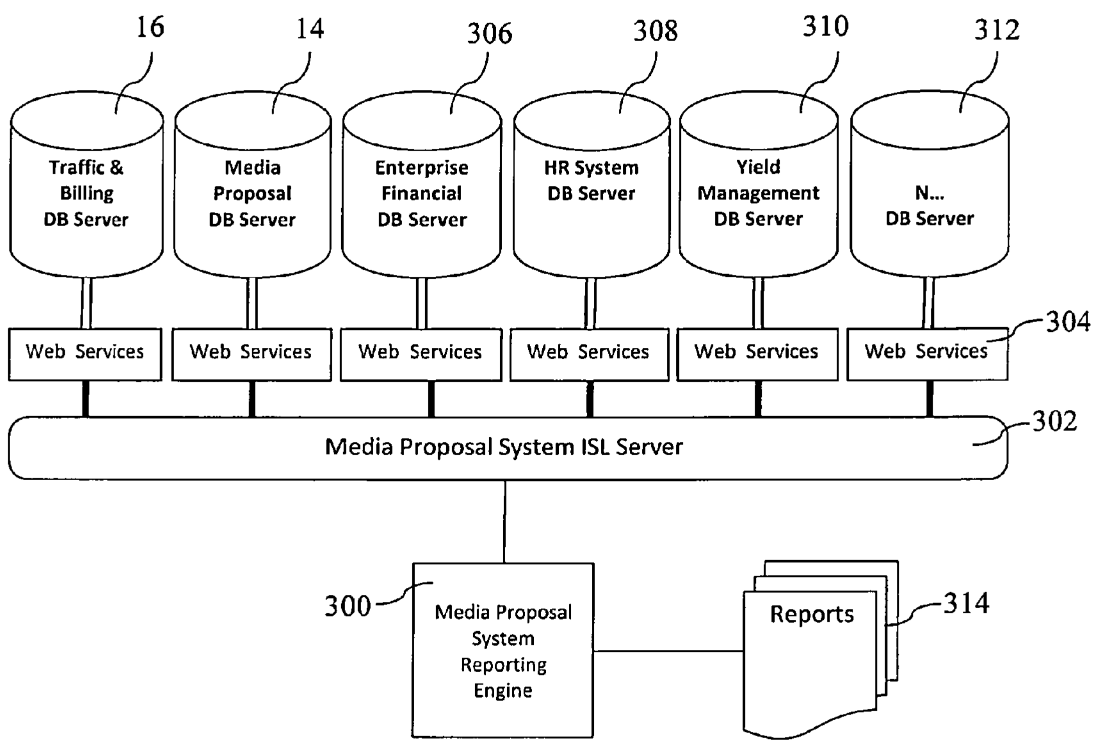
FIG. 16 is a diagram illustrating an embodiment of a media proposal system reporting engine in an embodiment of system for creating and managing advertising proposals from inception to completion.

In an embodiment, media proposal system 10 includes a reporting engine that marries multiple data sources and applications to provide reporting of advertiser account activity. With reference now to FIG. 16, shown is an embodiment of media proposal system reporting engine 300. Reporting engine 300 may be incorporated into and implemented as a software module of media proposal system 10 or as a separate application. In the embodiment, reporting engine 300 connects to various enterprise applications, such as those described above, via an integrated services layer (ISL) server 302. Server 302 may be situated as a separate server remote to or with media proposal system server 12 or incorporated into media proposal system server 12.

Through ISL server 302, reporting engine 300 may connect with various database servers of enterprise applications, e.g., through enterprise application web services 304. For example, reporting engine 300 may connect to traffic and billing database server 16, media proposal database server 14, enterprise financial database server 306, a human resources system database server 308, and a yield management database server 310. Other enterprise application database servers, indicated as N database server 312. Through these various connections, media proposal system reporting engine 300 may obtain necessary data to generate various reports 314 described herein and others.

The data contained in reporting involves workflow, historical revenue as compared to current spending, proposals pitched that are won, lost or cancelled, and analytics of the sale process. Media proposal system 10 provides a number of user-configurable reports, e.g., through media proposal GUI 70 that may be used to monitor scheduled revenue and pending business as well as derive lists of advertisers and agencies. Accordingly, the main menu of media proposal GUI 70 may also provide a Reports item for selection. If a user selects the Reports main menu item, the media proposal GUI 70 may provide various report options.

In an embodiment, a Reports window may comprise three panes: a reports list pane that provides a list of reports from which a user may select a desired report, a configuration pane providing various configuration options with which a user may configure a report, and a pane in which a user may view an example of the type of report selected.

Figure 17:
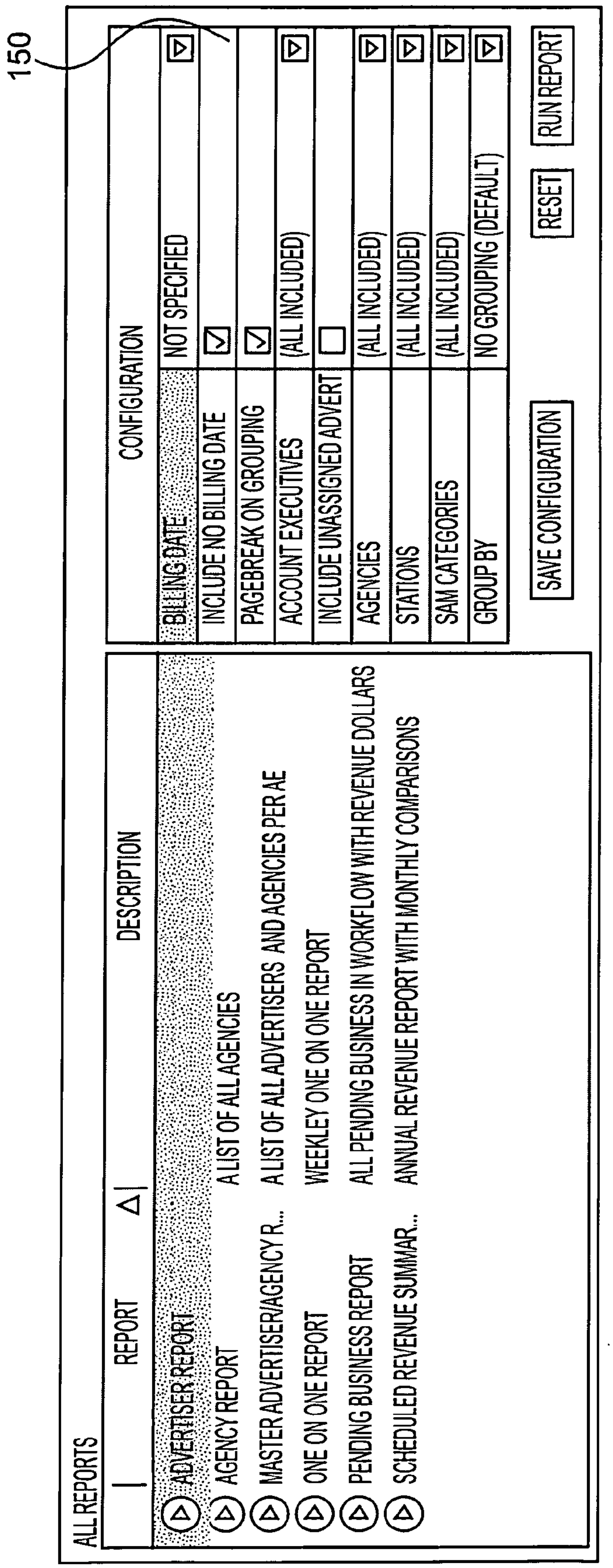
FIG. 17 is a screen shot of an exemplary reports GUI in a software implementation of an embodiment of system for creating and managing advertising proposals from inception to completion.

With reference now to FIG. 17 shown is a portion of an embodiment of the reports window 150, showing the reports list pane and the configuration pane. The reports list pane may allow a user to select from an Advertiser Report, an Agency Report, a Master Advertiser/Agency Report, a One-on-One Report, a Pending Business Report, or a Scheduled Revenue Summary Report. To run a report, a user may select the desired report from the All Reports window. A sample report will then appear in the sample report pane, and the configuration pane will display the default configuration settings for the report.

Using the configuration pane, a user may select the parameters for the report by relying on default values or making their selections from various drop-down lists. A user may click a reset button that may be provided in the configuration pane to return to the default settings, or the user may click a Run Report button to launch a toolbar from which a user may print, view, save or manipulate the report in other ways.

With continued reference to FIG. 17, the configuration pane of reports window 150 may provide various fields through which a user may customize report configurations (e.g., via drop-down menus and checkboxes). For example, a user may specify From and To billing dates in the drop-down main menu in a Billing Date field. Likewise, a user may check an Include No Billing Date field to include advertisers with no billing date; a Pagebreak on Grouping field may be checked to include a page break whenever a new group begins; an Account Executives field may contain a drop-down list to select the account executives to be included in the report; an Include Unassigned Advertisers may be checked to include unassigned advertisers in the report; agencies to include/exclude from the report may be specified in a drop-down list in an Agencies field; stations to include/exclude from the report may be specified in a drop-down list in a Stations field; a SAM Categories may allow a user to specify the strategic account management categories to include/exclude from a drop-down list; a Group By field may be used to specify how the report data is to be grouped, and grouping options may be provided (e.g., No Grouping, Station First or SAM Category First). The configuration pane may offer different options based on which report is selected in the reports list pane.

As an example of utilizing the configuration pane, the Advertiser Report may by default provide information on all advertisers assigned to all account executives. However, a user may cause the Advertiser Report to provide information on all advertisers assigned to individual account executives by specifying individual account executives using the Account Executives drop-down main menu in the configuration pane. The Advertiser Report can likewise be configured or filtered to only show information on advertisers from certain agencies or representative firms, etc.

After the configuration fields have been filled out by the user, a Run Report button may be used to generate the report. The report can be printed, exported to its available formats (e.g., PDF, Excel, etc.), all shown on the printing toolbar. Two excerpts from exemplary Advertiser Reports, configured using the configuration pane, are shown in FIGS. 17A and 17B. The "search criteria" at the top of each report excerpt indicates the configuration options chosen.

A person skilled in the art will recognize that other reports may be configured and run using the same or similar functions and fields. For example, in an embodiment, an Agency Report may be used to generate a list of all agencies currently registered in Fusion. As with the Advertiser Report, a user may adjust various configuration fields for the Agency Report in the configuration pane. Various configuration fields may be provided, such as a Billing Date field which may be provided to allow a user to specify the From and To dates to include in the report, an Include No Billing Date field which may be provided to allow a user to specify whether agencies that have not been sent an invoice or have a record of business with a radio station should be included in the report, an Agencies field which may be provided to allow user to select or deselect the agencies to include in the report, a Page break on AE field which may be provided so that a user may require that the report for each account executive be put on a separate page, an Account Executives field to provide a user with the option of selecting and deselecting account executives to include in the report, an Include Unassigned (Account Executives) field which may be provided to include account executives who are not assigned to Advertisers for which an agency is also attached, a Stations field which may be provided to allow user to select and deselect stations to include in the report, and Include Unassigned (Stations) field which may provide a user with the option of specifying whether or not the report is to be grouped by account executive. FIG. 17C shows an excerpt of an exemplary Agency Report, configured using the configuration pane of reports window 150.

With continuing reference to the report window 150 in FIG. 17, in an embodiment, a Master Advertiser/Agency Report, may be provided to generate a list of all advertisers and/or agencies assigned to a manager's account executives. As above, a user may adjust various configuration fields, which may be those similar to the configuration pane described above. FIG. 17D shows an excerpt of an exemplary Master Advertiser/Agency Report, configured using the configuration pane of reports window 150.

In an embodiment, a One-on-One Report such as the one shown in FIG. 17E may be provided to give a user the status of individual account executive activities. As above, a user may adjust various configuration fields, which may be those similar to the configuration pane described above. For example, a user may specify the start date for the report, and the account executives to include in the report. In an embodiment, the One-on-One Report may list the new advertising prospects worked by the account executive in the last seven days, and may list the advertisers with a proposal from the account executive awaiting client approval.

With continuing reference to the report window 150 in FIG. 17, in an embodiment, media proposal system 10 may also provide a Pending Business Report. As above a user may adjust various configuration fields in a configuration pane. For example, a user may choose the advertisers to include, choose the account executives to include, choose the stations to include, choose the month and year to start the report, choose the revenue type to include, choose the grades to include, and group the report by advertiser or account executive. FIG. 17F shows an excerpt of an exemplary Pending Business Report.

In an embodiment, media proposal system 10 may also provide a Scheduled Revenue Summary Report. The Scheduled Revenue Summary Report may provide a list of monthly revenue that includes current and new revenue totals and a comparison for each month between the current year and the previous year. As with the other reports, a user may configure the report, using configuration pane of report window 150. For example, a user may choose the year for the report, choose the stations to include, choose the revenue types to include, choose miscellaneous revenue types to include, choose account executives to include, choose agencies to include, choose advertisers to include, choose break ties to include, choose SAM categories to include, choose to view the report as a monthly or quarterly report, choose to view broadcaster calendar billing, choose whether the report will be a summary or detail report (a detail report for example, may create a separate page for each advertiser, account executive or station), and choose how to group the report details (e.g., by advertiser, account executive or station). The selections for the choices in the configuration pane, for example the account executives, agencies, and advertisers, may be determine from information stored in the media proposal database 14, the traffic and billing database 16 or an external database. FIG. 17G shows an excerpt of an exemplary Scheduled Revenue Summary Report.

As noted above, media proposal system 10 may provide various levels of access for different users. To access the security functionality, a user may click on a Security item that may be provided in the main menu of media proposal GUI 70. Clicking on the Security item may provide a user access to a Security pane with three icons for Users, Roles, and Audit Log.

In an embodiment, a security administrator may control the security settings for media proposal system 10. When a new user, e.g., administrator, account executive (AE), sales manager (SM), business manager (BM), or traffic manager (TM), is added to a human resources application connected to the media proposal system 10, the media proposal system 10 automatically imports record of the user. Conversely when a user is terminated in human resources, media proposal system 10 automatically drops that user account. To add a new user manually, the administrator may click on a Users icon on the media proposal GUI 70 to display a list of approved users in a different pane. The administrator may scroll through a list of users and may click a New icon that may be provided in the toolbar 74, whereupon a User Details pane may be provided.

Figure 17H:
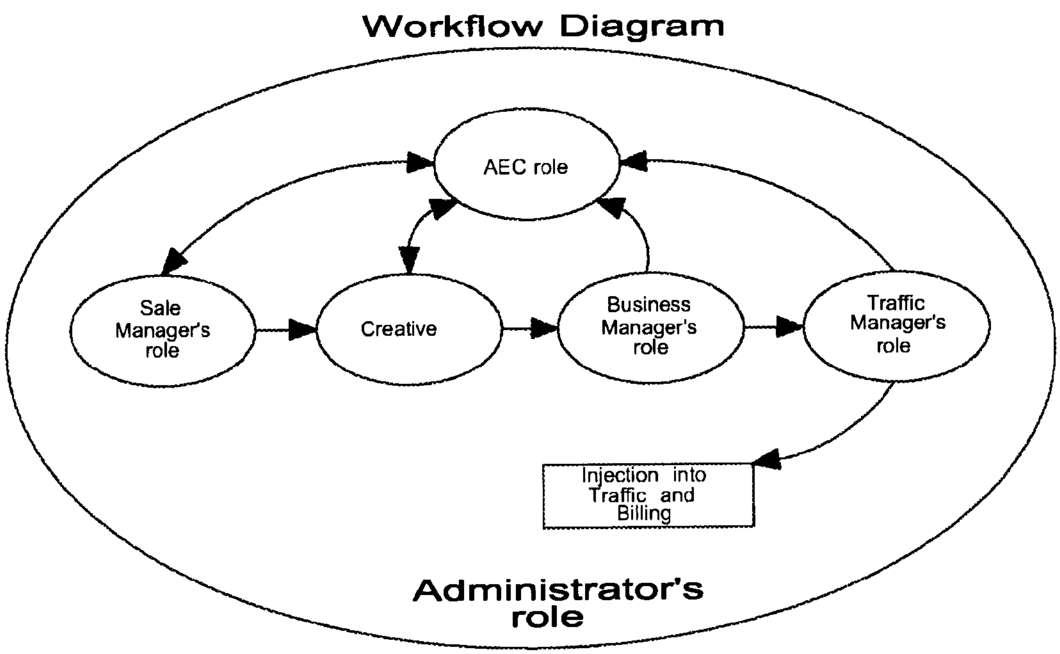
FIG. 17H illustrates various roles and their relation to one another and the workflow in the media proposal system, according to embodiments of the present disclosure.

In an embodiment, as described above, there may be a number of user roles. For example, there may be administrator, account executive, sales manager, business manager, and traffic manager roles. The creative (the actual audio, video or web content of the advertisement) is also shown in the diagram, indicating how the various roles may interact with the creative, including inserting it into the proposal during the workflow. The diagram shown in FIG. 17H illustrates these various roles and their relation to one another and the workflow in the media proposal system 10.

The default workflow interaction of the roles defined in media proposal system 10 is shown. Work (e.g., preparation of proposal) in media proposal system 10 is prepared by account executive, and sent to sales manager. Sales manager reviews work and forwards to business manager, with sales manager's approval communicated back to account executive by media proposal system 10. Business manager reviews and approves work, and forwards to traffic manager, with business manager's approval communicated back to account executive by media proposal system 10. Traffic manager reviews and approves work, and, in the case of a customer accepted proposal, injects proposal as an order into traffic and billing system (e.g., VIERO®RMS) using media proposal system 10, with traffic manager's approval communicated back to account executive by media proposal system 10. Alternatively, if any of the managers rejects approval, the rejection may be communicated back to account executive with requests for revision. The administrator, through the security modules, can alter this interaction and roles may be added or changed based on the media outlet's preferences As shown, after the traffic manager approves a client-approved proposal, the proposal is injected into a traffic and billing system (e.g., VIERO® RMS). The administrator oversees all other users' access to the media proposal system 10.

In an embodiment, in a User Details window pane, the administrator may enter a Domain Logon Name for the new user in a General area of the User Details pane. If the user already exists in the corporate domain, e.g., in some other application connected to the media proposal system 10, the user's key information, including address information, may automatically populate the other fields of the User Details pane. For users that do not already exist in the corporate domain, the administrator may enter the new user's name, title, telephone number, fax number, email and web site information into various data entry fields. In an embodiment, a Traffic System ID field may contain an Export to Traffic button that the administrator may click on to export the user's data to the connected traffic and billing system (e.g., VIERO® RMS). In an embodiment, only account executives need to be added to the traffic and billing system. When exported to the traffic and billing system, media proposal system 10 may send the user's data to traffic and billing system database 16.

In an embodiment, the administrator may use a Role Assignment area to assign roles to the new user. Initial roles may be determined by a third-party employee management application, such as Oracle's PeopleSoft Human Resources application. In an embodiment, the administrator may be authorized to add roles, but the administrator may not remove roles or permissions assigned by Oracle's PeopleSoft. The administrator can assign to the user a security role, such as without limitation administrative assistant (Admin), account executive (AE), business manager (BM), sales assistant (SA), sales manager (SM), and traffic manager (TM).

For each role selected in the Role Assignment area, the administrator may click on a corresponding drop-down list in a Gatekeeper Roles column that may be provided and select the appropriate check boxes. In an embodiment, the administrator may further define the roles. For example, under the Admin role the administrator may select Admin which is the media proposal system 10 administrator; under the AE role the administrator may select OUT AE for outside account executive or IN AE for inside account executive; under the BM role the administrator may select BM for business manager, MC for market controller, AP/R for accounts payable or receivable manager, CM for credit manager; under the SA role the administrator may select Sales Assistant; under the SM role the administrator may select the DOS for director of sales, GSM for general sales manager, NSM for national and interne sales manager, LSM for local sales manager, NSM2 for a national sales manager that falls outside of a market location, such as a regional key accounts sales manager, TSM for yield manager, NTR MGR for non-traditional revenue manager, DIR ND for director of new development; under the TM role the administrator may select TM for traffic manager, or T/BCLRK for traffic or billing clerk.

In an embodiment, a Manager Assignment area may allow the administrator to assign a manager for the user using drop-down lists for fields Sales Manager and Business Manager. If applicable, the administrator may check OMR Manager for Online Music Radio manager. The Proxy Assignment area may be used if the new user is a sales assistant. The Proxy For field may provide a drop down list from which the administrator can select an account executive. This selection may provide an account executive's sales assistant permission to assume the account executive role when using media proposal system 10.

Once all the information is entered for the new user, the administrator may click on a Save icon that may be provided in the toolbar. A message may be provided to notify the administrator that the new user is now saved and will appear in the list of users. However, the administrator may click on a Cancel icon that may be provided in the toolbar to cancel adding a new user.

To edit a user profile, an administrator may select the desired user in the Users pane, and click on an Edit icon that may be provided in the toolbar. The selected user's information may be displayed in a User Details pane. The administrator may modify the information and then click a Save icon in the toolbar. A message may be provided to confirm the saved edits. If the administrator does not want to save the changes, the administrator may click on a Cancel icon. The administrator may also edit role assignments for the user and save them using the "Save" icon from the toolbar.

An administrator may also change the roles of various users by clicking on a Role icon that may be provided in the Security pane. As roles in an organization changes and new business application and functions are integrated in media proposal system 10, the administrator may desire to change role permissions for a particular role, such as for account executives.

Figure 18:
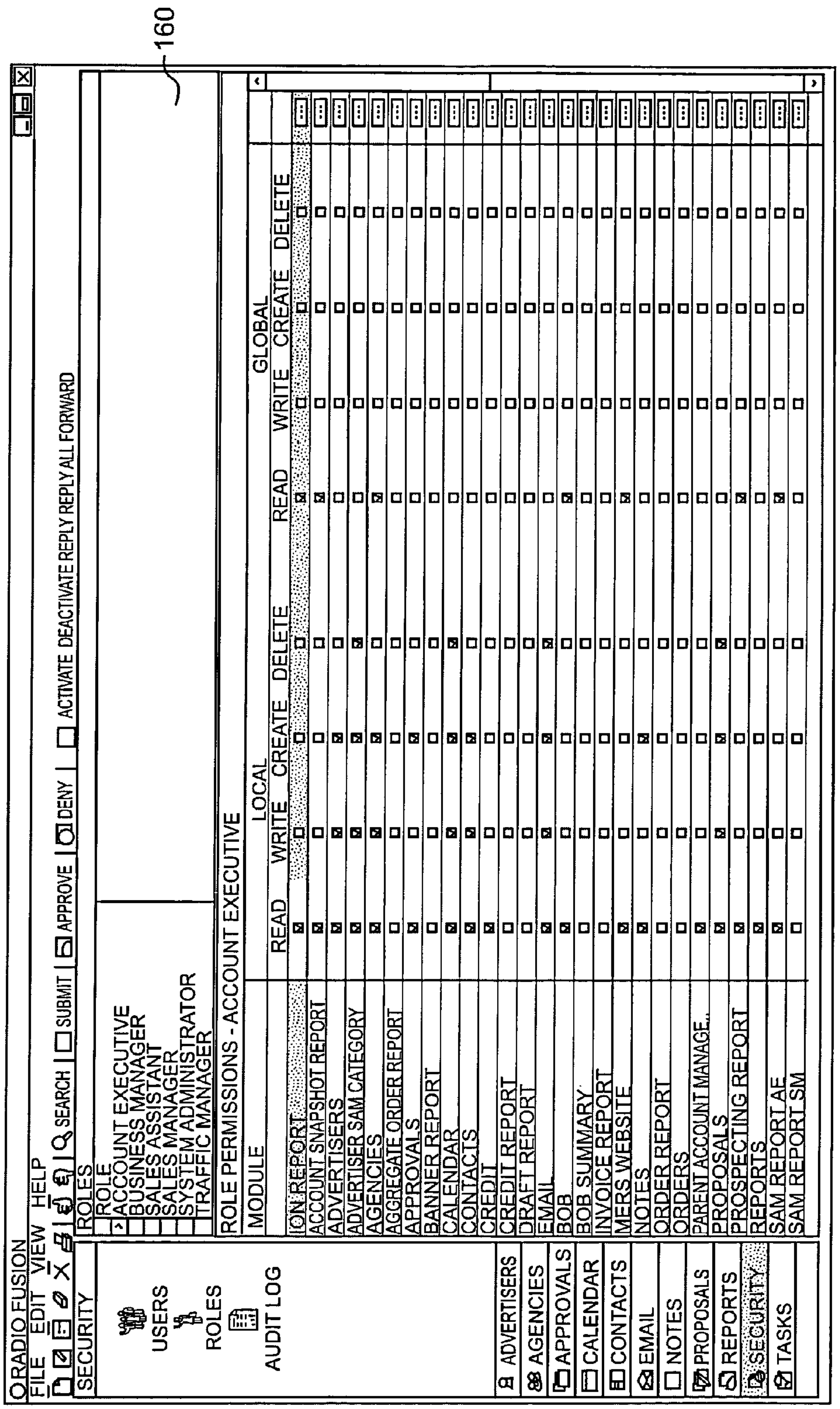
FIG. 18 is a screen shot of an exemplary roles GUI in a software implementation of an embodiment of system for creating and managing advertising proposals from inception to completion.

With reference now to FIG. 18, shown is an embodiment of a roles pane 160, displayed if the Roles icon is selected. For example, the administrator may select a role such as Account Executive or Sales Manager and then click the Edit icon in the toolbar to access the Role Permissions pane. In an embodiment, the administrator may select or deselect the appropriate check boxes to change role permissions in the Role Permissions pane. The administrator may select or deselect Local or Global access such as read access, write access, create access or delete access. For each section of media proposal system 10, the administrator may configure the access level for each particular role. For example, the administrator may limit sales assistants to only read and write access to email within the media proposal system 10. After making the edits, the administrator may click on a Save icon in the toolbar. A message may be provided to confirm the saved edits. If the administrator does not want to save the changes, the administrator may click on a Cancel icon in the toolbar.

Figure 19:
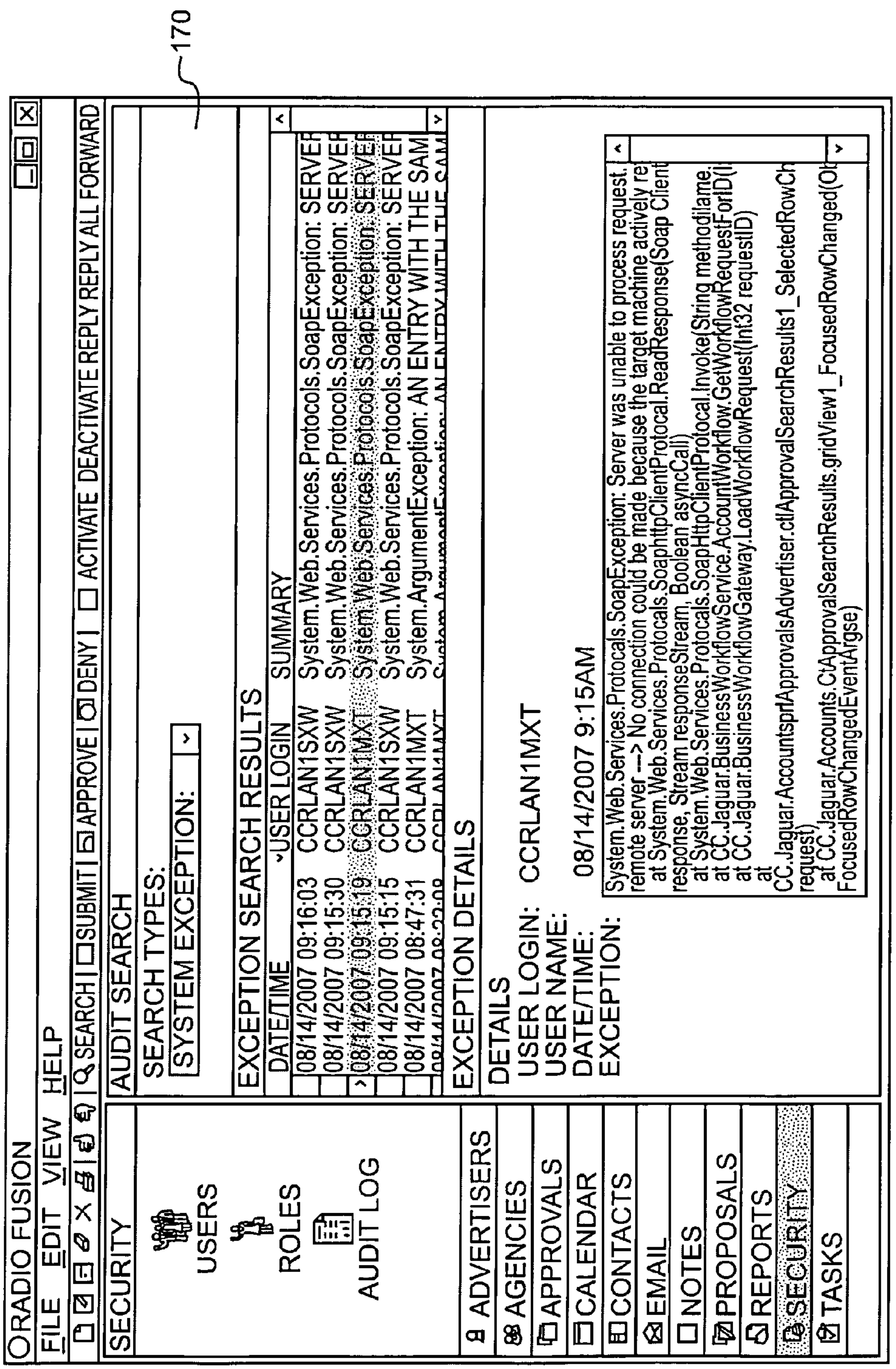
FIG. 19 is a screen shot of an exemplary audit GUI in a software implementation of an embodiment of system for creating and managing advertising proposals from inception to completion.

With reference now to FIG. 19, which shows an audit search window 170, an administrator may also generate an audit log displaying the activities and system exceptions of particular user when using the media proposal system 10 by clicking on an Audit Log icon that may be provided in the Security pane. By clicking on the Audit Log icon, the administrator may be provided with an audit search window 170 through which the administrator may select from a Search Types field a drop down main menu. The drop down main menu may allow the administrator to select either a search of Audit Activity or System Exceptions. Shown in audit search window 170 is an exemplary results list that may be returned when the administrator searches for System Exceptions. A list of the exceptions may be displayed in the Exception Search Results pane. When an administrator clicks on one of the exceptions in the Exception Search Results pane, an Exception Details pane may be provided to list details of the selected system exception.

As is apparent from the above description, the media proposal system 10 provides a dynamic advertising sales automation and advertising customer relationship manager (CRM) tool. As such media proposal system 10 automates much of the advertising sales and customer relationship process. Additionally, the media proposal system 10, by automating advertising sales and integrating other systems such as the traffic and billing system, enables various methods and techniques that increase the effectiveness of advertising selling.

Figure 20:
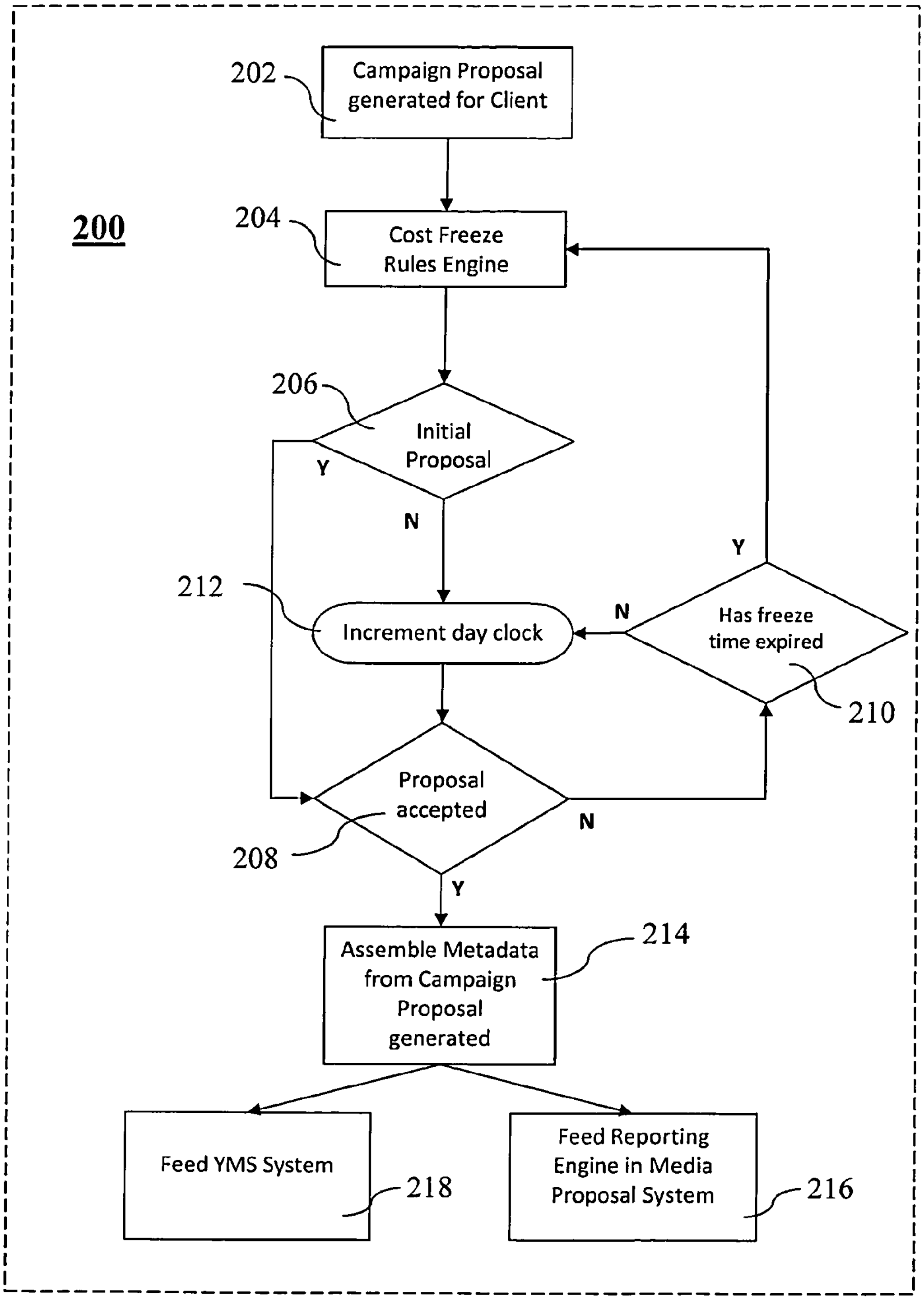
FIG. 20 is a flowchart illustrating an embodiment of a method for generating advertising campaign proposals with cost freeze.

One such method incorporates a technique of freezing advertising campaign costs while proposal acceptance is pending. With reference now to FIG. 20, shown is an embodiment of a method for generating advertising campaign proposals with cost freeze 200. Cost freeze indicates that the method 200 will freeze or hold some or all of the proposed costs for placing advertising in an advertising proposal while the customer is considering accepting the proposal. In an embodiment, using media proposal system 10, an advertising campaign proposal is generated for a client/customer, block 202. The advertising campaign proposal includes time and day criteria for placing advertising (e.g., AM rush, weekday, weekend, etc.), media outlets on which advertising will be placed (e.g., radio stations, televisions stations, internet sites, billboards, and/or newspapers, etc.), and other information apparent from above. For example, the campaign proposal includes a cost for the advertising proposed to be placed on the media outlet(s). The generated proposal is submitted to the customer for approval, as described above.

After the advertising campaign proposal is generated, method applies cost freeze rules to proposal, block 204. In an embodiment, media proposal system 10 includes a cost freeze engine that applies the cost freeze rules to the proposal. The cost freeze rules dictate how long to freeze the costs for the advertising in the proposal, which of the costs to freeze, under what circumstances to revise proposal and/or extend cost freeze, etc.

After the cost freeze rules have been applied, method 200 determines whether the proposal is an initial proposal, block 206. The cost freeze rules engine may make this determination when applying cost freeze rules to the proposal. If the proposal is the first proposal for the campaign at issue and has not been submitted to the customer, it is an initial proposal. If the proposal is an initial proposal, method 200 determines whether the proposal is accepted or rejected by the customer, block 208. The cost freeze rules engine may make this determination. For reasons explained below, this determination 208 is typically performed at the end of the day, after close of business for the customer. Alternatively, method 200 may repeatedly and periodically inquire media proposal system 10 during the day as to whether proposal is accepted or rejected.

With continuing reference to FIG. 20, if the proposal is not accepted, method 200 determines if the freeze time has expired or if proposal was rejected (proposal may have not been acted upon, in which case it would be not accepted or rejected), block 210. Again, the cost freeze rules engine may make this determination. Typically, the cost freeze rules engine sets the freeze time as a number of days. Accordingly, determination 210 is typically made once per day, after a final determination 208 that the proposal is not accepted that day; if the freeze time has not expired, a day clock or counter that keeps track of the number of days since the proposal was submitted is incremented by one day, block 212. In an alternative embodiment in which the cost freeze time is measured in hours, for example, the counter is incremented by one hour, the determination 210 is typically made once per hour, after a final determination 208 that the proposal is not accepted that hour. One of ordinary skill understands that other increments of time may be used.

If the freeze time has expired, method 200 returns to applying 204 cost freeze rules to determine what to do next. The cost freeze rules are applied to the proposal to determine whether to, for example, modify the proposal (including, without limitation, extending the cost freeze, adding enticements to the proposal (more prime advertising placements), modifying the costs and re-freezing) or to cancel the proposal. Other actions may be taken at this point; the cost freeze rules, e.g., as applied by the cost freeze rules engine, determine the next steps. Alternatively, account executive or other user may manually modify the proposal at this point. If proposal is modified, method 200 determines 206 that proposal is not initial proposal and increments 212 counter/clock, as described above.

With continuing reference to FIG. 20, method 200 repeats blocks 204-212 until proposal is accepted, rejected or canceled. If proposal is determined 208 to be accepted, media proposal system 10 assembles metadata from generated campaign proposal, block 214. The metadata may include details about the accepted proposal, which is deemed an order if approved by sales manager and traffic manager (see above). These order details include advertisement placement, scheduling and other requirements, costs and information about advertiser, advertiser relationships (see above, etc.). The metadata is used by media proposal system 10 to generate various reports, which are described above. Consequently, this metadata may be used to feed media proposal system 10 reporting engine, block 216. Accordingly, e.g., media proposal system 10 reporting engine generates a report of proposals that have been accepted.

Likewise, this metadata may be used to feed a yield management system ("YMS") (e.g., Best Rate), block 218. As indicated above, media proposal system 10 may be integrated and interact with various other systems, such as a yield management system. The metadata, particularly cost data, may be used by the yield management system to calculate the Best Rates, as described above and incorporated Best Rate applications. Method 200 may also incorporate steps described with reference to method 40 above.

Figure 21:
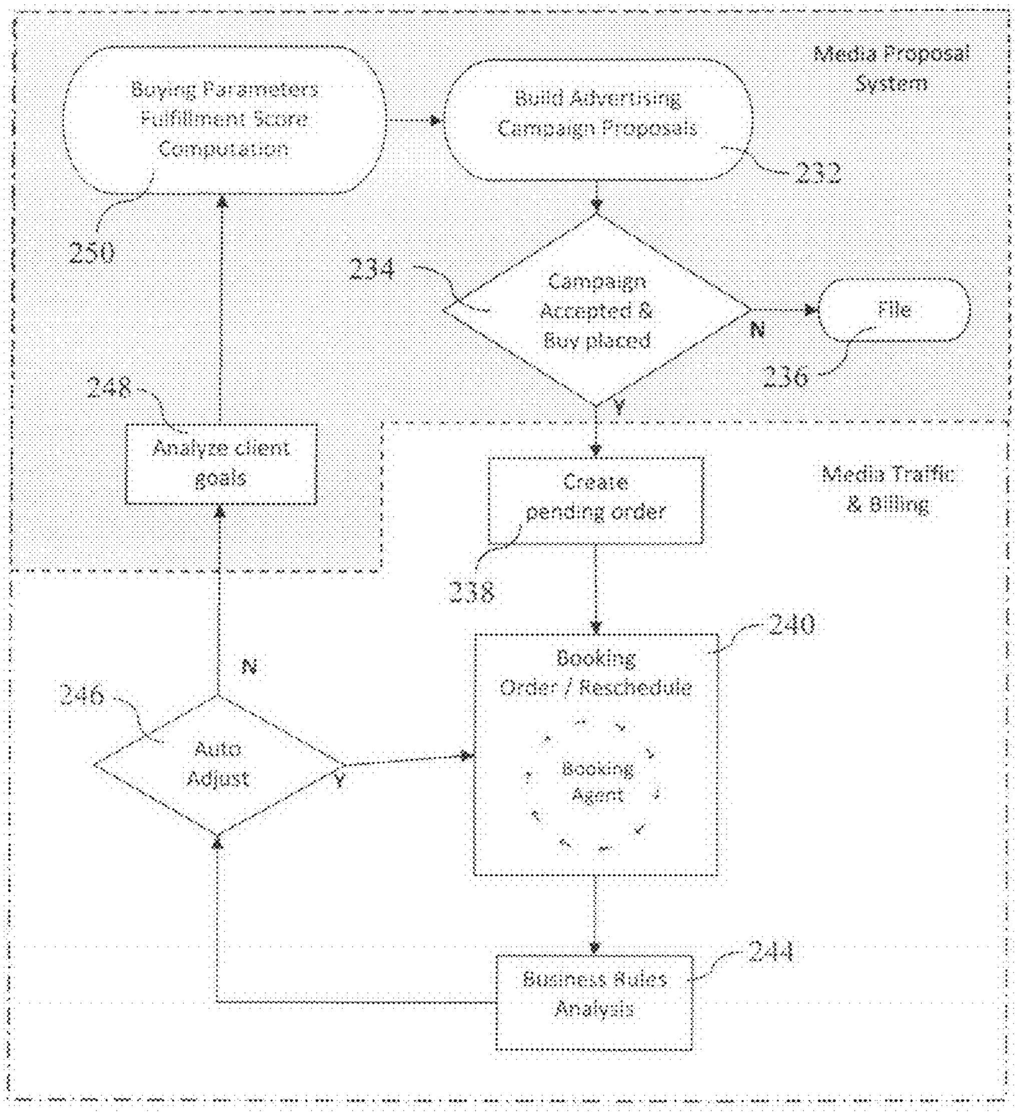
FIG. 21 is flowchart illustrating an embodiment of a method for generating and managing advertising campaign proposals using feedback from the traffic and billing system.

With reference now to FIG. 21, shown is an embodiment of method 230 of generating and managing advertising campaign proposals using feedback from the traffic and billing system (e.g., VIERO® RMS). As shown, embodiment of method 230 shown includes steps performed by media proposal system 10 and traffic and billing system 5. In method 230, media proposal system 10 utilizes a feedback loop that provides information, based on previously booked campaign orders, from traffic and billing system 5 to build and revise/adjust advertising campaign proposals/orders. This feedback information includes an analysis of customer goals and a campaign's achievement of those goals, a campaign's fulfillment of buying parameters, and other relevant information. Using this information, media proposal system 10 may build "better" campaign proposals or revise active orders to perform better.

Embodiments of method 230 may utilize the Best Rate functionality described in the Best Rate applications. In addition to the demand input described therein, media proposal system 10 may input customer goals, predicted performance of an injected order, financial performance history of customers and the marketplace and predefined business rules, such as "bonusing." In the embodiment of method 230 shown, media proposal system 10 utilizes two distinct feedback functions:

(1) When an order is injected into traffic and billing system 5, a business rules engine integrated with a scheduling engine in traffic and billing system 5 looks to see if certain criteria are met. If any criteria are met, business rules associated with the criteria are applied to the injected order. For example, if an advertising customer has met or exceeded certain spending levels or budgets for the prior two quarters, the customer is immediately bonused spots/placements (given additional free spots/placements in which their advertisements may be aired, displayed, etc.) IF there are spots/placements available for the customer's particularly category of business and other rules (such as separation from competitors) are validated.

(2) When a proposal is injected as an order and scheduled, media proposal system 10 receives ongoing feedback from traffic and billing system 5 and determines if the proposal (now an order) can be improved. Media proposal system 10, e.g., a scenario engine in media proposal system 10, may receive suggested additional spots or different spots/placements that may be added to the order for a discount (e.g., because the spots/placements are set to spoil/expire) or at a better price than original ordered spots. Media Proposal system 10 may process the suggested spots/placements and revise/adjust the original or current proposal/order to reflect them. The revised proposal/order may be presented to the account executive for review and submission to the customer for approval. Likewise, the feedback may enable the media proposal system 10 to grade the order's performance and provide this grade to the account executive so that the account executive may manually adjust the proposal/order. This feedback and adjustment may occur while an order is being fulfilled, allow a dynamic revision of the order during an ongoing, ordered advertising campaign. Consequently, this feedback loop continues while an order is being fulfilled.

Accordingly, method 230 builds advertising campaign proposals, block 232. Such proposals may be built as described above, including without limitation as in FIG. 19. Method 230 determines if a campaign is accepted and buy placed, block 234. This is determined to have occurred if media proposal system 10 receives a customer acceptance of a proposal. If the campaign is ultimately not accepted, a record of the rejected or canceled proposal is filed for later analysis, block 236. For example, media proposal system 10 may later run various metrics to determine features of rejected or canceled proposals, determine success rates and otherwise generate reports that enable user analysis.

With continuing reference to FIG. 21, if a campaign proposal is accepted, the campaign proposal is injected into traffic and billing system 5 and a pending order is created, block 238. The pending order remains pending (e.g., in traffic and billing system 5 in-box) until order is booked, block 240. Booking an order includes scheduling the advertisements in the order (e.g., described in proposal created and accepted) for airing, displaying, publishing, etc. on the media outlet. For example, booking may include placing spots into a radio station schedule. Booking an order may be performed as described in the RMS application. A booking agent, e.g., as described in the RMS application, may dynamically schedule and schedule the advertisements based on feedback in block 240. While advertisements are being scheduled and placed, method 230 performs constant business rules analysis to determine if certain criteria are met, if order goals are being fulfilled, etc. block 244. The business rules analysis may be performed as described above and in the Airwaves application. Based on the business rules analysis, method 230 determines whether to automatically adjust the advertisement scheduling, block 246. This determination 246 may be based on a certain percentage of goal fulfillments being met. For example, if 100% of the order goals are not being met or opportunities exist based on the presence of a business rule such as "bonusing" good customers advertisement spots/placements, method 230 may determine to automatically adjust the advertisement scheduling to try to better fulfill the order goals. Accordingly, method 230 loops back to, e.g., booking agent, to dynamically re-schedule advertising 242, based on information from the business rules analysis 244. For example, method 230 may schedule additional airing of an advertisement in bonus spots made available. This process between blocks 242-246 may continue as a continuous loop before and during airing, displaying, publishing, etc. of advertising.

If method 230 determines 246 not to adjust the advertising scheduling, the order is fulfilled and advertising performance information as it relates the placement of ads in the scheduled log on the order is fed back to media proposal system 10. Using this information, media proposal system 10, analyzes the customer goals, and the campaign's achievement of those goals, block 248. This analysis includes determining from the feedback whether opportunities for improving the order exist and whether the order should be adjusted. Based on the analysis, media proposal system 10 computes a buying parameters fulfillment score, block 250. This score is used as an overall ranking of how likely the order parameters will fulfill the customer's goals. If opportunities exist, such as spots that may be purchased at discounted rates, etc., to increase the performance against the original goals, a scenario or computation engine of media proposal system 10 will present these opportunities to users through the GUIs described above. Method 230 may automatically adjust the original proposal to include the opportunities as described herein, building 232 new or modified proposals to present to the customer The Media proposal system 10 will then trigger workflow to give the original account executive of the proposal/order the ability to present the opportunities as alternatives to the agreed upon order in place.

An example of such opportunities determined from the score is if small additional advertising slots are added to the overall order, the performance against costs in the proposal/order would be greatly improved. This improvement would make modifying the existing proposal/order attractive to the customer. The account executive may perform this process manually based on the feedback from traffic and billing system 5 in the beginning of the selling process. However, the scheduling engine in traffic and billing system 5 is constantly automatically moving around advertising after an order is placed which can create opportunities. Media proposal system 10 may automatically communicate such opportunities to customers (e.g., during maintenance stage based on maintenance stage relationships and business rules set up therein).

As noted above, method 230 is a dynamic, ongoing process occurring while an order is being fulfilled. Accordingly, method 230 may be repeated in a constant loop until order is fulfilled. Method 230 may also incorporate steps described with reference to methods 40 and method 200 above.

Figure 22:
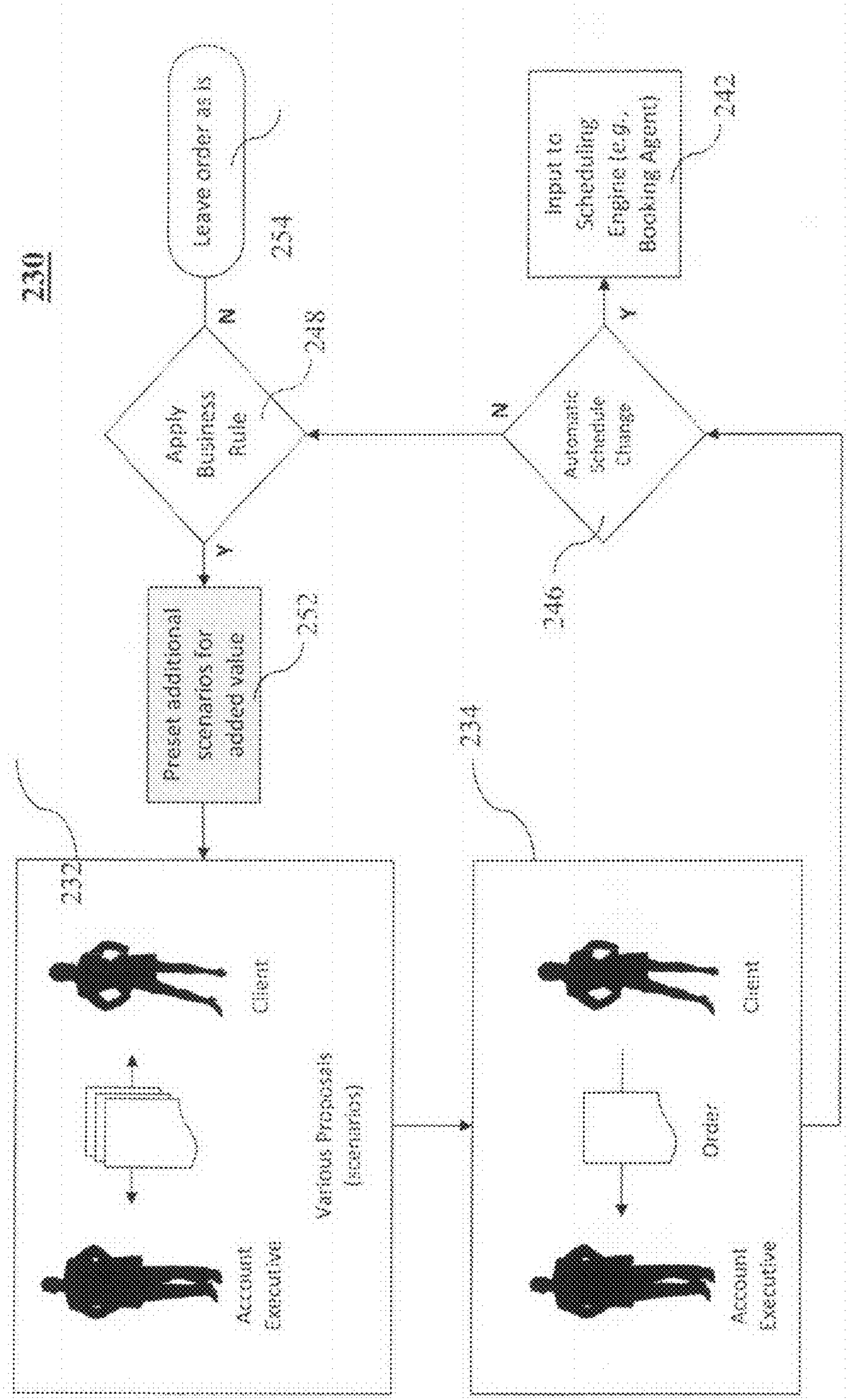
FIG. 22 is a flowchart illustrating an embodiment of a method for generating and managing advertising campaign proposals using feedback from the traffic and billing system.

With reference now to FIG. 22, shown is an alternative view of feedback loop of method 230. Various proposals are generated by media proposal system 10 and communicated to customer (client and customer are used interchangeably throughout), block 232. Customer approves of a proposal and it is injected into traffic and billing, block 234. Business rules are applied to determine if there should be an automatic scheduling change, block 246. If yes, the automatic scheduling change is input into a scheduling engine, block 242. Media proposal system 10 receives feedback and determines, e.g., using a scenario engine, whether to apply business rules to generate additional scenarios (i.e., new or revised proposals), block 248. If new or modified proposals may be generated to add value to the original or current proposal/order, media proposal system 10 automatically forwards the new or modified proposals to customer, block 252. The proposals may be sent to customer per the customers contact information set up in media proposal system 10 as described above. If there are no opportunities or good reasons to modify the order, the order is left unchanged, block 254. Method 230 may continuously loop while order is being fulfilled, as described above.

As described above, media proposal system 10 and the various methods described herein may be used for creating media proposals and placing advertisements in a variety of media outlet types. For example, media proposal system 10 may be used to create media proposals for advertising on terrestrial, satellite, internet, streaming, high-definition, and cable radio and television, websites, newspapers, billboards, etc. Because each of these media types or products may, and most cases does, have varying ways to price advertising spots or placements, as well as varying ways to gauge pricing values, media proposal system 10 incorporates a unique aggregation and rules process to display comparable like values for advertising in different media types to media proposal system 10 users and customers. This like value is displayed in a consistent user interface to minimize confusion and speed up the selling process. Those skilled in the art will understand the various inputs needed to perform these like comparisons such as individual demand based pricing from the a yield management system for each media type, advertising product availability values for the traffic and billing system, audience delivery metrics from external providers. Media proposal system 10 couples these external components with mathematical conversion routines to produce the output to users. The weighting formulas and rules executed in this conversion module are editable by users as the media products evolve in their effectiveness thus their value to the clients. An example of this is the Arbitron CPP value for a terrestrial radio advert compared to the internet CPM value for a streaming radio advert. Since the general feeling is that streaming on a desktop is less effective that the captive commercial played while driving, the value of the CPM would be weighted down while the value of the CPP would be weighted up by percentages entered by the users. As technology evolves, devices in vehicles could possibly provide internet streams and, therefore, the value would be reevaluated and the system parameters modified accordingly.

Figure 23:
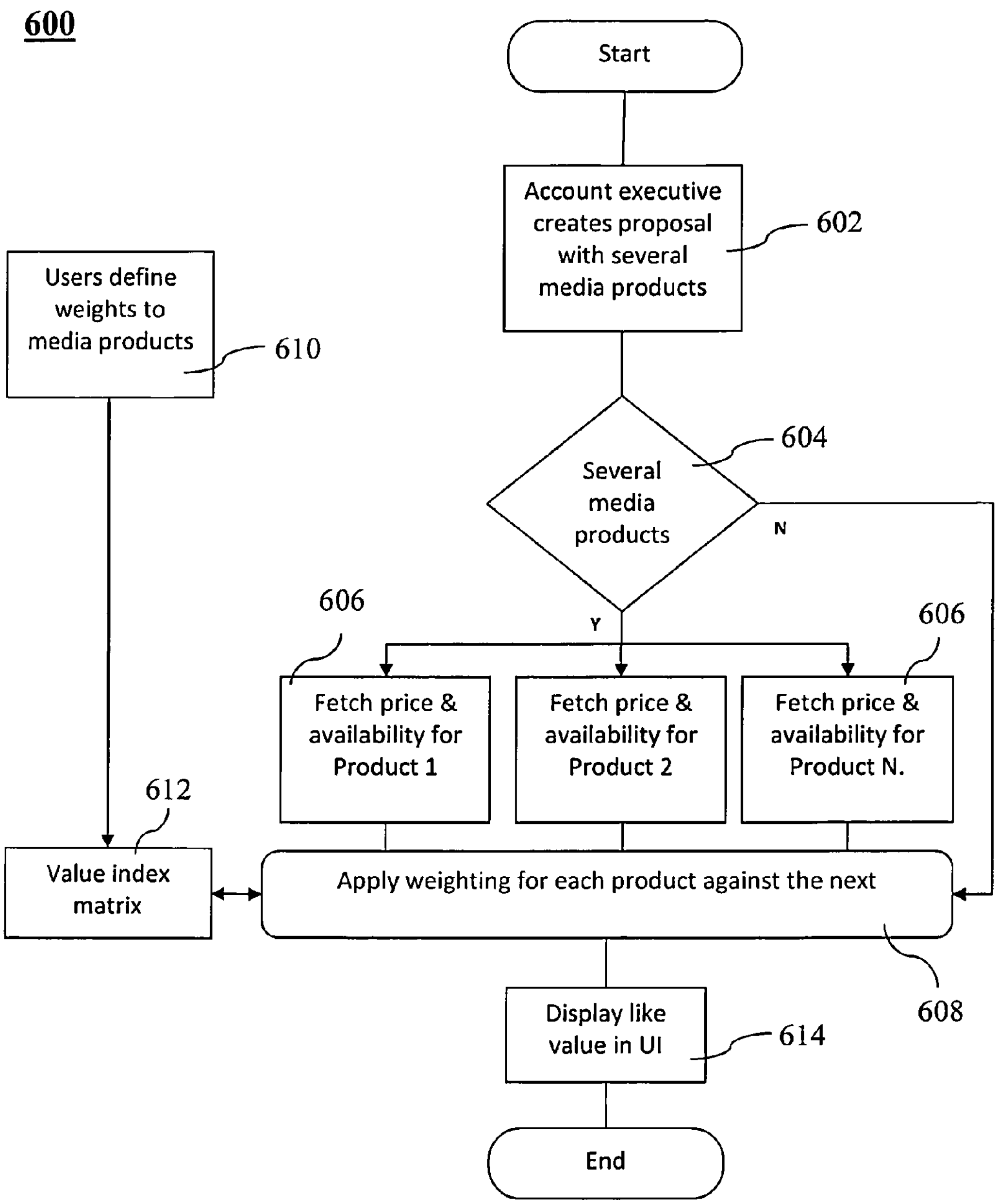
FIG. 23 is a flowchart illustrating an embodiment of a method for creating a media proposal for multiple media outlets.

With reference now to FIG. 23, shown is an embodiment method 600 for creating a media proposal for multiple media outlets that utilizes the weighting process and rules described above. Method 600 includes weighting that enables advertising pricing for various media products to be compared as like values. Media products are advertising placement possibilities or options on a media outlet. Various media products here may be different advertising placement options on the same type of media outlet or different advertising placement options on different media outlet types. An account executive, or other user, creates an initial media proposal with placement of advertisements in multiple media products, block 602. Media proposal system 10 determines if media proposal includes placement of advertisements in media products of multiple media types, block 604. If multiple media types are in media proposal, method 600 fetches the price(s) and availability for each media product, block 606. Method 600 may fetch the prices from a yield management system, such as described in the Best Rate applications. Method 600 and media proposal system 10 may consider or subdivide media products of the same general type (e.g., radio stations) into different media types (e.g., national television stations in one type and local television stations into a different type). Method 600 applies a weighting for each media type in the media proposal, block 608. The weighting may be input into media proposal by account executive or pre-defined by users for each media type, block 610. Weighting may be stored in value index matrix 612 which may be stored in media proposal system database 14. Weighting enables media proposal system 10 to treat advertisements in different media types or of different media products, which are often priced and treated quite differently, on a like basis. This enables media proposal system 10 to display and users to view advertising in different media products as like values. Accordingly, method 600 displays weighted pricing of different media type advertising in media proposal in media proposal GUI 70 as like values, block 614.

Because technology is providing increasingly varied ways for media outlets to sell products, there is a need to bridge the old media products with new offerings. Embodiments described herein use "value indexing," which is a weighting system based on the delivery data made available to give the account executives and customers a way to gauge the relative values of the continuing expanded product sets. To make this value assessment, a weight is calculated using the best known comparative data in the industry of each product offered by a media outlet and using a calculation rule set. The rule sets are user definable as some level of subjectivity exists in the delivery expectations. This data is used to provide a simple visible proposal to make understand those values relative to each product offering based on the best known comparative analysis. Method 600 may utilize such value indexing, weighting and rule sets in steps described above. As an example, broadcast TV or Radio viewer and listenership audience data and Internet page view data is analyzed then weighted and displayed to show a customer what the total audience exposure should be for each advertising dollar spent using a consistent value index ratings when these products offerings are purchased as a package. As more understanding and better audience data is made available, embodiments provide users a way to update these analytics to consume the higher quality data.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A computerized method for managing a media advertising proposal from inception to completion of an order with one or more media outlets, comprising:

storing customer account records in a database communicatively coupled to a media proposal tool, the customer account records associated with a plurality of different customers, and including information indicating a plurality of stage-dependent relationships indicating particular relationships of the customer account records at different states of an order process;

receiving a customer request for placement of an advertisement in one or more media outlets, by executing a program instruction in a computer system;

creating a media advertising proposal, based on user inputs into the media proposal tool, in response to receiving the customer request, by executing a program instruction in a computer system, the media advertising proposal comprising a schedule including at least one placement of the advertisement in one or more selected media outlets;

storing the media advertising proposal in the database, by executing a program instruction in a computer system;

accessing one or more external applications to integrate information and data into the media advertising proposal, by executing a program instruction in a computer system;

assigning a grade to the media advertising proposal, the grade indicating a likelihood of the media advertising proposal resulting in an order, by executing a program instruction in a computer system;

entering the media advertising proposal into a computerized workflow in the media proposal tool for review and approval, by executing a program instruction in a computer system;

presenting the media advertising proposal for approval, the media advertising proposal being presented to a first entity determined based on a first, stage-dependent relationship, by executing a program instruction in a computer system;

in response to the media advertising proposal being approved, injecting the media advertising proposal as an order into the traffic and billing system by executing a program instruction in a computer system.

2. The method of claim 1 wherein creating a media advertising proposal includes receiving advertising parameters for the media advertising proposal in the media proposal tool.

3. The method of claim 1 further comprising:

accessing customer records in the media proposal tool, wherein the customer records include information about the customer, by executing program instruction in a computer system; and entering the customer information from the customer records into the media advertising proposal, by executing a program instruction in a computer system.

4. The method of claim 1 wherein accessing one or more external applications includes accessing a credit information tool and retrieving credit rating information about the customer.

5. The method of claim 4 further comprises creating a financial stress index, using the credit rating information, wherein the financial stress index is used in adverting cost calculation for the media advertising proposal, by executing a program instruction in a computer system.

6. The method of claim 1 wherein accessing one or more external applications includes accessing a yield manager system to determine and retrieve pricing for the schedule in the media advertising proposal, wherein the method incorporates the retrieved pricing into the media advertising proposal.

7. The method of claim 1 wherein accessing one or more external applications includes accessing a yield management system and the method further comprising:

calculating an optimal rate for the schedule in the media advertising proposal based on information received from the yield management system, by executing a program instruction in a computer system; and incorporating the optimal rate in the media advertising proposal, by executing a program instruction in a computer system.

8. The method of claim 1 wherein accessing one or more external application includes accessing an audience delivery engine; determining and retrieving scheduling information for meeting customer advertising goal, wherein the customer advertising goals include at least one of a number of impressions for the advertisement.

9. The method of claim 8 wherein the method further comprises incorporating the retrieved scheduling information into the media advertising proposal.

10. The method of claim 1 wherein accessing one or more external applications includes accessing a traffic and billing system; determining and retrieving data regarding availability of advertising times or spaces on one or more media outlets.

11. The method of claim 10 wherein the one or more media outlets include media outlets chosen from a list consisting of: radio station, television stations, internet radio sites, internet websites, print media, billboards, and combinations thereof.

12. The method of claim 10 wherein accessing traffic and billing system is repeated; updating the retrieved availability data to reflect changes made to the media advertising proposal.

13. The method of claim 10 further comprises displaying the retrieved availability data to a user of the media proposal tool, by executing a program instruction in the computer system.

14. The method of claim 13 wherein the displayed availability data includes availability data from a plurality of media outlet.

15. The method of claim 13 wherein the displayed availability data includes availability data from a plurality of media types.

16. The method of claim 10 wherein the retrieved availability data includes multiple weeks of media advertising availability.

17. The method of claim 1 in which the media advertising proposal includes a schedule for airing the advertisement on a plurality of media outlet types.

18. The method of claim 1 further comprising displaying a graphical representation of data regarding availability of advertising times or spaces on one or more media outlets, by executing a program instruction in a computer system.

19. The method of claim 18 wherein the graphical representation graphically displays how much advertising time or space is currently booked and how much time or space is available to book.

20. The method of claim 18 wherein the graphical representation graphically displays how much advertising time or space will be booked if the media advertising proposal is accepted and booked as an order.

21. The method of claim 20 wherein the graphical representation reflects the probability of booking the media advertising proposal based on the assigned grade.

22. The method of claim 18 wherein the graphical representation provides a visual indication if the media advertising proposal will cause advertising time or space to be overbooked.

23. The method of claim 18 wherein the graphical representation is a process bar.

24. The method of claim 1 wherein the media proposal tool executes the computerized workflow.

25. The method of claim 23 wherein executing of the computerized workflow includes displaying, to a user identified based on at least one of the plurality of stage-dependent relationships, the media advertising proposal on a proposal graphical user interface (GUI) with at status indicating that the media advertising proposal requires a user's attention.

26. The method of claim 25 wherein the proposal GUI enables the user to submit approval of the media advertising proposal.

27. The method of claim 1 further comprising:

receiving feedback about the order from the traffic and billing system, by executing a program instruction in the computer system; and adjusting the schedule in the media advertising proposal based on the feedback, by executing a program instruction in a computer system.

28. The method of claim 27 further comprising:

analyzing customer goals for the media advertising proposal based on the received feedback, by executing a program instruction in a computer system;

computing a fulfillment score that indicates whether the customer goals are met, by executing a program instruction in a computer system;

wherein adjusting the schedule in the media advertising proposal based on the feedback includes adjusting based on the fulfillment score, by executing a program instruction in a computer system.

29. The method of claim 1 further comprising:
scheduling the order in the traffic and billing system, by executing a program instruction in a computer system;
analyzing the scheduled order using business rules, by executing a program instruction in a computer system; and
adjusting the schedule in the scheduled order based on the analyzing, by executing a program instruction in a computer system.

30. The method of claim 1 wherein the media advertising proposal includes a plurality of media products.

31. The method of claim 30 further comprising:
retrieving pricing and availability information for each of the media products, by executing a program instruction in a computer system;
retrieving weighting for each of the media products, by executing a program instruction in a computer system;
applying the weighted pricing for each of the media products, by executing a program instruction in a computer system;
displaying the weighted pricing information and availability information for each of the media products, wherein the weighted pricing information appears as comparable values for each of the media products, by executing a program instruction in a computer system.

32. The method of claim 1 further comprising:
accessing a customer account record for the customer requesting the placement of the advertisement, by executing a program instruction in a computer system; and
assigning a tag to the customer account record indicating a level of priority for the customer, by executing a program instruction in a computer system.

33. The method of claim 32 further comprising providing automated alerts to a user of the media proposal tool based on the priority level for the customer, by executing a program instruction in a computer system.

34. The method of claim 1 further comprising:
accessing a customer account record for the customer requesting the placement of the advertisement, by executing a program instruction in a computer system; and
assigning a parent/child relationship between the customer account record and another account record in the media proposal tool, by executing a program instruction in the computer system.

35. The method of claim 34 further comprising sending the media advertising proposal to the first entity based on the assigned parent/child relationship, by executing a program instruction in the computer system.

36. The method of claim 34 further comprising billing for the airing of the advertising in the advertising media proposal based on the assigned parent/child relationship, by executing a program instruction in a computer system.

37. The method of claim 34 further comprising:
generating a report of fulfillment of the media advertising proposal and airing of advertising in the injected order, by executing a program instruction in a computer system; and
communicating the report to a second entity determined based on the assigned parent/child relationship based on a second, stage-dependent relationship, the stage dependent relationship indicating the entity associated with a second stage, different from the first stage, in media advertising proposal, by executing a program instruction in a computer system.

38. The method of claim 34 wherein:
the another account record is an agency record,
the customer account record is assigned a child status in the parent/child relationship, and
the agency account record is assigned a parent status in the parent/child relationship.

39. The method of claim 34 wherein:
the another account record is a representative firm record,
the customer account record is assigned a child status in the parent/child relationship, and
the representative firm account record is assigned a parent status in the parent/child relationship.

40. The method of claim 1 wherein accessing one or more external applications includes receiving business intelligence data from a business intelligence source and incorporating the business intelligence data into the media advertising proposal.

41. The method of claim 1 wherein creating a media advertising proposal includes:
displaying a proposal GUI on a mobile device; and
deceiving input from mobile device, wherein the input includes parameters for the media advertising proposal.

42. A computerized system for managing an advertising proposal from inception to completion of an order with one or more media outlets, comprising:
a server that hosts a media proposal tool for creating media advertising proposals based on user inputs into a media proposal tool, each media advertising proposal comprising a schedule including at least one placement of the advertisement in one or more selected media outlets;
a media proposal tool database server coupled to a media proposal toll database storing customer account records, the customer account records database associated with a plurality of different customers, and including information indicating a plurality of stage-dependent relationships indicating particular relationships of the customer account records at different stages of an order process;
one or more application servers, connected to the media proposal tool server, that includes data and information utilized by the media proposal tool for creating media advertising proposals, including advertising schedule availability data; and
one or more workstations for displaying graphical user interfaces (GUIs) for viewing media advertising proposal and the information from the one or more database servers, and for entering user input that is used to create the media advertising proposals; and
wherein the media proposal tool includes instructions stored in memory on the server, the media proposal tool configured to:
create the media advertising;
store the media advertising proposal in the media proposal tool database;
access the one or more applications servers to integrate the data and information therefrom into the media advertising proposal;
entering the media advertising proposal into a computerized workflow in the media proposal tool for review and approval;
if the media advertising proposal is approved, injecting the media advertising proposal as an order into a traffic and billing system in communication with the media proposal tool server;
receive feedback about the order from the traffic and billing system, by executing a program instruction in a computer system; and adjust the schedule in the media advertising proposal based on the feedback, by executing a program instruction in a computer system; and implementing different business rules at different stages of an advertising proposal process, in accordance with the plurality of stage-dependent relationships.

* * * * *